(12) United States Patent
Morohoshi et al.

(10) Patent No.: US 8,173,227 B2
(45) Date of Patent: May 8, 2012

(54) RECORDING INK, INK MEDIA SET, INK CARTRIDGE, INK RECORDED MATTER, INKJET RECORDING APPARATUS, AND INKJET RECORDING METHOD

(75) Inventors: Naoya Morohoshi, Numazu (JP); Tamotsu Aruga, Mishima (JP); Michihiko Namba, Yokohama (JP); Akihiko Gotoh, Atsugi (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 972 days.

(21) Appl. No.: 12/095,946

(22) PCT Filed: Sep. 12, 2007

(86) PCT No.: PCT/JP2007/068226
§ 371 (c)(1),
(2), (4) Date: Jun. 3, 2008

(87) PCT Pub. No.: WO2008/035725
PCT Pub. Date: Mar. 27, 2008

(65) Prior Publication Data
US 2009/0162569 A1 Jun. 25, 2009

(30) Foreign Application Priority Data
Sep. 19, 2006 (JP) .................... 2006-252345

(51) Int. Cl.
*B05D 5/06* (2006.01)
*B41J 2/17* (2006.01)
*C08K 5/3417* (2006.01)

(52) U.S. Cl. ............. 427/561; 427/256; 347/95; 524/88

(58) Field of Classification Search .................. None
See application file for complete search history.

(56) References Cited

U.S. PATENT DOCUMENTS

| | | | |
|---|---|---|---|
| 2007/0197685 | A1 | 8/2007 | Aruga et al. |
| 2008/0248260 | A1* | 10/2008 | Kojima et al. ............. 428/195.1 |

FOREIGN PATENT DOCUMENTS

| | | |
|---|---|---|
| EP | 1 811 002 A2 | 7/2007 |
| JP | 60 34992 | 8/1985 |
| JP | 6 171072 | 6/1994 |
| JP | 8 109343 | 4/1996 |
| JP | 2002 67473 | 3/2002 |
| JP | 2002 69346 | 3/2002 |

(Continued)

*Primary Examiner* — John J Figueroa
(74) *Attorney, Agent, or Firm* — Oblon, Spivak, McClelland, Maier & Neustadt, L.L.P.

(57) ABSTRACT

There is provided a recording ink containing: solid constituents, which contain a colorant and a resin, and stay solid in the ink having a temperature of 25° C.; liquid constituents, which have a higher boiling point than a boiling point of water, and stay liquid in the ink having a temperature of 25° C.; and water, wherein a total amount of the solid constituents in the recording ink is in the range of 2.0% by mass or more to less than 20% by mass, wherein a ratio A/B of a total amount of the liquid constituents in the recording ink A to the total amount of the solid constituents in the recording ink B is from 0.70 to 1.75, and wherein the viscosity of the recording ink at 25° C. is 10 mPa s or less.

20 Claims, 20 Drawing Sheets

FOREIGN PATENT DOCUMENTS

| | | |
|---|---|---|
| JP | 2002 301857 | 10/2002 |
| JP | 2004 115551 | 4/2004 |
| JP | 2005 220352 | 8/2005 |
| JP | 2006 51808 | 2/2006 |
| JP | 2006 70105 | 3/2006 |
| WO | WO 2006/030978 A1 | 3/2006 |
| WO | WO 2007/023987 A1 | 3/2007 |

* cited by examiner 232   235

232

RECORDING INK, INK MEDIA SET, INK CARTRIDGE, INK RECORDED MATTER, INKJET RECORDING APPARATUS, AND INKJET RECORDING METHOD

TECHNICAL FIELD

The present invention relates to a recording ink suitable for inkjet recording, and an ink media set, ink cartridge, ink recorded matter, inkjet recording apparatus, and inkjet recording method, using the recording ink.

BACKGROUND ART

In the inkjet recording method, ink droplets are ejected to adhere to a recording medium such as paper. An ink used in the inkjet recording method usually contains various colorants, such as dyes and pigments, dissolved or dispersed in water or in water and high-boiling point organic solvents, and the ink further contains humectants including high boiling point organic solvents for sustaining moisture retaining properties. As such the humectants have a low volatility (evaporation properties) and water retention properties, the humectants including high-boiling point organic solvents are useful for preventing nozzles from drying out. However, strike-through of the ink may frequently occur when highly absorbent paper such as regular paper is used in printing because the humectants do not evaporate quickly.

On the other hand, in applications using less absorbent paper such as coated offset printing paper (termed "the coated paper" on some occasions hereafter), the prior art ink containing a large amount of humectants often causes beading and bleeding in solid color areas where a large amount of ink is applied because the ink applied on the surface of the coated paper slowly infiltrates therein. Furthermore, because the humectants do not evaporate quickly, there are some impractical issues such as longer drying time, smeared offset or conveyers by spurs, smeared paper or paper stuck together in the discharged paper stack.

Then, there have been demands for an inkjet recording method that realizes reduced beading, improved drying speed, high image densities, and high quality even on regular paper in printing on coated printing paper and that does not cause clogged nozzles after a prolonged unused period.

For example, Patent literature 1 proposes an inkjet ink containing an extremely small amount of humectants. This proposal realizes high image densities on regular paper without strike-through. However, because the ink contains no resins, the image is not fixed well particularly when pigmented ink is used. There is no disclosure or suggestion as to improvement in drying speed upon printing on coated offset printing paper.

Patent literature 2 proposes a quick-drying dye ink. Embodiments of this proposal contain humectants in amounts six times higher than colorants and no resins. In the embodiments, high quality paper is used and poorly absorbent coated printing paper is excluded.

Patent literature 3 proposes a quick-drying ink for electro-exothermic inkjet systems. This proposal also contains no resins and a large amount of electrolytes, leading to poorly fixed images. Here, the ejection system is used, which is substantially different from the piezo inkjet system.

Patent literature 4 and Patent literature 5 propose combinations of microcapsulated pigments and printing paper. These proposals use conventional ink compositions and require heating by microwaves for improved drying properties.

Patent literature 6 proposes an ink containing wax particles and resin particles. In this proposal, the wax particles can contribute to moisturizing and are used in place of humectants. However, the wax particles having moisturizing properties usually are less useful for fixing and drying.

Patent literature 7 proposes an ink containing resin emulsions, high-molecular weight dispersants, and pigments. This proposed ink contains a small amount of humectants. However, because of the low total solid content, problems such as insufficient image densities and color development occur.

Patent literature 8 has proposed an ink suitable for non-porous recording media such as films, the ink containing an ink resin emulsion containing an aqueous liquid vehicle, acid-functional polymer colloid particles dispersed in the aqueous liquid vehicle, and polymer-coupled pigment colorants, high-molecular weight dispersants, and pigments. Embodiments of this proposal contain high-boiling point humectants (water-soluble organic solvents) in amounts approximately 3.5 times higher than the solid content. It dries slow upon standing in general environments after recording. Therefore, heating by a heat gun is necessary.

As described above, the prior art inkjet recording ink is not considered to be used with less absorbent recording media such as coated printing paper including coated offset printing paper. No techniques are offered to reduce the amount of the liquid constituents (principally humectants) having boiling points higher than water and being liquid in the ink at 25° C. as a result of focusing on the ratio to the solid constituents for improved ink infiltration and to prevent problematic clogged nozzles after a prolonged unused period.

[Patent literature 1]
Japanese Patent Application Laid-Open (JP-A) No. 2004-115551
[Patent literature 2]
Japanese Patent Application Publication (JP-B) No. 60-34992
[Patent literature 3]
Japanese Patent Application Laid-Open (JP-A) No. 08-109343
[Patent literature 4]
Japanese Patent Application Laid-Open (JP-A) No. 2002-67473
[Patent literature 5]
Japanese Patent Application Laid-Open (JP-A) No. 2002-69346
[Patent literature 6]
Japanese Patent Application Laid-Open (JP-A) No. 2002-301857
[Patent literature 7]
Japanese Patent Application Laid-Open (JP-A) No. 06-171072
[Patent literature 8]
Japanese Patent Application Laid-Open (JP-A) No. 2005-220352

DISCLOSURE OF INVENTION

An object of the present invention is to provide a recording ink which reduces the occurrences of beading and causes no problems with the drying speed so that clear images close to commercial/published print are obtained even in printing on less absorbent coated printing paper, and an ink media set, ink cartridge, ink recorded matter, inkjet recording apparatus having no clogged nozzles after a prolonged unused period, and inkjet recording method, using the recording ink.

The means for resolving the above problems are as follows.

<1> A recording ink containing:
  solid constituents, which contain a colorant and a resin, and stay solid in the ink having a temperature of 25° C.;
  liquid constituents, which have a higher boiling point than a boiling point of water, and stay liquid in the ink having a temperature of 25° C.; and
  water
  wherein a total amount of the solid constituents in the recording ink is in the range of 2.0% by mass or more to less than 20% by mass, and
  wherein a ratio A/B of a total amount of the liquid constituents in the recording ink A to the total amount of the solid constituents in the recording ink B is from 0.70 to 1.75, and
  wherein the viscosity of the recording ink at 25° C. is 10 mPa·s or less.
<2> The recording ink according to <1>, wherein the liquid constituents comprise a humectant having a boiling point of 230° C. or higher, and a total amount of the humectant is 50% by mass or more with respect to the total amount of the liquid constituents.
<3> The recording ink according to <2>, wherein the humectant is at least one selected from the group consisting of glycerin, 1,3-butandiol, 3-methyl-1,3-butandiol, 2-pyrolidone and N-methyl-2-pyrolidone.
<4> The recording ink according to any one of <1> to <3>, wherein the liquid constituents contain a penetrant which is C8 to C11 polyol.
<5> The recording ink according to any one of <1> to <4>, wherein the liquid constituents comprise a surfactant which comprises a fluorochemical surfactant.
<6> The recording ink according to <5>, wherein the fluorochemical surfactant has 2 to 16 fluorine-substituted carbon atoms.
<7> The recording ink according to any one of <1> to <6>, wherein the resin comprises resin particles.
<8> The recording ink according to <7>, wherein the resin particles comprise an acrylic silicone resin which has a glass transition temperature of 25° C. or less.
<9> The recording ink according to any of <7> or <8>, wherein the resin particles have a volume average particle diameter of 10 nm to 1,000 nm in a resin emulsion.
<10> The recording ink according to any one of <1> to <9>, wherein the colorant is a polymer emulsion pigment in which a colorant having water insolubility or poor water solubility is contained in polymer particles.
<11> The recording ink according to any one of <1> to <10>, wherein the colorant is a pigment having an anionic hydrophilic group on a surface thereof.
<12> The recording ink according to any one of <1> to <11>, wherein the recording ink has a surface tension 35 mN/m or less at 25° C.
<13> An ink medium set containing:
  the recording ink according to any one of <1> to <12>,
  a recording medium having a support, and a coated layer disposed at least on one surface of the support,
  wherein a transfer rate of purified water to the recording medium for 100 ms of contact time measured by a dynamic scanning absorptometer is 2 ml/m² to 35 ml/m², and the transfer rate of purified water to the recording medium for 400 ms of contact time is 3 ml/m² to 40 ml/m².
<14> An ink cartridge having:
  a container; and
  the recording ink according to any one of <1> to <12> contained in the container.
<15> An inkjet recording method including at least:
  applying a stimulus to the recording ink according to any one of <1> to <12>, and ejecting the recording ink so as to record an image on a recording medium.
<16> The inkjet recording method according to <15>, wherein the recording medium comprises a support, and a coated layer disposed at least on one surface of the support, and
  wherein a transfer rate of purified water to the recording medium for
  100 ms of contact time measured by a dynamic scanning absorptometer is
  2 ml/m² to 35 ml/m², and the transfer rate of purified water to the recording medium for 400 ms of contact time is 3 ml/m² to 40 ml/m².
<17> The inkjet recording method according to any of <15> or <16>, wherein the stimulus is at least one selected from heat, pressure, vibration and light.
<18> The inkjet recording method according to any one of <15> to <17>, wherein the recording ink is ejected from a inkjet head which has an opening for ejecting ink formed on a plate surface thereof, and wherein the plate surface has an ink-repellent layer.
<19> The inkjet recording method according to <18>, wherein the ink-repellent layer comprises either a fluorine-based material or a silicone-based material.
<20> The inkjet recording method according to any of <18> or <19>, wherein the ink-repellent layer has a surface roughness (Ra) of 0.2 μm or less.
<21> The inkjet recording method according to any one of <18> to <20>, wherein the inkjet head is configured so as to make a cross section of a plane perpendicular to a center line of the opening in the vicinity of the opening gradually larger as the opening is separating from the plate surface on the cross-section.
<22> The inkjet recording method according to any one of <18> to <21>, wherein the ink-repellent layer has a thickness of 0.1 nm or more.
<23> The inkjet recording method according to any one of <18> to <22>, wherein the ink-repellent layer has a critical surface tension of 5 mN/m to 40 mN/m.
<24> An inkjet recording apparatus including at least:
  an ink ejection unit which is configured to apply a stimulus to the recording ink according to any one of <1> to <12>, and to eject the recording ink so as to record an image on a recording medium.
<25> The inkjet recording apparatus according to <24>, wherein the stimulus is at least one selected from heat, pressure, vibration and light.
<26> An ink recorded matter including:
  a recording medium; and
  an image formed with the recording ink according to any one of <1> to <12>, on the recording medium.
<27> The ink recorded matter according to <26>, wherein the recording medium comprises a support and a coated layer disposed at least on one surface of the support, and a transfer rate of purified water to the recording medium for 100 ms of contact time measured by a dynamic scanning absorptometer is 2 ml/m² to 35 ml/m², and the transfer rate of purified water to the recording medium for 400 ms of contact time is 3 ml/m² to 40 ml/m².

The recording ink of the present invention contains solid constituents, liquid constituents, and water, wherein the solid constituents contain a colorant and a resin and stay solid in the ink having a temperature of 25° C., and the liquid constituents has higher boiling point than that of water and stay liquid in the ink having a temperature of 25° C.

The ratio A/B of the total amount of the liquid constituents in the recording ink A to the total amount of the solid constituents in the recording ink B is 0.70 to 1.75, and the viscosity of the recording ink at 25° C. is 10 mPa·s or less. Therefore, an inkjet recording apparatus and inkjet recording method are provided wherein the occurrence of beading is reduced and no problems occur with the drying time so that clear images close to commercial/published print are obtained even in printing on less absorbent coated printing paper and the nozzle is not clogged after a prolonged unused period.

Furthermore, the total amount of the solid constituents in the recording ink is in the range of from 2.0% by mass or more to less than 20% by mass. Therefore, the mixing rate of the liquid constituents required for preventing clogged nozzles can be reduced, whereby the occurrence of beading is reduced and the drying speed is further improved.

The liquid constituents having boiling points higher than water and being liquid in the ink at 25° C. contain a high-boiling point humectant as a main component. The prior art ink containing a humectant at a high content has problems such as beading due to insufficient ink absorption and slow drying speed when it is applied to coated printing paper such as coated offset printing paper. Here, it is known from the Lucas-Washburn expression that the infiltration distance h is proportional to the time t raised to the power of 1/2 and the viscosity η raised to the power of −1/2:

$$h = (R\gamma t \cos \theta / 2\eta)^{1/2}$$

In the above expression, h is the infiltration distance, t is the time required to infiltrate, R is the pore diameter, θ is the contact angle, and η is the kinetic viscosity.

It is understood from the above that for a specific recording medium, the time required for absorbing the same amount of liquid is proportional to the viscosity of the liquid and inversely proportional to the surface tension and cos θ. One resolution is to reduce the viscosity of the ink, more precisely, the viscosity of the liquid constituents in the ink, provided that the surface tension of the ink is unchanged.

In such a case, the content of humectants can be reduced to a reasonable extent so as to reduce the viscosity of the ink, because the viscosity of the ink is changed according to the content of humectant.

If the humectant content is reduced to the extent that the humectants do not sufficiently perform their function in order to reduce the viscosity of the ink, the ink dispensing direction may be changed (twisted; error in ink-landing position) or the ink may not be dispensed because of the clogged nozzle after a prolonged unused period.

On the other hand, the solid constituents in the ink are primarily colorants and resins contained for improving fixing properties. The humectants in the ink primarily serve to prevent aggregation and adhesion of the solid constituents on the nozzle plate (anti-adhesion).

The ink on the nozzle plate loses moisture mainly due to evaporation of water over time. The high-boiling point humectants and a small amount of water remain and prevent the particles of the solid constituents in the ink from aggregating and contacting, thereby preventing the adhesion.

The liquid constituents in the ink that has landed on the recording medium are removed from the medium surface mainly as a result of infiltration in the medium. The liquid constituents of the ink are primarily water and humectants. The liquid constituents (including water) have low viscosities if the humectants are contained in small amounts (even if they are highly viscous). In such a case, water and the humectants are simultaneously (without separating) removed from the medium surface. The solid constituents (pigments and resins as fixing agent) of the ink remain on the medium surface in the image part. Only a very small amount of humectants remain; therefore, excellent fixing properties are ensured.

Like the necessary amount of binders in relation to the solid constituents in the coating ink, the necessary amount of liquid constituents (primarily humectants) having boiling points higher than water in the ink and being liquid in the ink at 25° C. as anti-adhesion agent is presumably proportional to the mixing rate of the solid constituents in the ink. Smaller amounts of the liquid constituents are necessary where the amounts of solid constituents are smaller. Larger amounts of the liquid constituents are necessary where the amounts of solid constituents are larger.

The recording ink of the present invention is a recording ink containing solid constituents including a colorant and a resin and staying solid in the ink at 25° C., liquid constituents having a boiling point higher than water and staying liquid in the ink at 25° C., and water wherein: the total amount of the solid constituents in the recording ink is in the range of 2.0% by mass or more to less than 20% by mass; and the ratio A/B of the total amount of the liquid constituents in the recording ink A to the total amount of the solid constituents in the recording ink B is 0.70 to 1.75, whereby the occurrence of beading is reduced and no problems occur with the drying time so that clear images close to commercial/published print are obtained even in printing on less absorbent coated printing paper.

The ink cartridge of the present invention is an ink cartridge having the recording ink of the present invention contained in a container. The ink cartridge can preferably be used with printers of the inkjet recording system. By recording with the ink contained in the ink cartridge, the drying speed is improved and clear images close to commercial/published print are obtained in printing on less absorbent coated printing paper.

The inkjet recording apparatus of the present invention at least contain an ink ejection unit configured to apply energy to the recording ink of the present invention so as to eject the recording ink for recording images. In the inkjet recording apparatus, the ink ejection unit applies energy to the recording ink of the present invention so as to eject the recording ink for recording images. Consequently, the drying speed is improved and clear images close to commercial/published print are obtained in printing on less absorbent coated printing paper.

The inkjet recording method of the present invention at least includes an ink ejecting step of applying energy to the recording ink of the present invention so as to eject the recording ink for recording images. In the inkjet recording method, energy is applied to the recording ink of the present invention and the recording ink is ejected for recording images in the above ink ejecting step. Consequently, the drying speed is improved and clear images close to commercial/published print are obtained in printing on less absorbent coated printing paper.

In the inkjet recording method of the present invention, the nozzle is unlikely clogged after a prolonged unused period.

Here, the term "prolonged unused period" means that the nozzle part is closed with a cap means and left unused for one day or longer.

The ink media set of the present invention is an ink media set having the recording ink of the present invention and a recording medium having a support and a coating layer at least on one side of the support wherein: when measured by a dynamic scanning absorptometer, the transfer rate of purified water to the recording medium in a contact time of 100 ms is 2 ml/m² to 35 ml/m² and the transfer rate of purified water to the recording medium in a contact time of 400 ms is 3 ml/m² to 40 ml/m².

The ink media set of the present invention combines the recording ink of the present invention and a recording medium having a specific range of transfer rates of purified water, allowing recording of glossy and highly uniform images in which no beading is observed in solid image areas.

The ink recorded matter of the present invention has images formed on a recording medium using the recording ink of the present invention. In the ink recorded matter of the present invention, the drying speed is improved and clear images close to commercial/published print are obtained in printing on less absorbent smooth printing paper.

In the present invention, the beading is a phenomenon that occurs when some ink droplets provided on a recording medium in inkjet recording do not infiltrate in the recording medium before the next ink droplets are provided and remain and mix with subsequent ink droplets on the recording medium surface, whereby colorants (such as color pigments) in the ink partly aggregate, causing uneven densities. In recent ordinary printers, this phenomenon relates to the ink infiltration into the recording medium in a relatively short time, namely in the contact time up to 100 ms. For example, in green image areas, the infiltration (transfer rate) of yellow (Y) ink (or cyan (C) ink) into the recording medium before C ink (or Y ink) is provided since the Y ink (or C ink) is provided determines the degree of beading. The beading tends to occur in the secondary colors such as green, red, and blue. It may occur in the primary colors such as cyan, magenta, yellow, and black when the ink infiltration into the recording medium is low.

BEST MODE FOR CARRYING OUT THE INVENTION

Recording Ink

Figure 1:
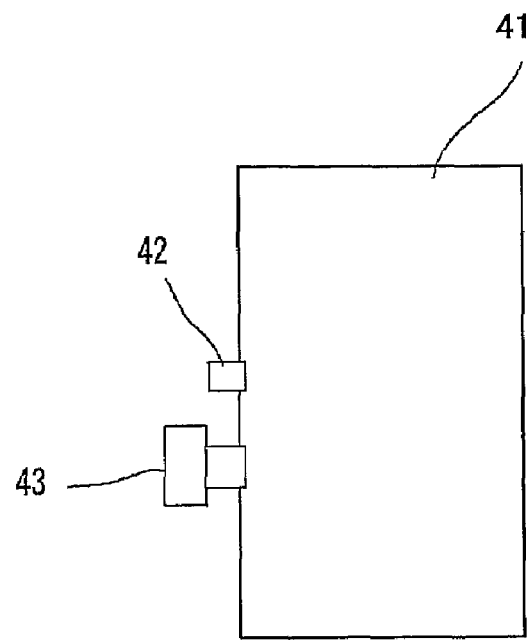
FIG. 1 is an illustration showing an embodiment of the ink cartridge of the present invention.

The recording ink of the present invention contains solid constituents, liquid constituents, and water, and further contains other constituents, if necessary. The above-mentioned solid constituents include a colorant and a resin, and stay solid in the ink at the ink temperature of 25° C. The above-mentioned liquid constituents have a boiling point higher than that of water, and stay liquid in the ink at the ink temperature of 25° C.

In the recording ink of the invention, the total amount of the solid constituents in the recording ink is in the range of 2.0% by mass or more to less than 20% by mass, preferably 5% by mass to 18% by mass, and more preferably 10% by mass to 15% by mass.

With the total amount of the solid constituents in the recording ink being less than 20% by mass, the mixing rate of the liquid constituents for preventing clogged nozzles can be reduced. Therefore, the occurrence of beading is reduced and the drying speed can further be improved. When the total amount of the solid constituents in the recording ink is 20% by mass or higher, the liquid constituents (primarily a humectant) having boiling points higher than water and being liquid in the ink at 25° C. for preventing clogged nozzles is increased in amount. More amount of the humectant tends to remain around the medium surface in the recorded image areas, slowing the drying and preventing mutual adhesion of the solid constituents (a pigment and a resin as fixing agent) and adhesion between the solid constituents and the medium. This results in the fixing properties being deteriorated. On the other hand, the total amount of the solid constituents in the recording ink is less than 2.0% by mass, the liquid constituents including water in the ink is increased in amount and more liquid constituents including water penetrate in the recording medium, slowing the drying and causing unfavorable waves, i.e. cockring, in the recording medium.

The ratio A/B of the total amount of the liquid constituents in the recording ink A to the total amount of the solid constituents in the recording ink B is 0.70 to 1.75, preferably 1.00 to 1.70, and more preferably 1.20 to 1.65. With the ratio A/B being 0.70 to 1.75, an inkjet recording apparatus and inkjet recording method are provided wherein the occurrence of beading is reduced and no problems occur with the drying time so that clear images close to commercial/published print are obtained even in printing on less absorbent coated printing paper and the nozzle is not clogged after a prolonged unused period. When the ratio A/B is lower than 0.70, the drying speed is increased; however, the nozzle may tend to be clogged after prolonged unused period. When the ratio exceeds 1.75, the nozzle is not clogged; however, recorded images dry slow.

<Liquid Constituents Having Boiling Points Higher than Water and being Liquid in the Ink at 25° C.>

The liquid constituents having a boiling point higher than that of water and staying liquid in the ink at the ink temperature of 25° C. contain a high-boiling point humectant as a main constituent, and also contain agents for controlling physical properties of the ink, such as penetrants and surfactants.

The ratio of the total amount of the liquid constituents having a boiling point higher than that of water and staying liquid in the ink at the ink temperature of 25° C. to the total amount of the solid constituents in the recording ink is 0.70 to 1.75. The ink dries faster as the amount of the above-mentioned liquid constituents are reduced. However, more precise controls are required for preventing clogged nozzles due to drying.

When the total amount of the liquid constituents having a boiling point higher than that of water and staying liquid in the ink at the ink temperature of 25° C. is low, the ink dries faster and glossy excellent images with indistinctive beading can be obtained even on less absorbent paper such as coated offset printing paper.

When the total amount of the liquid constituents having a boiling point higher than that of water and staying liquid in the ink at the ink temperature of 25° C. exceeds 30% by mass, the drying speed is reduced on coated printing paper such as coated offset printing paper and strike-through may be increased on regular paper. However, this is absolutely relative matters. The drying properties are improved as the liquid constituents having a boiling point higher than that of water and staying liquid in the ink at 25° C. is relatively reduced in amount among the liquid constituents.

Here, the liquid constituents having a boiling point higher than that of water and staying liquid in the ink at the ink temperature of 25° C. include a humectant having a boiling point higher than that of water and further include a penetrant and a surfactant as long as they have boiling points higher than water and are liquid in the ink at 25° C. In short, the content of liquid that is difficult to dry compared to water is reduced to improve the ink infiltration (absorption) and drying properties for reducing the occurrence of beading and shortening the drying time even on less absorbent paper such as coated printing paper.

-Humectant (Water-Soluble Organic Solvent and Solid Humectant)-

So-called a humectant, which is a representative constituent of the liquid constituents having a boiling point higher than that of water and staying liquid in the ink at the ink temperature of 25° C., is not particularly restricted and can appropriately be selected according to the purpose as long as it stays liquid in the ink at the ink temperature of 25° C. Examples thereof include polyalcohol, polyalcohol alkyl ether, polyalcohol aryl ether, a nitrogen-containing heterocyclic compound, amide, amine, a sulfur-containing compound, propylene carbonate, and ethylele carbonate. They can be used individually or in combination of two or more.

Examples of the polyalcohol include ethylene glycol, diethylene glycol, triethylene glycol, polyethylene glycol, propylene glycol, dipropylene glycol, tripropylene glycol, polypropylene glycol, 1,3-propanediol, 1,3-butanediol, 2,3-butanediol, 1,4-butanediol, 3-methyl-1,3-butanediol, 1,5-pentanediol, 1,6-hexanediol, 2-ethyl-1,3-hexanediol, 2-methyl-2,4-pentanediol, tetraethylene glycol, polyethylene glycol, glycerin, 1,2,6-hexanetriol, 1,2,4-butanetriol, 1,2,3-butanetriol, and petriol. Examples of the polyalcohol alkyl ethers include ethylene glycol monoethyl ether, ethylene glycol monobutyl ether, diethylene glycol monomethyl ether, diethylene glycol monoethyl ether, diethylene glycol monobutyl ether, triethylene glycol, triethylene glycol monomethyl ether, triethylene glycol monobutyl ether, triethylene glycol isobutyl ether, tetraethylene glycol monomethyl ether, propylene glycol monoethyl ether, dipropylene glycol monobutyl ether, tripropylene glycol monomethyl ether, and tripropylene glycol monobutyl ether.

Examples of the polyalcohol aryl ether include ethylene glycol monophenyl ether and ethylene glycol monobenzyl ether.

Examples of the nitrogen-containing heterocyclic compounds include N-methyl-2-pyrrolidone, N-hydroxyethyl-2-pyrrolidone, 2-pyrrolidone, 1,3-dimethylimidazolidinone, and ε-caprolactam.

Examples of the amide include formamide, N-methylformamide, and N,N-dimethylformamide.

Examples of the amine include monoethanolamine, diethanolamine, triethanolamine, monoethylamine, diethylamine, and triethylamine.

Examples of the sulfur-containing compound include dimethylsulfoxide, sulfolane, thiodiethanol, and thiodiglycol.

Among these, glycerin, 2-pyrrolidone, diethylene glycol, thiodiethanol, polyethylene glycol, triethylene glycol, 1,2,6-hexanetriol, 1,2,4-butanetriol, petriol; 1,5-pentanediol, N-methyl-2-pyrrolidone, 1,3-butanediol, and 3-methyl-1,3-butanediol are preferable and, among them, glycerin, 1,3- butane diol, 3-methyl-1,3-butane diol, 2-pyrrolidone, and N-methyl-2-pyrrolidone are particularly preferable in terms of stable ink ejection.

In order to prevent problems such as changes in ink ejecting direction during the printing (twisted; error in ink-landing position) and no ejected ink due to clogged nozzles after a prolonged unused period, it is preferable that the high-boiling point humectant has a high proportion in the total amount of the liquid constituents having a boiling point higher than that of water and staying liquid in the ink at 25° C. More specifically, it is preferable that the total amount of the high-boiling point humectant having a boiling point of 230° C. or higher, more preferably 250° C. or higher, particularly preferably 270° C. or higher, is 50% by mass or higher based on the total amount of the liquid constituents. Glycerin is particularly preferable because it has a high boiling point, evaporate little in itself, and has high equilibrium moisture regain in low humidity environments.

Note that, in the present invention, the boiling point is a boiling point under normal atmospheric pressure of 760 mmHg (1013.3 hPa).

Examples of the solid humectant include sugar, sugar alcohols, hyaluronic acid salts, trimethylol propane, and 1,2,6-hexanetriol.

With the ratio of the total amount of the liquid constituents having a boiling point higher than that of water and staying liquid in the ink at the ink temperature of 25° C., which include the humectant as the main constituent, to the total amount of the solid constituents in the recording ink being 0.7 to 1.75, the drying properties are improved. Constituents to be added where necessary other than water and the humectant that is liquid in the ink at the ink temperature of 25° C. include a penetrant and a surfactant, which are described later. Here, being liquid in the ink at the ink temperature of 25° C. means being liquid in the ink at an ordinary temperature and pressure (25° C., at 1 atm) or in the environment where inkjet recording is usually used. When the constituents other than the humectant are added in a small amount, the total amount of the liquid constituents having a boiling point higher than that of water and staying liquid in the ink at the ink temperature of 25° C. can approximate to the amount of the humectant without any difference.

-Penetrant-

The penetrant is included in the liquid constituents having a boiling point higher than that of water and staying liquid in the ink at 25° C., if the penetrant has a boiling point higher than that of water and stays liquid in the ink at the ink temperature of 25° C.

Examples of the penetrant include a C8 to C11 polyol compound, and a glycol ether compound. At least some of the polyol compound and glycol ether compound improve the infiltration speed into paper and prevent bleeding and are partially water-soluble compounds having a solubility of 0.1% by mass to 4.5% by mass in water at 25° C.

Examples of the C8 to C11 polyol compound include 2-ethyl-1,3-hexanediol and 2,2,4-trimethyl-1,3-pentanediol.

Examples of the glycol ether compound include a polyalcohol alkyl ether compound and an polyalcohol aryl ether compound.

Examples of the polyalcohol alkyl ether compound include ethyleneglycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyalcohol aryl ether compound include ethylene glycol monophenyl ether and ethylene glycol monobenzyl ether.

The content of the penetrant as the liquid constituent having a boiling point higher than that of water and staying liquid in the ink at 25° C. is preferably 0% by mass to 10% by mass and more preferably 0.5% by mass to 5% by mass with respect to the total mass of the ink.

-Surfactant-

The surfactant is added where necessary as described above and included in the liquid constituents having a boiling point higher than that of water and staying liquid in the ink at the ink temperature of 25° C. as long as I has a boiling point higher than that of water and staying liquid in the ink at the ink temperature of 25° C.

The surfactant is not particularly restricted and can appropriately be selected from surfactants that do not impair stable dispersion depending on the combinations of a type of colorant, humectant, and penetrant, according to the purpose. Particularly for printing on printing paper, surfactants preferably have low surface tension and high leveling properties and can be at least one selected from a silicone surfactant and a fluorochemical surfactant. Among these, the fluorochemical surfactant is particularly preferable.

The fluorochemical surfactant has preferably 2 to 16 fluorine-substituted carbon atoms and more preferably 4 to 16 fluorine-substituted carbon atoms. When it has less than 2 fluorine-substituted carbon atoms, the efficacy of fluorine may not be obtained. When it has more than 16 fluorine-substituted carbon atoms, problems may occur for example with ink storage stability.

Examples of the fluorochemical surfactant include a perfluoroalkyl sulfonic acid compound, a perfluoroalkyl carvone compound, a perfluoroalkylphosphate ester compound, a perfluoroalkyl ethylene oxide adduct, and a polyoxyalkylene ether polymer compound having side-chain perfluoro alkylether groups. Among these, the polyoxyalkylene ether polymer compound having side-chain perfluoroalkyl ether groups is particularly preferable because of low foaming properties.

Examples of the perfluoroalkyl sulfonic acid compound include perfluoroalkyl sulfonic acid and perfluoroalkyl sulfonate.

Examples of the perfluoroalkyl carvone compound include perfluoroalkyl carboxylic acid and perfluoroalkyl carboxylate.

Examples of the perfluoroalkyl phosphate ester compound include perfluoroalkyl phosphate esters and perfluoroalkyl phosphate ester salts.

Examples of the polyoxyalkylene ether polymer compound having side-chain perfluoroalkyl ether groups include polyoxyalkylene ether polymer having side-chain perfluoroalkyl ether groups, sulfuric acid ester salts of polyoxyalkylene ether polymer having side-chain perfluoroalkyl ether groups, and salts of polyoxyalkylene ether polymer having side-chain perfluoro alkyl ether groups.

The counter ions of salts in the above fluorochemical surfactant include Li, Na, K, $NH_4$, $NH_3CH_2CH_2OH$, $NH_2(CH_2CH_2OH)_2$, and $NH(CH_2CH_2OH)_3$.

The fluorochemical surfactant can be synthesized as appropriate or commercially available product.

Examples of the commercially available product include Surfuron S-111, S-112, S-113, S-121, S-131, S-132, S-141, S-145 (ex. Asahi Glass); Fulllard FC-93, FC-95, FC-98, FC-129, FC-135, FC-170C, FC-430, FC-431 (ex. Sumitomo 3M); Megafack F-470, F1405, F-474 (all ex. Dainippon Ink and Chemicals); Zonyl TBS, FSP, FSA, FSN-100, FSN, FSO-100, FSO, FS-300, UR (ex. DuPont); FT-110, FT-250, FT-251, FT-400S, FT-150, FT-400SW (ex. Neos); PF-151N (ex. Omnova). Among these. FT-110, FT-250, FT-251, FT-400S, FT-150, and FT-400SW ex. Neos and PF-151N ex. Omnova are particularly preferable because of excellent print quality, particularly in color, and improved uniform staining on paper.

Specific examples of the fluorochemical surfactant having the structural formula below are preferable.

(1) Anionic Fluorochemical Surfactants

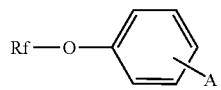

In the above structural formula, Rf is a mixture of hydrophobic fluorine-containing groups having the structural formulae below; and A is $—SO_3X$, $—COOX$, or $—PO_3X$ (in which X is a counter anion, more specifically a hydrogen atom, Li, Na, K, $NH_4$, $NH_3CH_2CH_2OH$, $NH_2(CH_2CH_2OH)_2$, or $NH(CH_2CH_2OH)_3$).

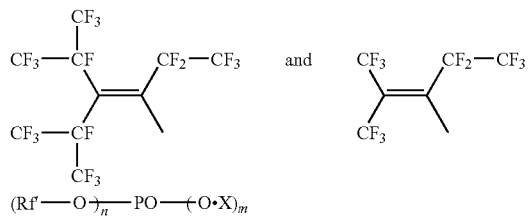

In the above structural formula, Rf' is a fluorine-containing group having the structural formula below; X has the same meaning as the above; n is an integer of 1 or 2; and m is 2-n.

$F—(CF_2CF_2)_n—CH_2CH_2—$

In the above structural formula, n is an integer in the range of from 3 to 10.

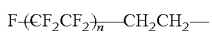

In the above structural formula, Rf' and X have the same meaning as the above.

In the above structural formula, Rf' and X have the same meaning as the above.

(2) Nonionic Fluorochemical Surfactants

In the above structural formula, Rf has the same meaning as the above; and n is an integer in the range from 5 to 20.

In the above structural formula, Rf' has the same meaning as the above; and n is an integer in the range from 1 to 40.

(3) Amphoteric Fluorochemical Surfactants

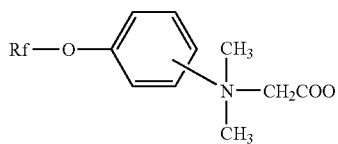

In the above structural formula, Rf has the same meaning as the above.

(4) Oligomeric Fluorochemical Surfactants

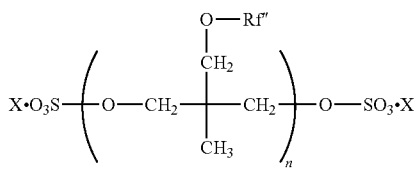

In the above structural formula, Rf'' is a fluorine-containing group having the structural formula below; n is an integer in the range from 0 to 10; and X has the same meaning as the above.

$F—(CF_2CF_2)_n—CH_2—$

In the structural formula, n is an integer in the range from 1 to 4.

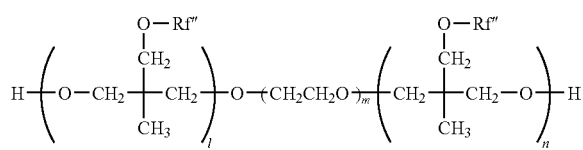

In the above structural formula, Rf'' has the same meaning as the above; l is an integer in the range from 0 to 10; m is an integer in the range from 0 to 10; and n is an integer in the range from 0 to 10.

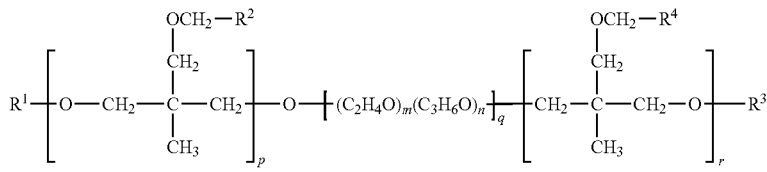

In the above structural formula, $R^1$ and $R^3$ are individually a hydrogen atom or a fluorine-containing group; $R^2$ and $R^4$ are individually a fluorine-containing group; m, n, p, and q are individually an integer. Here, the fluorine-containing groups of $R^1$ to $R^4$ are the same as in the above (2) or (4).

The silicone surfactant is not particularly restricted and can appropriately be selected according to the purpose. Those having high pH values but nondegradable are preferable, including side-chain modified polydimethylsiloxane, both-end modified polydimethylsiloxane, one-end modified polydimethylsiloxane, and side-chain and both-end modified polydimethylsiloxane. Those having polyoxyethylene groups and polyoxyethylenepolyoxypropylene groups as the modified group exhibit excellent properties as aqueous surfactants, and are particularly preferable.

Such surfactants can be synthesized as appropriate or commercially available products. Commercially available products can easily be obtained from BYK Chemie, Sin-Etsu Silicone, Toray/Dow Corning/Silicone, and others.

The polyether-modified silicone surfactant is not particularly restricted and can appropriately be selected according to the purpose. Examples thereof include a compound obtained by introducing the polyalkyleneoxide structure having the structural formula below in the Si side-chain of dimethylpolysiloxane.

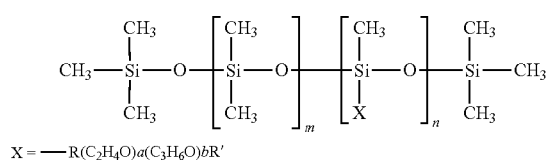

$X = -R(C_2H_4O)a(C_3H_6O)bR'$

In the above structural formula, m, n, a, and b are individually an integer; and R and R' are an alkyl or alkylene group.

The polyether-modified silicone compound can be synthesized as appropriate or commercially available products. Examples of commercially available products include KF-618, KF-642, and KF643 (ex. Shin-Etsu Chemical).

Anionic, nonionic, or amphoteric surfactants can be used other than the fluorochemical surfactant and silicone surfactant.

Examples of the anionic surfactant include polyoxyethylene alkyl ether acetate, dodecylbenzene sulfonate, succinate ester sulfonate, laurate, polyoxyethylene alkyl ether sulfate.

Examples of the nonionic surfactant include an acetylene glycol surfactant, polyoxyethylenealkylether, polyoxyethylene alkyl phenyl ether, polyoxyethylene alkyl ester, and polyoxyethylene sorbitan fatty acid ester.

Examples of the acetylene glycol surfactant include 2,4,7,9-tetramethyl-5-decyne-4,7-diol, 3,6-dimethyl-4-octyne-3,6-diol, 3,5-dimethyl-1-hexyne-3-ol. Examples of commercially available acetylene glycol surfactants include Surfinol 104, 82, 465, 485, and TG ex. Air Products (USA).

Examples of the amphoteric surfactant include laurylamino propionate, lauryldimethylbetaine, stearyldimethylbetaine, lauryldihydroxyethylbetaine, lauryldimethylamine oxide, myristyldimethylamine oxide, stearyldimethylamine oxide, dihydroxyethyllaurylamine oxide, polyoxyethylene coconut oil alkyldimethylamine oxide, dimethylalkyl(palm)betaine, and dimethyllaurylbetaine.

These surfactants are easily commercially available from Nikko Chemicals, Nihon Emulsion, Nippon Shokubai, Toho Chemical Industry, Kao, Adeka, Lion, Aoki Oil Industrial, Sanyo Chemical Industries, and others.

The surfactants are not restricted to the above described and they are used individually or in combination of two or more. Those that are not easily soluble in the recording ink by themselves may be soluble and stabilized after they are mixed.

Among the above surfactants, those having the structural formulae (1) to (5) are preferable.

$R^1-O-(CH_2CH_2O)_h-R^2$      Structural Formula (1)

In the above structural formula (1), $R^1$ is an alkyl group having 6 to 14 carbon atoms which may be branched or a perfluoro alkyl group having 6 to 14 carbon atoms which may be branched; $R^2$ is a hydrogen atom or an alkyl group having 1 to 4 carbon atoms which may be branched; and h is an integer in the range of from 5 to 20.

$R^1-COO-(CH_2CH_2O)_h-R^2$      Structural Formula (2)

In the above structural formula (2), $R^1$ is an alkyl group having 6 to 14 carbon atoms which may be branched; $R^2$ is a hydrogen atom or an alkyl group having 1 to 4 carbon atoms which may be branched; and h is an integer in the range of from 5 to 20.

Structural Formula (3)

In the above structural formula (3), $R^3$ is a hydrocarbon group such as an alkyl group having 6 to 14 carbon atoms which may be branched; and k is an integer in the range from 5 to 20.

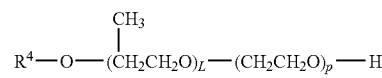

Structural Formula (4)

In the above structural formula (4), $R^4$ is a hydrocarbon group such an alkyl group having 6 to 14 carbon atoms which may be branched; L is an integer in the range from 5 to 10; and p is an integer in the range from 5 to 20. Propylene glycol and ethylene glycol chains can be block-polymerized or random-polymerized.

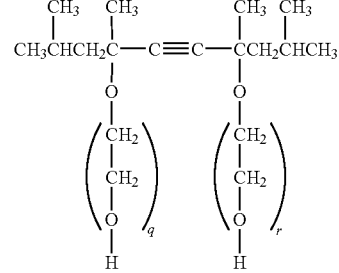

Structural Formula (5)

In the above structural formula (5), q and r are individually an integer in the range from 5 to 20.

The content of the surfactant in the recording ink is preferably 0.01% by mass to 3.0% by mass and more preferably 0.5% by mass to 2% by mass. The total amount of the liquid constituents having a boiling point higher than that of water and staying liquid in the ink at the ink temperature of 25° C. is 20% by mass or lower and preferably 15% by mass or lower. When the content of the surfactant is less than 0.01% by mass, no effect of the surfactant may be observed. When the content exceeds 3.0% by mass, the infiltration into the recording medium is unnecessarily increased. Then, reduced image densities or strike-through may be observed.

<Solid Constituents Including a Colorant and a Resin and Staying Solid in the Ink at the Ink Temperature of 25° C.>

The total amount of the resin constituent among the solid constituents is preferably 40% by mass or higher based on the total amount of the solid constituents including a colorant and a resin and staying solid in the ink at the ink temperature of 25° C. In addition, it is preferably 95% by mass or lower. When the content is lower than 40% by mass, the colorant may be deteriorated in fixing properties or glossy appearance. On the other hand, in order to improve image densities to certain degrees, the content of the colorant must be 5% by mass or higher based on the total amount of the solid constituents.

The reason that a high content of the resin constituent is used among the solid constituents is to achieve excellent fixing properties, clear images, and improved glossy appearance.

Here, the resin constituent means a solid polymer constituent other than colorant molecules carrying chromophores, and includes a resin enclosing a colorant or dispersing a colorant. The resin constituent also includes resin emulsion that is added where necessary.

Staying solid in the ink at the ink temperature of 25° C. means being solid in the ink at a normal temperature and pressure (25° C., at 1 atm) or in environments where inkjet printing is usually used.

-Resin-

The resin is not particularly restricted and can appropriately be selected according to the purpose as long as it stays solid in the ink at the ink temperature of 25° C. Resin particles are preferable because a large amount of resin can be added.

The resin particles are dispersed in water as a continuous phase to form a resin emulsion for use in ink production. The resin emulsion can contain a dispersant such as a surfactant where necessary.

Generally, the content of the resin particels as the dispersion phase constituent (the content of resin particles in the resin emulsion: not the content in the final recording ink) is preferably 10% by mass to 70% by mass.

The resin particles preferably have a volume average particle size of 10 nm to 1,000 nm and more preferably 100 nm to 300 nm particularly in consideration of use in inkjet recording apparatuses. This is the particle size in the resin emulsion. However, if the recording ink is stable, there is no significant difference between the particle size in the resin emulsion and the particle size of the resin particles in the recording ink. A larger amount of the emulsion can be added as the volume average particle size is larger. When the volume average particle size is smaller than 100 nm, the mixing rate of the emulsion may not be increased. When it exceeds 300 nm, the reliability may be lowered. However, it does not necessarily mean that the emulsion having a particle size outside the above range cannot be used. This is the general tendency regardless of types of the emulsion.

The volume average particle size can be measured using a particle size analyzer (Microtrack MODEL UPA9340 ex. NIKKISO).

More specifically, the emulsion is diluted to within the optimum signal level range and measured under the conditions such as transparency—YES, presumably refractive index 1.49, partial density 1.19, spherical particles—YES, and medium—water. Here, the value at 50% is assumed to be the volume average particle size.

The resin particles in the dispersion phase are not particularly restricted and can appropriately be selected according to the purpose. Their examples include urethane resin, polyester resin, acrylic resin, vinyl acetate resin, styrene resin, butadiene resin, styrene-butadiene resin, vinyl chloride resin, acryl styrene resin, and acrylic silicone resin.

The resin emulsion can be synthesized as appropriate or commercially available products.

Commercially available resin emulsions include Microgel E-1002, E-5002 (styrene-acrylic resin emulsion, ex. Nippon Paint), Boncoat 4001 (acrylic resin emulsion, ex. Dainippon Ink and Chemicals), Boncoat 5454 (styrene-acrylic resin emulsion, ex. Dainippon Ink and Chemicals), SAE-1014 (styrene-acrylic resin emulsion, ex. Nippon Zeon), Saibinol SK-200 (acrylic resin emulsion, ex. Saiden Chemical Industry), Primal AC-22, AC-61 (acrylic resin emulsion, ex. Rohm and Haas), Nanocryl SBCX-2821, 3689 (acrylic silicone resin emulsion, ex. Toyo Ink), #3070 (methyl methacrylate polymer resin emulsion, ex. Mikuni Color). Among these, acrylic silicone emulsion is particularly preferable because of excellent fixing properties.

The glass-transition temperature of the resin constituent in the acrylic silicone emulsion is preferably 25° C. or lower and more preferably 0° C. or lower. When the glass-transition temperature exceeds 25° C., the resin itself becomes fragile, which may deteriorate the fixing properties. The fixing properties may deteriorate particularly on printing paper that is smooth and difficult to absorb water. However, it does not necessarily mean that a glass-transition temperature of 25° C. or higher cannot be used.

The glass-transition temperature can be measured using a differential scanning calorimeter (ex. Rigaku Denki). More specifically, a resin piece from a resin emulsion film dried at a room temperature is heated from around −50° C. by a Rigaku Denki differential scanning calorimeter and the temperature at which steps appear is obtained.

-Colorant-

The colorant is not particularly restricted and both a pigment and a dye can preferably be used as long as they are solid in the ink at the ink temperature of 25° C.

When the colorant is a pigment, the ink has excellent light stability. The pigment is not particularly restricted and conventional inkjet pigments can be used. Preferable examples include:

(1) a pigment having a hydrophilic group on the surface thereof;
(2) a polymer emulsion pigment prepared by introducing into polymer particles a coloring material having insolubility or poor solubility to water; and
(3) a microcapsulated pigment formed by coating a pigment with a resin having a hydrophilic group.

The pigment of the above (1) has the surface modified so that at least one hydrophilic group is bonded thereto directly or via another atomic group. The surface is modified by chemically bonding a specific functional group (functional groups such as a sulfone group or carboxyl group) to the pigment surface or wet oxidizing the pigment surface with at least one of hypohalous acid and a salt thereof. Among these, the pigment having carboxyl groups bonded to the surface and dispersed in water are particularly preferable. Having the surface modified so that carboxyl groups are bonded thereto, the pigment is dispersed in more stable manner and high quality print is obtained. In addition, the printed recording medium has improved water-resistance.

The above described ink has excellent redispersibility after dried. Therefore, it does not cause any clogging even after the moisture in the ink around the nozzles of the inkjet head evaporates during a prolonged unused period. Only simple cleaning is necessary for good printing.

The volume average particle size of the self-dispersible pigment is preferably 0.01 μm to 0.16 μm in the ink.

For example, self-dispersible carbon black is preferably ionic and suitably anionic or cationic.

Examples of the anionic hydrophilic group include —COOM, —$SO_3M$, —$PO_3HM$, —$PO_3M_2$, —$SO_2NH_2$, —SO$_2$NHCOR (here, M is a hydrogen atom, alkali metal, ammonium, or organic ammonium; and R is an alkyl group having 1 to 12 carbon atoms, phenyl group that may have a substituent, or naphthyl group that may have a substituent). Among these, those having —COOM and —SO$_3$M on the color pigment surface are preferably used.

The alkali metal for "M" in the hydrophilic groups can be, for example, lithium, sodium, or kalium. The organic ammonium can be, for example, mono- or tri-methyl ammonium, mono- or tri-ethyl ammonium, or mono- or tri-methanol ammonium. The attachment of —COONa to the color pigment surface to obtain an anionic color pigment can be done through oxidization of the color pigment with soda hypochlorite, sulfonation, or reaction of diazonium salts.

For example, the cationic hydrophilic groups are preferably quaternary ammonium groups. The quaternary ammonium groups below are particularly preferable. In the present invention, carbon black having any of these bonded to the surface are suitable coloring materials.

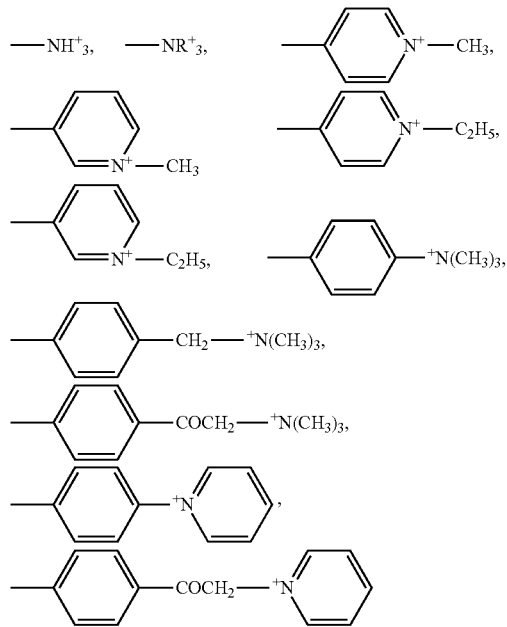

The method of producing the cationic self-dispersible carbon black having a hydrophilic group bonded thereto is not particularly restricted and can appropriately be selected according to the purpose. For example, a method of bonding N-ethylpyridyl group having the structural formula below is to treat the carbon black with 3-amino-N-ethylpyridinium bromide.

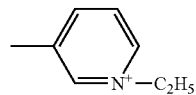

The hydrophilic group can be bonded to the carbon black via another atomic group. Examples of the other atomic group include an alkyl group having 1 to 12 carbon atoms, phenyl group that may have a substituent, and naphtyl group that may have a substituent. Specific examples of the hydrophilic group bonded to the carbon black surface via another atomic group include —C$_2$H$_4$COOM (here, M is an alkali metal or quaternary ammonium), —PhSO$_3$M (here, Ph is a phenyl group; M is an alkali metal or quaternary ammonium), and —C$_5$H$_{10}$NH$_3^+$.

In the pigment of the above (2), the polymer emulsion containing a coloring material means at least one of the pigments introduced in polymer particles and the pigments attached to the surface of polymer particles. Their examples include those described in Japanese Patent Application Laid-Open (JP-A) No. 2001-139849.

Here, it is unnecessary that all pigments are introduced in or attached to polymer particles. The pigments can be dispersed in the emulsion to the extent that the efficacy of the present invention is not impaired.

The term "insolubility or poor solubility to water" means that 10 parts by mass or less coloring material are dissolved in 100 parts by mass of water at 20° C. The term "soluble" means that there is no visible coloring material separated or precipitated in the surface or bottom layer of the aqueous solution.

The polymers constituting the polymer emulsion are not particularly restricted and can appropriately be selected according to the purpose. Their examples include vinyl polymers, polyester polymers, polyurethane polymers, and polymers described in Japanese Patent Application Laid-Open (JP-A) No. 2000-53897 and Japanese Patent Application Laid-Open (JP-A) No. 2001-139849. Among these, vinyl polymers and polyester polymers are particularly preferable.

The volume average particle size of the polymer particles containing the coloring material (colored particles) in the ink is preferably 0.01 μm to 0.16 μm.

Using the pigment of the above (2) yields an ink excellent in light stability and fixing properties.

The pigment of the above (3) is a pigment coated with a hydrophilic and insoluble resin so that the pigment becomes hydrophilic because of the resin layer of the pigment surface, whereby the pigment is dispersive in water. Examples thereof include those described in Japanese Patent Application Laid-Open (JP-A) No. 2002-67473.

Using the pigment of the above (3) yields an ink excellent in light stability and fixing properties.

The pigments of the above (2) and (3) are similar in that the pigment and resin are integrated and suitably used in the present invention.

The pigments of the above (1), (2), and (3) are excellent in drying properties and hue when used at the ink composition ratio of the present invention.

The coloring constituent of the colorant are not particularly restricted and can appropriately be selected according to the purpose. They can be either an inorganic pigment or organic pigment.

Examples of the inorganic pigment include titanium oxide, iron oxide, calcium carbonate, barium sulfate, aluminum hydroxide, barium yellow, cadmium red, chrome yellow, and carbon black. Among these, carbon black is preferable. Examples of the carbon black include those produced by a known technique such as contact, furnace, and thermal techniques.

Examples of the organic pigment include azo pigments, polycyclic pigments, dye chelates, nitro pigments, nitroso pigments, and aniline black. Among these, azo pigments and polycyclic pigments are further preferable. Examples of the azo pigments include azo lake, insoluble azo pigments, condensed azo pigments, and chelate azo pigments. Examples of the polycyclic pigments include phthalocyanine pigment, perylene pigment, perynone pigment, anthraquinone pigment, quinacridone pigment, dioxane pigment, indigo pigment, thioindigo pigment, isoindolinone pigment, and quinofuraron pigment. Examples of the dye chelates include basic dye chelates and acidic dye chelates.

The color of the pigment is not particularly restricted and can appropriately be selected according to the purpose. Some are black and some have colors. They can be used individually or in combination of two or more. Examples of a black pigment include carbon black such as furnace black, lamp black, acetylene black, and channel black (C.I. pigment black 7), metals such as copper, iron (C.I. pigment black 11), and titanium oxide, and organic pigments such as aniline black (C.I. pigment black 1).

Examples of color pigments include, for yellow ink, C.I. pigment yellow 1 (fast yellow G), 3, 12 (diazo yellow AAA), 13, 14, 17, 23, 24, 34, 35, 37, 42 (yellow iron oxide), 53, 55, 74, 81, 83 (diazo yellow HR), 95, 97, 98, 100, 101, 104, 108, 109, 110, 117, 120, 128, 138, 150, and 153.

Examples for magenta include C.I. pigment red 1, 2, 3, 5, 17, 22 (brilliant fast scarlet), 23, 31, 38, 48: 2 (permanent red 2B (Ba)), 48: 2 (permanent red 2B (Ca)), 48: 3 (permanent red 2B (Sr)), 48: 4 (permanent red 2B (Mn)), 49: 1, 52: 2, 53: 1, 57: 1 (brilliant carmine 6B), 60: 1, 63: 1, 63: 2, 64: 1, 81 (rhodamine 6G lake), 83, 88, 92, 101 (colcothar), 104, 105, 106, 108 (cadmium red), 112, 114, 122 (dimethyl quinacridone), 123, 146, 149, 166, 168, 170, 172, 177, 178, 179, 185, 190, 193, 209, and 219.

Examples for cyan include C.I. pigment blue 1, 2, 15 (copper phthalocyanine blue R), 15: 1, 15: 2, 15: 3 (phthalocyanine blue G), 15: 4, 15: 6 (phthalocyanine blue E), 16, 17: 1, 56, 60, 63.

Examples for intermediate colors such as red, green, and blue include C.I. pigment red 177, 194, 224; C.I. pigment orange 43; C.I. pigment violet 3, 19, 23, 37; C.I. pigment green 7, and 36.

When the colorant is a dye, the ink has excellent hue. Examples of the dye include oil-soluble dyes and disperse dyes.

The recording ink preferably has a resin content of 40% by mass to 95% by mass baaed on the total solid content (for example the total amount of resins and colorants). Therefore, the content of the colorants is preferably 60% by mass or lower. In this calculation, the resin constituents include resins containing colorants therein. In other words, the total resin content including resins containing colorant in the total solid content=resins+colorants is 40% by mass or higher.

The above mentioned other constituents are not particularly restricted and can appropriately be selected according to the purpose. Examples of the other constituents include an antifoaming agent, an antiseptic/mildew proofing agent, corrosion inhibitor, pH adjuster, specific resistance adjuster, antioxidant, ultraviolet absorbent, oxygen absorbent, light stabilizer, and viscosity modifier.

The antifoaming agent is not particularly restricted and can appropriately be selected according to the purpose. Preferable examples of the antifoaming agent include silicone-based antifoaming agent, polyether-based antifoaming agent, and fatty acid ester-based antifoaming agent. They can be used individually or in combination of two or more. Among these, silicone-based antifoaming agent is preferable because of excellent foam breaking properties.

Examples of the silicone-based antifoaming agent include oil silicone antifoaming agent, compound silicone antifoaming agent, self-emulsifying silicone antifoaming agent, emulsion silicone antifoaming agent, and modified silicone antifoaming agent. Examples of the modified silicon antifoaming agent include amino-modified silicon antifoaming agent, carbinol-modified silicon antifoaming agent, methacryl-modified silicon antifoaming agent, polyether-modified silicon antifoaming agent, alkyl-modified silicon antifoaming agent, higher fatty acid ester-modified silicon antifoaming agent, and alkylene oxide-modified silicon antifoaming agent. Among these, considering the use with the recording ink that is an aqueous medium, the self-emulsifying silicone antifoaming agent and emulsion silicone antifoaming agent are preferable.

The antifoaming agent can be commercially available products. Examples of commercially available products include silicone antifoaming agents ex. Shin-Etsu Chemical (such as KS508, KS531, KM72, and KM85), silicone antifoaming agents ex. Toray/Dow Corning (such as Q2-3183A and SH5510), silicone antifoaming agents ex. Nihon Unica (such as SAG 30), and silicone antifoaming agents ex. Asahi Denka (such as Adekanate series).

The content of the antifoaming agent in the recording ink is not particularly restricted and can appropriately be selected according to the purpose. For example, the content is preferably 0.001% by mass to 3% by mass and more preferably 0.05% by mass to 0.5% by mass.

Examples of the antiseptic/mildew proofing agent include 1,2-benzisothiazolin-3-one, sodium dehydroacetate, sodium sorbate, 2-pyridinethiol-1-oxide sodium, sodium benzoate, and pentachlorophenol sodium.

As the specific resistance adjuster, for example, organic salts such as alkali metal halides and ammonium halide (such as lithium chloride, ammonium chloride, and sodium chloride) can be added to prepare a recording solution used in the inkjet recording method in which the recording ink is charged.

The pH adjuster is not particularly restricted and any substances can be used according to the purpose as long as they do not adversely affect the formulated ink and are capable of adjusting the pH for 7 or higher. Examples of the pH adjuster include amines such as diethanolamine and triethanolamine; alkali metal hydroxides such as lithium hydroxide, sodium hydroxide, and kalium hydroxide; ammonium hydroxide, quaternary ammonium hydroxide, quaternary phosphonium hydroxide, alkali metal carbonates such as lithium carbonate, sodium carbonate, and kalium carbonate; and aminopropanediol derivatives.

The aminopropanediol derivatives are water-soluble organic acidic compounds such as 1-amino-2,3-propanediol, 1-methylamino-2,3-propanediol, 2-amino -2-methyl-1,3-propanediol, and 2-amino -2-ethyl-1,3-propanediol.

Examples of the corrosion inhibitor include acidic sulfite, sodiumthiosulfate, ammon thioglycolate, diisopropylammonium nitrite, pentaerythritol tetranitrate, and dicyclohexylammonium nitrite.

Examples of the antioxidant include phenol-based antioxidants (including hindered phenol-based antioxidants), amine-based antioxidants, sulfur-based antioxidants, phosphorus-based antioxidants.

Examples of the phenol-based antioxidants (including hindered phenol antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]2,4,8,10-tetraixaspiro[5,5]undecan, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3-(3',5'-di-tert-butyl-4'-hydroxyphenyl)propionate]methane.

Examples of the amine-based antioxidants include phenyl-β-naphthylamine, α-naphthylamine, N,N'-di-sec-butyl-p- phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3 (3,5-di-tert-butyl-4-hydroxyphenyl)propionate]methane, and 1,1,3-tris(2-methyl-4-hydroxy-5-tert-butylphenyl) butane. Examples of the sulfur-based antioxidants include dilauryl-3,3'-thiodipropionate, distearyl thiodipropionate, laurylstearyl thiodipropionate, dimyristyl-3,3'-thiodipropionate, ditearyl β,β'-thiodipropionate, 2-mercaptobenzoimidazole, and dilaurylsulfide. Examples of the phosphorus-based antioxidants include triphenyl phosphate, octadecyl phosphate, triisodecyl phosphate, trilauryltrithio phosphate, and trinonylphenyl phosphate.

Examples of the ultraviolet absorbent include benzophenone-based ultraviolet absorbents, benzotriazole-based ultraviolet absorbents; salicylate-based ultraviolet absorbents, cyanoacrylate-based ultraviolet absorbents, and nickel complex salt-based ultraviolet absorbents.

Examples of the benzophenone-based ultraviolet absorbents include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.
Examples of the benzotriazole-based ultraviolet absorbents include 2-(2'-hydroxy-5-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate-based ultraviolet absorbents include phenyl salicylate, p-tert-butylphenyl salicylate, and p-octylphenyl salicylate.
Examples of the cyanoacrylate-based ultraviolet absorbents include ethyl-2-cyano-3,3'-diphenylacrylate, methyl-2-cyano-3-methyl-3-(p-methoxyphenyl)acrylate, and butyl-2-cyano-3-methyl-3-(p-methoxyphenyl)acrylate. Examples of the nickel complex salt-based ultraviolet absorbents include nickel bis(octylphenyl)sulfide, 2,2'-thiobis(4-tert-octylferate)-N-butylamine nickel (II), 2,2'-thiobis(4-tert-octylferate)-2-ethylhexylamine nickel (II), and 2,2'-thiobis(4-tert-octylferate)triethanolamine nickel (II).

The recording ink of the present invention is produced by dispersing or dissolving in an aqueous medium solid constituents including a colorant and a resin and staying solid in the ink at the ink temperature of 25° C., liquid constituents having a boiling point higher than that of water and staying liquid in the ink at the ink temperature of 25° C., and water and, where necessary, other constituents and, where necessary, stirring and mixing the dispersion or solution. Generally, the colorant and resin are previously dissolved or dispersed in water. The dispersing can be done using a sand mill, homogenizer, ball mill, paint shaker, or ultrasonic disperser. The stirring/mixing can be done using a stirrer with ordinary blades, magnetic stirrer, or high speed disperser.

-Measurement of Solid Constituents and Liquid Constituents-

The amount of the solid constituents staying solid in the ink at the ink temperature of 25° C. and the amount of the liquid constituents having a boiling point higher than that of water and staying liquid in the ink at the ink temperature of 25° C. can be calculated when the formula of the ink is known. When the formula of the ink is unknown, for example, only the solid constituents are separated from the ink for measurement. For separation, the ink is subject to centrifugal separation at 500,000 G or higher at 25° C. for 24 hours, whereby the solid constituents in the ink precipitate and the liquid and solid contents are separated. Depending on the types of colorants and water-dispersible resins, the liquid and solid constituents can be separated by salting out or aggregation with solvents. The separated solid content is dried before measurement.

When the colorant is a pigment, the mass reduction rate can be evaluated by thermogravimetry to determine the ratio of the colorant to the resins. For measurement, the changes in mass are measured after heating to 500° C. at a rate of 10° C./min in an inert gas atmosphere in order to reduce burning of the resin or pigment. The solid content contains slight moisture and the humectant even after the solid-liquid separation. Therefore, the mass at 200° C. at which these constituents are almost absent is assumed to be the total solid content mass. The mass at 500° C. at which many resin constituents are thermally decomposed and evaporate is assumed to be the pigment mass. Then, the ratio of the pigment to the resin is obtained by the pigment mass/(the total solid content mass− the pigment mass).

When the pigment has low heat-resistance such as some azo pigments, the pigment is thermally decomposed by 500° C. Therefore, it is difficult to determine the pigment content. However, the pigment content can be obtained by dissolving the resin constituents in a solvent and extracting the solid content in the solvent. The pigment content in the solid content is obtained based on the masses before and after the extraction. The total solid mass is obtained by the thermogravimetry. Then, the solid mass of the pigment can be calculated by the sample mass x the pigment ratio.

When the molecular structure of the colorant is known, the solid content for the colorant can be determined by using NMR for the pigment and dye and using fluorescent X-ray analysis for heavy metal atoms, an inorganic pigment contained in the molecular skeletons, a metallized organic pigment, and a metallized dye.

The liquid constituents can be qualitatively and quantitatively analyzed for example by gas chromatography (such as GC and GC-AED).

The physical properties of the recording ink of the present invention are not particularly restricted and can appropriately be selected according to the purpose. For example, the viscosity, surface tension, and pH are preferably in the ranges below.

The viscosity of the recording ink is 10 mPa·s or lower at 25° C. and preferably 5 mPa·s or lower at 25° C. The lower limit value of the viscosity is preferably 1.5 mPa·s. When the viscosity exceeds 10 mPa·s, it may be difficult to ensure the stable dispensing, the drying properties may be deteriorated, or beading property may be degraded. However, depending on the head structure, it does not mean that such viscosity cannot be used.

The surface tension of the recording ink is preferably 35 mN/m or lower at 25° C. and more preferably 30 mN/m or lower at 25° C. When the surface tension exceeds 35 mN/m, it is difficult for the ink to level out on the recording medium, whereby the drying time may be increased.

The pH of the recording ink is preferably, for example, 7 to 10.

The coloring of the recording ink of the present invention is not particularly restricted and can appropriately be selected according to the purpose. Yellow, magenta, cyan, and black can be selected. An ink set including two or more of these colors can be used for recording multicolor images. An ink set including all of these colors can be used for recording full color images.

The recording ink of the present invention can preferably be used in printers having any inkjet head including the piezo type inkjet head in which a piezoelectric element as a pressure generation means for pressurizing ink within the ink channel is used to deform the diaphragm forming a wall of the ink channel and change the capacity of the ink channel to eject ink droplets (see Japanese Patent Application Laid-Open (JP-A) No. 02-51734), thermal type inkjet head in which an exothermic resistor is used to heat ink within the ink channel to generate bubbles (see Japanese Patent Application Laid-Open (JP-A) No. 61-59911), and electrostatic inkjet head in which a diaphragm forming a wall of the ink channel and an electrode face each other and electrostatic force generated between the diaphragm and the electrode is used to deform the diaphragm and change the capacity of the ink channel to eject ink droplets (see Japanese Patent Application Laid-Open (JP-A) No. 06-71882).

The recording ink of the present invention can preferably be used in various applications and preferably be used in image recording apparatuses (such as printers) of the inkjet recording system. For example, the recording ink of the present invention can be used in printers having the function to heat the recorded paper and recording ink to 50 to 200° C. during, before, or after the printing so as to urge the fixing of printing. The recording ink of the present invention can particularly preferably be used in the ink cartridge, ink recorded matter, inkjet recording apparatus, and inkjet recording method of the present invention below.

(Ink Cartridge)

The ink cartridge of the present invention has the recording ink of the present invention contained in a container and, where necessary, further has other appropriately selected members.

The container is not particularly restricted and its shape, structure, size, material can appropriately be selected according to the purpose. For example, those having an ink pouch formed by an aluminum laminated film or resin film are preferable.

Figure 2:
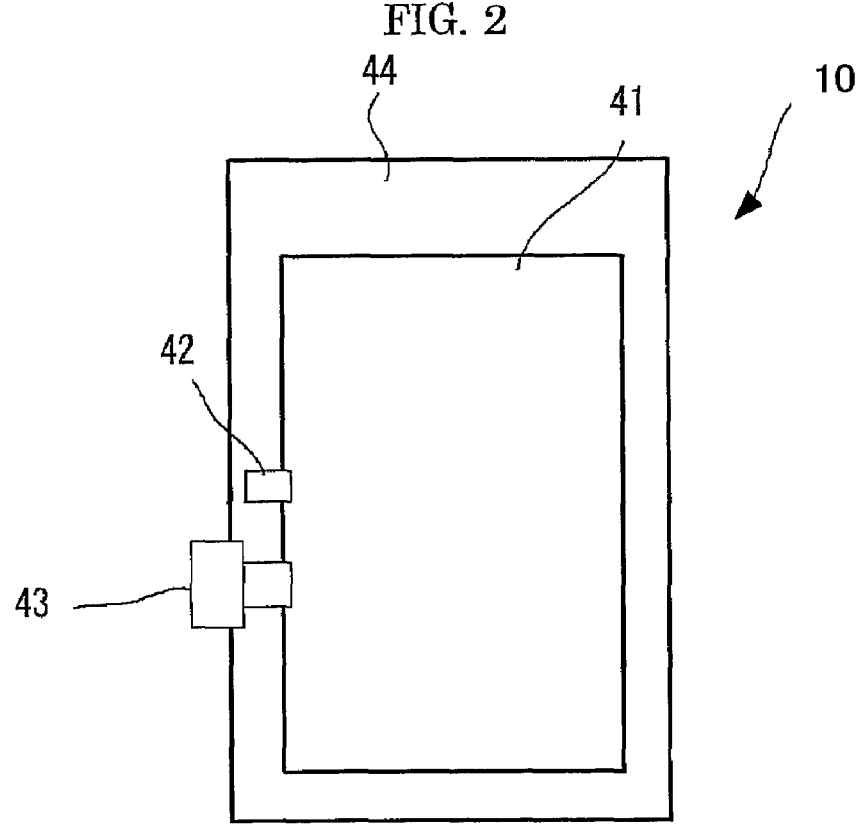
FIG. 2 is an illustration of the ink cartridge in FIG. 1 including a case.

The ink cartridge is described hereafter with reference to FIGS. 1 and 2. FIG. 1 is an illustration showing an exemplary ink cartridge 10 of the present invention. FIG. 2 is an illustration showing the ink cartridge 10 including a case (exterior).

As shown in FIG. 1, the ink cartridge 10 has an ink pouch 41 that is filled through an ink inlet 42. The ink inlet 42 is fused to close after the inlet pouch 41 is evacuated. A rubber ink outlet 43 is pierced by a needle provided to the apparatus body for use.

The ink pouch 41 is made of a wrapping material such as a non-permeable aluminum laminated film. As shown in FIG. 2, the ink pouch 41 is generally housed in a plastic cartridge case 44, which is detachably installed in various inkjet recording apparatuses.

(Inkjet Recording Apparatus and Inkjet Recording Method)

The inkjet recording apparatus of the present invention at least has an ink ejection unit and, where necessary, further has other appropriately selected units such as a stimulus generation unit and control unit.

The inkjet recording method of the present invention at least includes an ink ejection step and, where necessary, further includes other appropriately selected steps such as stimulus generation step and control step.

The inkjet recording method of the present invention is preferably realized by the inkjet recording apparatus of the present invention. The ink ejection step is preferably realized by the ink ejection unit. The other steps are preferably realized by the other units.

-Ink Ejection Step and Ink Ejection Unit-

The ink ejection step is a step of applying a stimulus to the recording ink of the present invention so as to eject the recording ink for forming images.

The ink ejection unit is a unit configured to applying a stimulus to the recording ink of the present invention so as to eject the recording ink for forming images. The ink ejection unit is not particularly restricted and can appropriately be selected according to the purpose. For example, various recording heads (ink dispensing heads) can be used. Particularly, those having a head with multiple rows of nozzles and sub tanks for holding liquid supplied from liquid storage tanks and supplying the liquid to the head are preferable.

The sub tank preferably has a negative pressure generation means for generating a negative pressure within the sub tank, an air release means for releasing air within the sub tank, and a detection means for detecting the presence or absence of ink based on difference in electric resistance.

The stimulus is generated by the stimulus generation unit. The stimulus is not particularly restricted and can appropriately be selected according to the purpose. Examples of the stimulus include heat (temperature), pressure, vibration, and light. They can be used individually or in combination of two or more. Among these, heat and pressure are preferable.

Examples of the stimulus generation unit include a heating unit, pressurizing unit, piezoelectric element, vibration generator, ultrasonic wave oscillator, and light. More specifically, piezoelectric actuators such as piezoelectric elements, thermal actuators using an electothermal converter such as an exothermic resistor to use phase changes due to liquid film boiling, shape-memory alloy actuators using changes in metal phase due to temperature changes, and static actuators using electrostatic force can be used.

The ejection mode of the recording ink is not particularly restricted and can vary depending on the type of the stimulus. For example, when the stimulus is "heat," thermal energy corresponding to recording signals is applied to the recording ink within the recording head, for example, by a thermal head so that the thermal energy causes the recording ink to foam. Then, the pressure from the foam serves to eject the recording ink from the nozzle orifice of the recording head as droplets. When the stimulus is "pressure," for example, pressure is applied to a piezoelectric element attached to a pressure chamber in the ink channel within the recording head. The piezoelectric element is bent, and the capacity of the pressure chamber is reduced, whereby the recording ink is ejected through the nozzle orifice of the recording head as droplets.

Applying a pressure to a piezoelectric element to eject the recording ink is a preferable method. The piezo system does not generate heat and, therefore, is advantageous for ejecting ink containing resins. Particularly, it is a useful method for less clogging when ink contains a small amount of humectants.

It is preferable to apply to the piezo element a voltage that does not cause it to eject ink for idle scanning in order to prevent the leaky nozzle. It is further preferable to eject ink to the ink reservoir before reaching the idle scanning equivalent to one page printing.

It is further preferable to have a scraping unit configured to scrape off the ink adhered to the idle dispense receiver. The scraping unit is preferably one of a wiper and a cutter.

The control unit is not particularly restricted and can appropriately be selected according to the purpose as long as the movements of other units can be controlled. Examples of the control unit include sequencers and computers.

It is preferable that the ink ejection unit has an ink-repellant layer on the plate surface of the inkjet head for ejecting ink where the ink dispensing opening is formed.

The surface roughness of the ink-repellant layer (Ra) is preferable 0.2 μm or lower. With the surface roughness being 0.2 μm or lower, unwiped residue can be reduced in the wiping operation.

FIGS. 13 and 14A to 14C are cross-sectional views of the nozzle plate of the inkjet head used in the present invention.

In this embodiment, a nozzle plate 232 that is a plate base of the inkjet head is formed by electroforming Ni. An ink-repellant coating 231, which is a silicone resin coating having a thickness of 1 Å (0.1 nm) or larger, is formed on the surface of the nozzle plate 232. The surface roughness (Ra) of the ink-repellant coating 231 is preferably 0.2 μm or lower. The ink-repellant coating 231 preferably has a thickness of 0.1 μm or larger and more preferably 0.5 μm or larger.

Figure 14A:
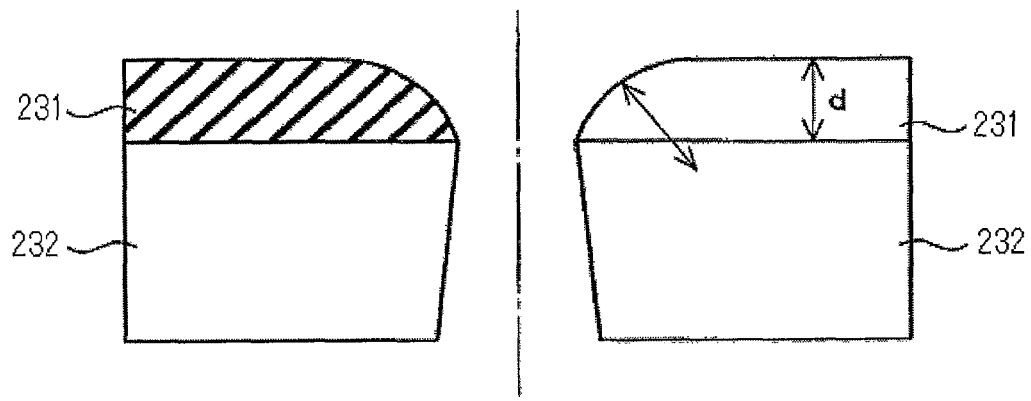
FIG. 14A is a schematic illustration for explaining the nozzle plate of the inkjet head of the inkjet recording apparatus of the present invention.
Figure 14B:
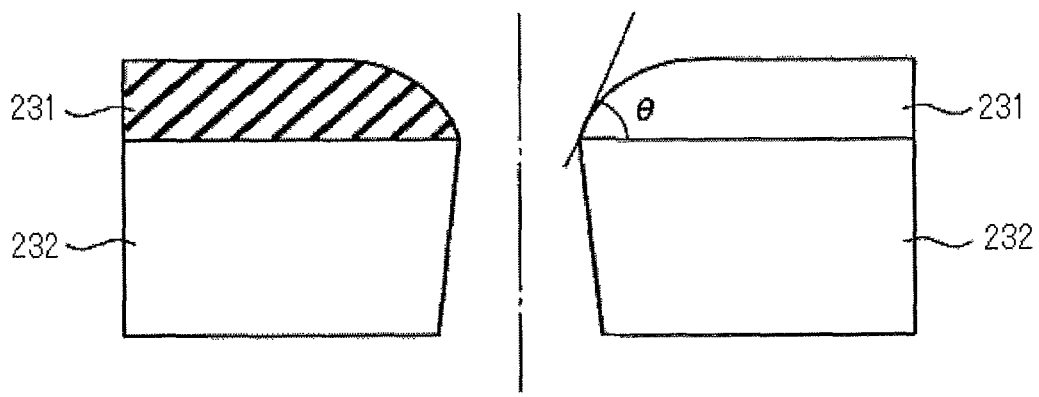
FIG. 14B is a schematic illustration for explaining the nozzle plate of the inkjet head of the inkjet recording apparatus of the present invention.
Figure 14C:
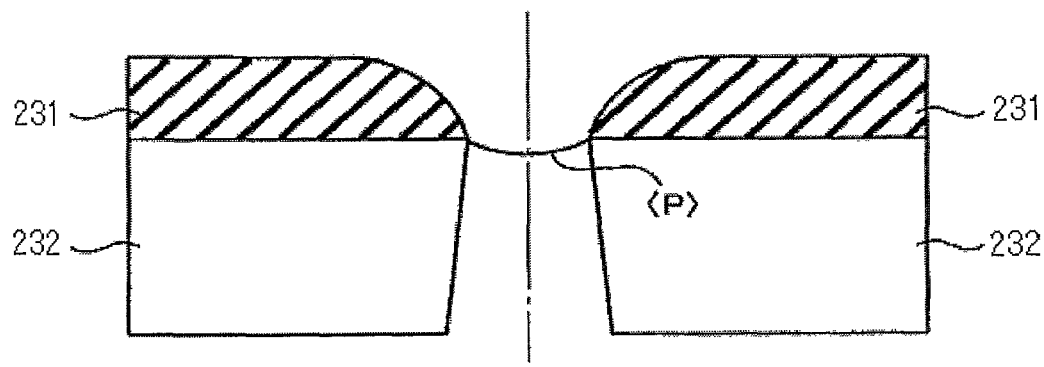
FIG. 14C is a schematic illustration for explaining the nozzle plate of the inkjet head of the inkjet recording apparatus of the present invention.

When filled with ink, a meniscus (liquid surface) P is formed on the border between the ink-repellant coating 231, or the silicone resin coating, and the nozzle plate 232 as shown in FIG. 14C.

The ink-repellant layer formed on the plate surface where the ink dispensing opening (nozzle) of the inkjet head has the cross-section around the opening in a plane perpendicular to the center line of the opening that is increased in area as the distance from the plate base surface is increased.

The ink-repellant coating preferably has a curved surface around the opening. It is further preferable that the radius of curvature of the curved surface of the ink-repellant coating around the opening in cross-section in a plane perpendicular to the center line of the opening is equal to or larger than the thickness of the ink-repellant coating.

It is further preferable that the curved line of the ink-repellant coating around the opening from the opening edge in cross-section in a plane perpendicular to the center line of the opening is nearly in the form of an arc and the radius of curvature of the arc is equal to or larger than the thickness of the ink-repellant coating.

It is further preferable that the tangent at the opening edge of the ink-repellant coating in cross-section in a plane perpendicular to the center line of the opening makes an angle of less than 90 degrees with the surface of the nozzle member including that edge.

The opening of the nozzle plate 232 is formed in the manner that the cross-section in a plane perpendicular to the center line indicated by dashed lines in FIGS. 14A to 14C is nearly circular around the center line. The ink-repellant coating 231 is formed on the ink dispensing surface of the nozzle plate 232 in the manner that the cross-section of the opening in a plane perpendicular to the center line is gradually increased in area as the distance from the nozzle 232 is increased.

More precisely, the opening of the ink-repellant coating 231 is rounded in the manner that the curved line around the opening from the opening edge of the nozzle plate 32 has a radius of curvature of r. The radius of curvature r is preferably equal to or larger than the thickness of the ink-repellant coating 231 excluding the part around the opening.

The thickness d is the thickness of the ink-repellant coating 231 excluding the rounded part or the opening and preferably equal to the largest thickness of the ink-repellant coating.

As described above, the opening of the ink-repellant coating 231 that is continued from the opening of the nozzle plate 232 has nearly no pointed end (in the form of a smooth curved line with no pointed part) without any trapping parts. Therefore, even if a rubber wiper is used for wiping, some inconvenience such as that a pointed end traps the wiper and causes the ink-repellant coating 231 to peel off from the nozzle plate 232 is prevented.

As shown in FIG. 14B, it is preferable that the tangent at the opening edge of the ink-repellant coating 231 in the cross-section in a plane containing the center line of the opening of the nozzle plate 232 makes an angle of less than 90 degrees with the surface of the nozzle plate 232 containing the opening edge of the nozzle plate 232 abutting against that opening edge.

When the angle between the tangent at the opening edge of the ink-repellant coating 231 and the surface of the nozzle plate 232 is less than 90 degrees as described above, a stable meniscus (liquid surface) P is formed on the boarder between the ink-repellant coating 231 and the nozzle plate 232 as shown in FIG. 14C. Then, the possibility of the meniscus being formed at other positions can significantly be reduced. Since the meniscus surface position is stabilized, ink ejection for forming images in an imaging apparatus using the inkjet head having the nozzle plate 232 is significantly stabilized.

The silicone resin used in this embodiment is preferably room-temperature curing liquid silicone resins and more preferably involves hydrolysis reaction. SR 2411 ex. Toray/Dow Corning was used in the examples described later.

Table 1 below shows the shape of the nozzle plate 232 at and around the opening edge and results of evaluation on ink residue around the nozzle, peeled edge; and stability of ejection in the ink-repellant coating 231 of the inkjet head of this embodiment.

TABLE 1

| edge shape | | ink residue | peeled edge | stability of ejection |
| --- | --- | --- | --- | --- |
| pointed end | | partly observed | peeled | good |
| no pointed part (rounded) | θ ≦ 90° | no | No | good |
| | θ > 90° | no | No | no good |
| | r ≧ d | no | No | good |
| | r < d | no | partly peeled | no good |

From the results shown in Table 1, ink residue around the nozzle and peeled edges by wiping were observed in the ink-repellant coating 231 having the edge (around the opening edge) with nearly pointed ends.

Figure 15A:
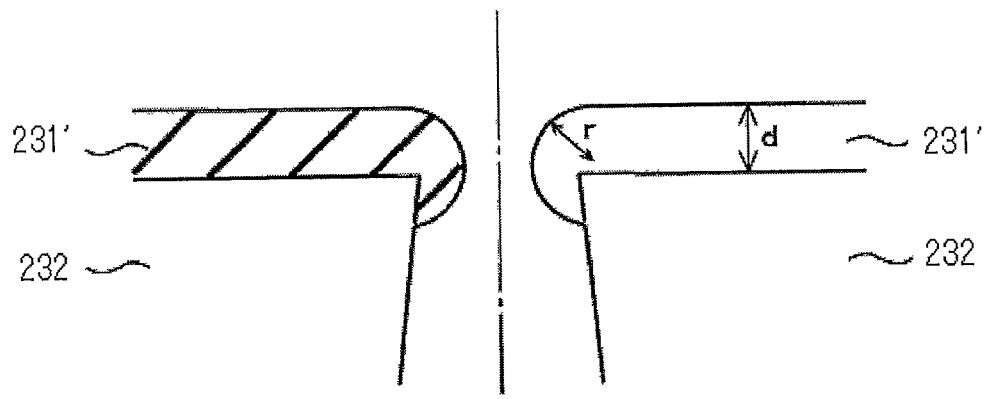
FIG. 15A is a schematic illustration for explaining the nozzle plate of the inkjet head for comparison.
Figure 15B:
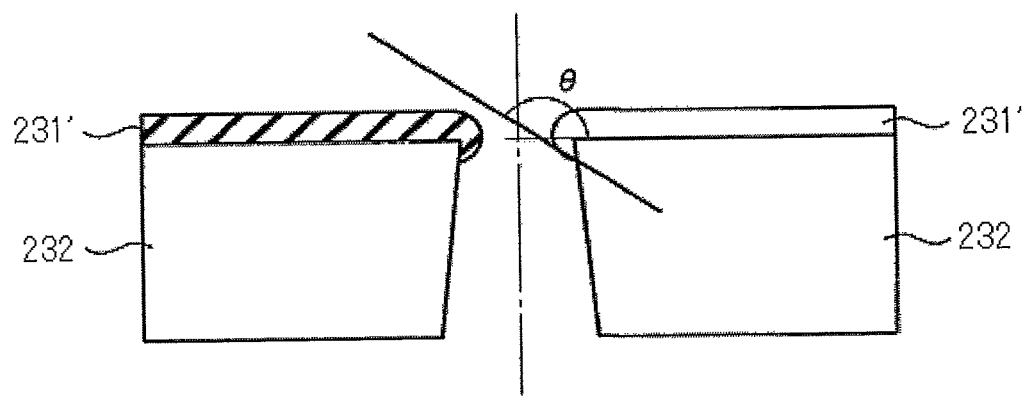
FIG. 15B is a schematic illustration for explaining the nozzle plate of the inkjet head for comparison.

No ink residue was observed for all rounded edges. However, in comparison, the edge was partly peeled in the one shown in FIG. 15A in which r<d and the ejection of droplets was unstable in the one shown in FIG. 15B in which θ>90 degrees.

Figure 15C:
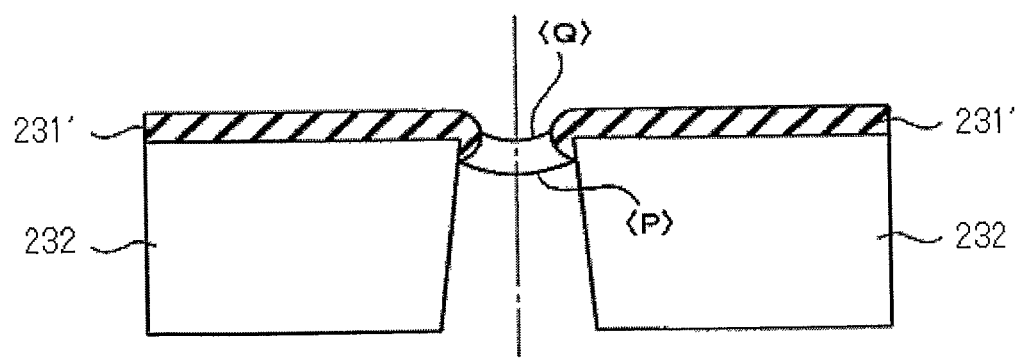
FIG. 15C is a schematic illustration for explaining the nozzle plate of the inkjet head for comparison.

As shown in FIG. 15C, when r<d or θ>90 degrees, the meniscus (liquid surface) P was sometimes formed on the border between the ink-repellant coating 231 and the nozzle plate 232 and sometimes formed in the part protruding toward the center of the opening of the ink-repellant coating 231' (the part where the cross-section perpendicular to the center line of the opening is minimized). Therefore, the stability of ink ejection for recording images in the inkjet recording apparatus using the inkjet head having the nozzle plate 232 is fluctuated.

The production of the nozzle member of the inkjet head according to the above embodiment is described hereafter.

Figure 16:
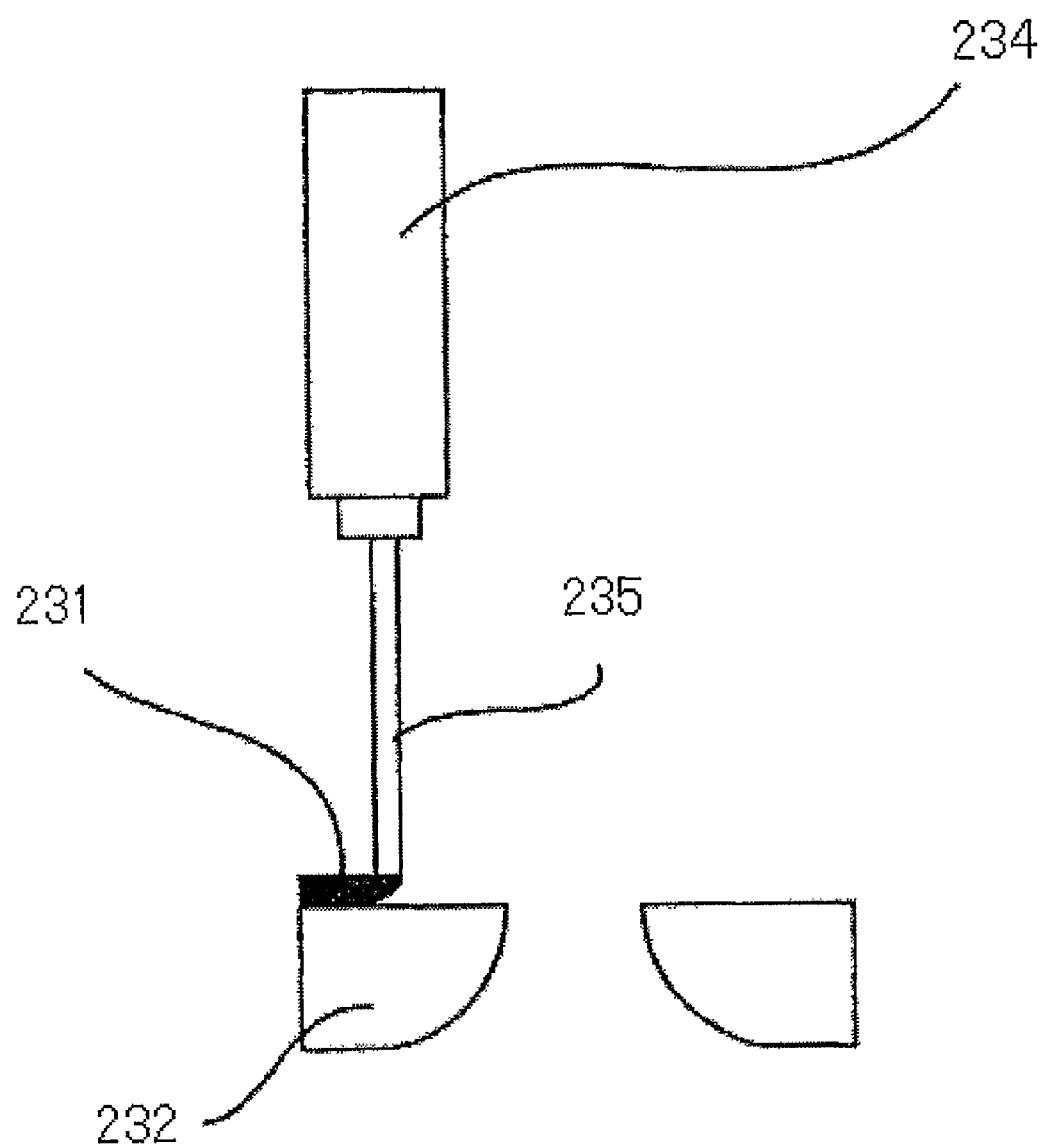
FIG. 16 is an illustration showing how a silicone resin is applied by a dispenser to form an ink-repellant layer.

FIG. 16 is an illustration showing how a silicone resin is applied by a dispenser 234 according to this embodiment to form the ink-repellant coating 231.

A dispenser 234 is provided for applying a silicone solution on the ink dispensing side of the nozzle 232 formed by electroforming Ni. The dispenser 234 was scanned while dispensing silicone from the tip of a needle 235 with the nozzle plate 232 and the tip of the needle 235 keeping a specific distance to each other. In this way, the silicone coating was selectively formed on the ink dispensing surface of the nozzle plate 232 as shown in FIGS. 13 and 14A to 14C.

The silicone resin used in this embodiment was room-temperature curing silicone resin SR2411 (ex. Toray/Dow Corning, viscosity: 10 mPa·s). Silicone slightly went into the nozzle orifice and around the back of the nozzle plate. The silicone resin coating selectively formed in this way had a thickness of 1.2 μm and a surface roughness (Ra) of 0.18 μm.

Figure 17A:
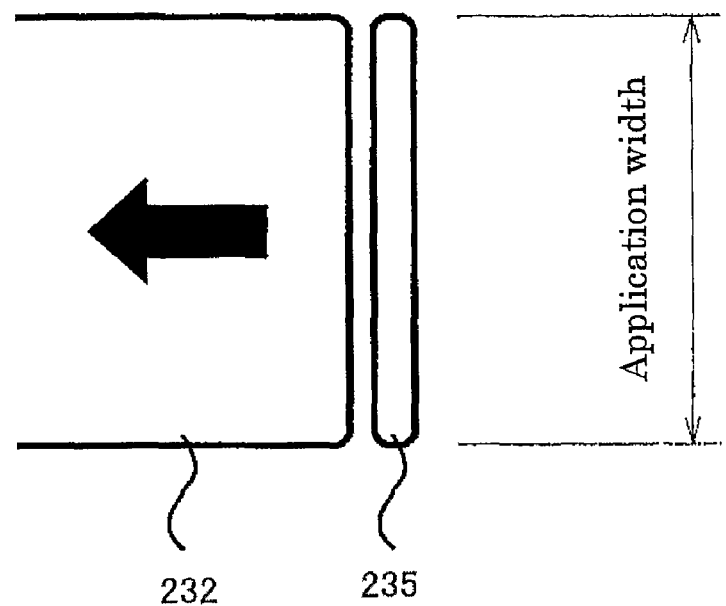
FIG. 17A is an illustration showing the relationship between the application port at the needle tip and the application width on the nozzle plate to be coated of the inkjet head of the inkjet recording apparatus of the present invention.

The dispensing port at the tip of the needle 235 according to this embodiment has a width enough for the application width to the nozzle plate 232 to be coated as shown in FIG. 17A. Therefore, one scanning of the dispenser (not shown) in the application direction completes the application on the entire coating object.

In other words, the application involves only one application direction. There is no need of changing the direction and scanning in the reversed direction as shown in FIG. 17B.

Figure 17B:
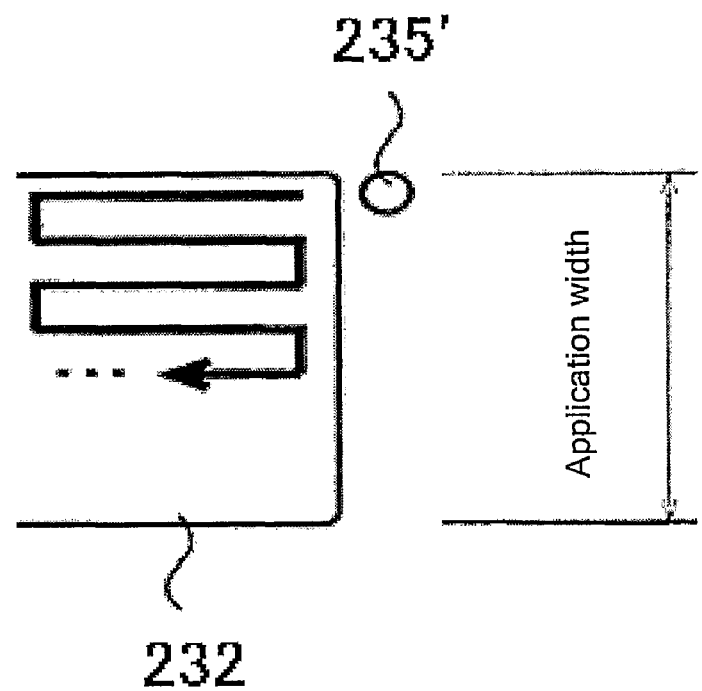
FIG. 17B is an illustration showing the relationship between a conventional needle tip and the application width on the nozzle plate to be coated.

The tip of a conventional needle 235 has a width much smaller than the application width to the nozzle plate 232 to be coated as shown in FIG. 17B. Therefore, the application involves scanning in multiple directions including changing of the scanning direction by 90 degrees and scanning in the reversed direction in order to complete the application on the entire coating object. This makes it difficult to apply a coating to a uniform thickness over the entire coating object.

In this embodiment, the application port at the tip of the needle 235 has a width enough for the application width to the nozzle plate 232 to be coated. Therefore, the coating has a uniform thickness over the entire coating object. The surface is finished with precision.

Figure 11:
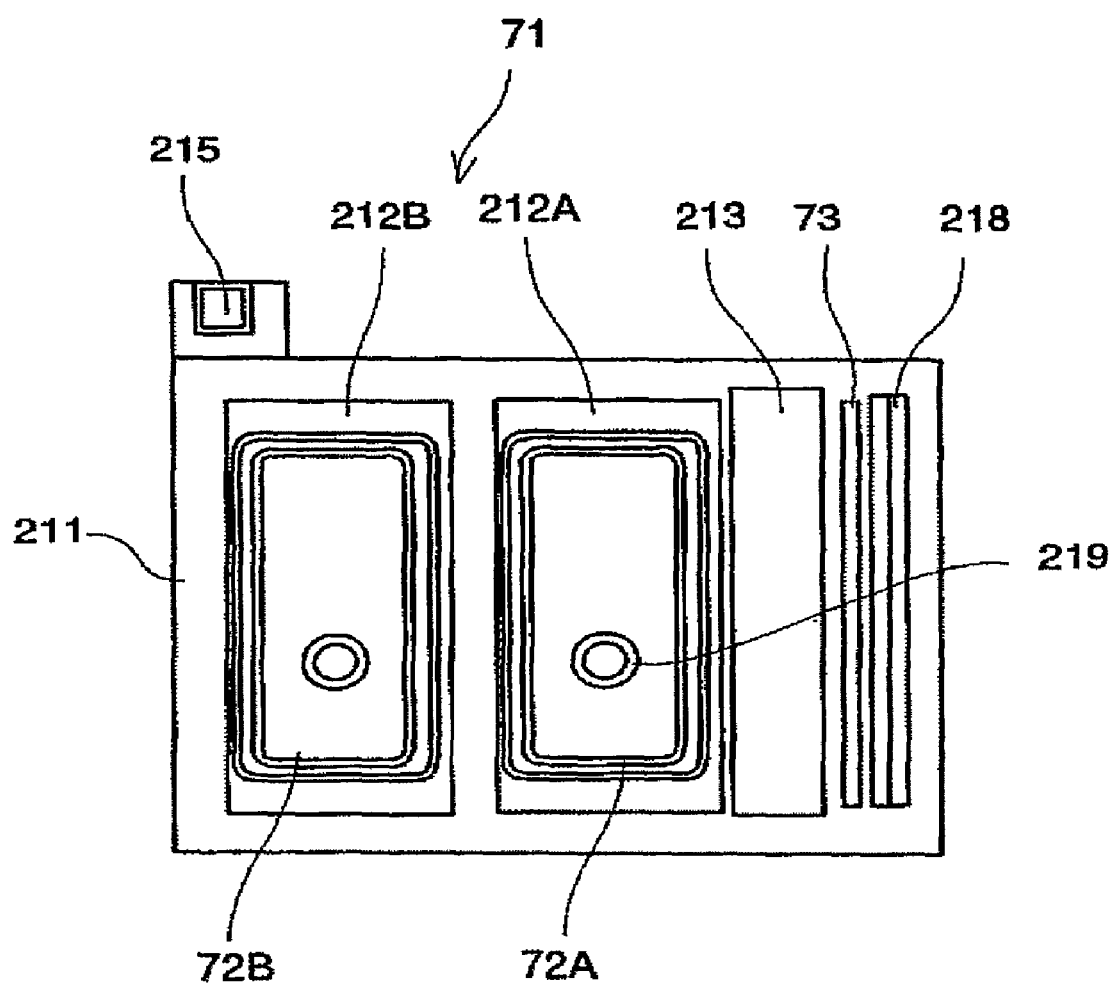
FIG. 11 is a top view of the maintenance unit of the inkjet recording apparatus of the present invention.
Figure 18:
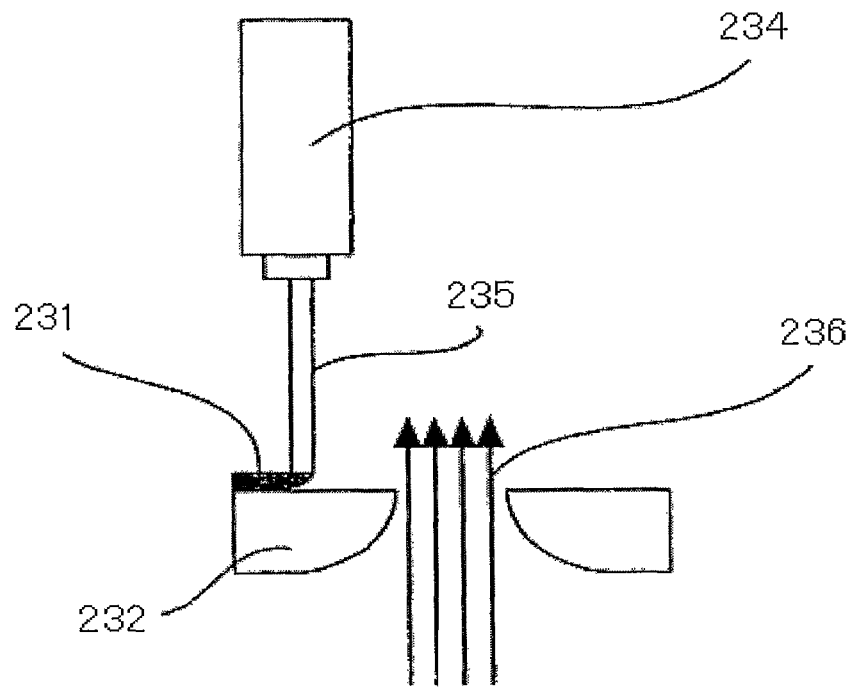
FIG. 18 is an illustration showing the application by a dispenser.

FIG. 18 is an illustration showing the application using a dispenser 234 according to this embodiment. The basic structure is the same as shown in FIG. 11. However, a gas 236 is ejected from the nozzle orifice (opening) of the nozzle plate 232 while silicone is applied. The gas 236 can be any gas as long as it unlikely reacts with silicone to be applied. For example, the gas can be air.

When the gas 236 is ejected from the nozzle orifice while silicone is applied, the silicone resin coating is provided only the nozzle surface excluding the nozzle orifice.

Figure 19:
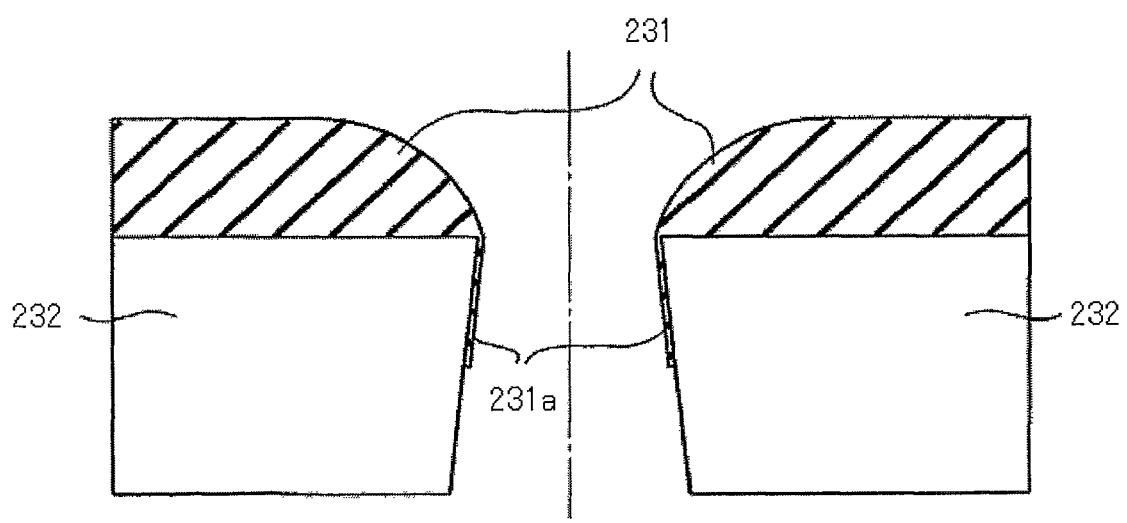
FIG. 19 is an illustration showing a silicone resin ink-repellant layer formed on the inner wall of a nozzle to a desired depth.

Alternatively, silicone resin is applied without the gas 236 ejected and the gas 236 is ejected from the nozzle 232 after the silicone resin enters to a predetermined depth. Then, the silicone resin ink-repellant layer can be formed on the nozzle inner wall to a desired depth (for example several μm) as shown in FIG. 19. In other words, in addition to the ink-repellant coating 231 on the ink dispensing surface as described above, a very thin ink-repellant coating 231a (the ink-repellant coating on the opening inner wall) can be formed from the opening edge of the nozzle plate 232 to a predetermined depth.

The ink-repellant coating 231 formed on the nozzle plate as described above was wiped with an EPDM rubber (a rubber hardness of 50 degrees). After 1,000 times of wiping, the ink-repellant coating 231 on the nozzle plate maintained the excellent ink-repellant properties. Furthermore, the nozzle member with the ink-repellant coating was immersed in ink at 70° C. for 14 days. After this treatment, the initial ink-repellent properties were maintained.

Figure 20:
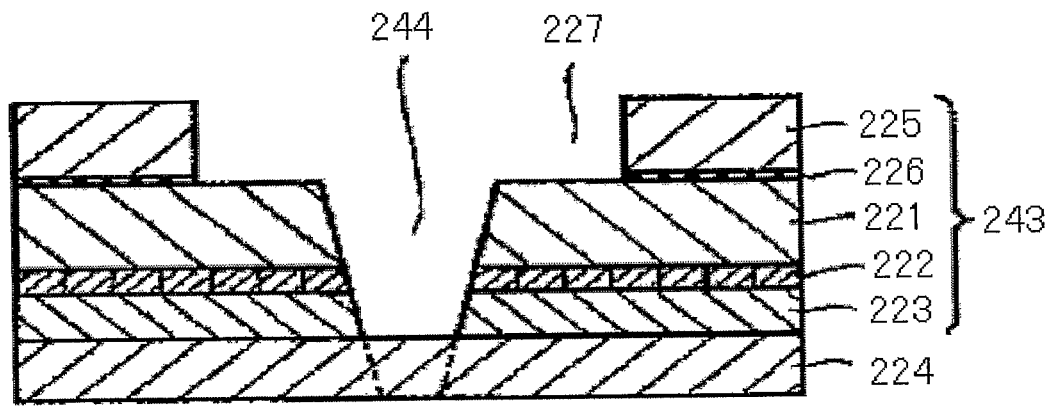
FIG. 20 is an illustration showing an embodiment of the inkjet head of the inkjet recording apparatus of the present invention in which a nozzle orifice is formed by excimer laser.

FIG. 20 is an illustration showing an embodiment of the inkjet head of the present invention where a nozzle orifice is formed by excimer laser processing. A nozzle plate 243 is formed by bonding a resin member 221 and a highly rigid member 225 with a thermoplastic adhesive 226. A $SiO_2$ film layer 222 and a fluorinated water-repellant layer 223 are deposited on the surface of the resin member 221 in sequence. A nozzle orifice 244 having a given diameter is formed in the resin member 221. A nozzle communication port 227 communicating the nozzle orifice 244 is formed in the highly rigid member 225. The $SiO_2$ film layer 222 is formed by a technique that involves relatively low heat, in other words, that does not thermally affect the resin member. More specifically, sputtering, ion beam deposition, ion plating, CVD (chemical vapor deposition), and P-CVD (plasma deposition) are preferable.

It is advantageous based on processing time and material cost that the $SiO_2$ film layer 222 has a thickness minimized to the extent that adhesion is ensured. When the thickness is too large, some inconveniences may occur in forming the nozzle orifice by excimer laser. In other words, part of the $SiO_2$ film layer 222 may not sufficiently be processed and remain unprocessed after a clean nozzle orifice is formed in the resin member 221. Therefore, more specifically, the $SiO_2$ film layer 222 preferably has a thickness in the range from 1 Å to 300 Å (0.1 nm to 30 nm) in which adhesion is ensured and no $SiO_2$ film layer 222 remains in the excimer laser processing. The thickness is more preferably 10 Å to 100 Å (1 nm to 10 nm). Experiments showed that the $SiO_2$ film thickness of 30 Å (3 nm) ensures sufficient adhesion and no problems with the excimer laser processing. Small unprocessed parts were observed at 300 Å (30 nm); however, it is still usable. When the thickness exceeds 300 Å (30 nm), large unprocessed parts remain and the nozzle is too deformed to use.

The material of the ink-repellant layer can be any material as long as they repel ink. More specifically, fluorine-based water-repellant materials and silicone-based water-repellant materials can be used.

Many fluorine-based water-repellant materials are known. Here, a mixture of perfluoropolyoxethane and modified perfluoropolyoxetane (ex. Daikin Industry, trade name: Optool DSX) is deposited to a thickness of 1 Å to 30 Å (0.1 nm to 3 nm) to obtain water-repellent properties. Experiments showed that there is no difference in water-repellant properties and wiping-resistance between the Optool DSX thicknesses of 10 Å, 20 Å, and 30 Å. Therefore, in consideration of cost, the thickness of 1 Å to 20 Å (0.1 nm to 2 nm) is preferable. However, from a viewpoint of reliability for some ink used, the performance can be maintained for a prolonged period by increasing the thickness of the water-repellant layer. In such a case, the thickness is preferably 100 Å to 200 Å (10 nm to 20 nm). An adhesive tape 244, which has an adhesive material on a resin film, is attached to the surface of the fluorine-based water-repellant layer 223. The adhesive tape 244 helps the excimer laser processing. A silicone-based water-repellant material can also be used.

The silicone-based water-repellant material can be a room-temperature curing liquid silicone resin or elastomer, which is preferably applied on the base surface and allowed to stand in the air at room temperature for polymerizing and curing to form an ink-repellant coating.

The above described silicone-based water-repellant material can be a heat curing liquid silicone resin or elastomer, which is applied to the base surface and heated to cure and form an ink-repellant coating.

The silicone-based water-repellant material can also be an ultraviolet curing liquid silicone resin or elastomer, which is applied to the base surface and irradiated with ultraviolet rays to cure and form an ink-repellant coating. The silicone-based water-repellant materials preferably have a viscosity of 1,000 cp (centipoises) or lower.

Figure 21:
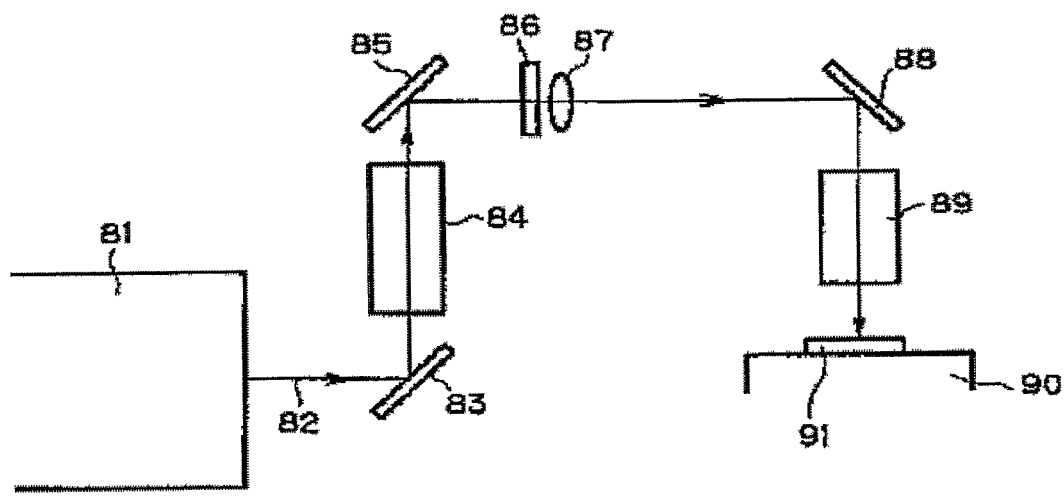
FIG. 21 is an illustration showing the structure of an excimer laser processing apparatus used for processing the nozzle orifice.

FIG. 21 is an illustration showing the structure of an excimer laser processor used for forming a nozzle orifice. An excimer beam 82 emitted from a laser oscillator 81 is reflected by mirrors 83, 85, and 88 to reach a processing table 90. A beam expander 84, a mask 86, a field lens 87, and an imaging optical system 89 are provided at specific positions on the optical path of the laser beam 82 to the processing table 90. A processing item (nozzle plate) 91 is placed on the processing table 90 and subject to the laser beam. The processing table 90 consists of a known XYZ table on which the processing item 91 is moved to receive the laser beam at desired positions as appropriate. Here, the laser is described as excimer laser. However, various lasers can be used as long as they are short wavelength ultraviolet lasers usable for ablation.

FIGS. 22A to 22F are schematic illustrations showing nozzle production steps of the inkjet head production method of the present invention.

Figure 22A:
FIG. 22A is an illustration showing a base of the nozzle formation member in the nozzle plate production step in the inkjet head production method.

FIG. 22A shows a material to form a base of the nozzle forming member. Here, a resin film 221 is a particle-free film of Capton (trade name), which is a polyimide film ex. DuPont. Ordinary polyimide films contain for example $SiO_2$ particles therein for easy handling (smooth-running) in handling apparatuses for rolled films. When the nozzle orifice is formed by excimer laser, $SiO_2$ (silica) particles are not processed well by excimer laser and, therefore, the nozzle may be deformed. Then, the present invention uses a film containing no $SiO_2$ particles. The plate base material can be Upilex, which is a polyimide film ex. Ube Industries. Upilex can be used as it is because extremely fine particles therein do not interfere with the processing.

Figure 22B:
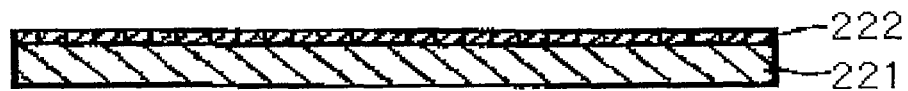
FIG. 22B is an illustration showing the step of forming a $SiO_2$ film layer on the surface of a resin film.

FIG. 22B is an illustration showing the step of forming a $SiO_2$ film layer 222 on the surface of the resin film 221. Sputtering in a vacuum chamber is suitably used to form the $SiO_2$ film layer 222. Its appropriate thickness is approximately 1 Å to 300 Å (0.1 nm to 30 nm). Here, a thickness of 10 Å to 100 Å (1 nm to 10 nm) is used. In the sputtering, Si is sputtered and then $O_2$ ions are bombarded to form a $SiO_2$ film. This is a useful way because the adhesion of the $SiO_2$ film to the resin film 221 is improved, a uniform, fine film is obtained, and the water-repellant coating has improved wiping-resistance.

Figure 22C:
FIG. 22C is an illustration showing the step of applying a fluorinated water-repellent agent.

FIG. 22C is an illustration showing the step of applying a fluorine-based water-repellant 223a. Usable application technique includes spin coater, roll coater, screen printing, and spray coater methods. Vacuum deposition is effectively used for improved adhesion of the water-repellant coating. Further advantage is obtained by conducing the vacuum deposition in the same vacuum chamber in which the $SiO_2$ film layer 222 is formed in FIG. 22B. In the prior art, the work is removed from the vacuum chamber after the $SiO_2$ film layer 222 is formed. Therefore, contaminants adhered to the surface presumably impair the adhesion. Various fluorine-based water-repellant materials are known. Here, amorphous fluorine compounds such as perfluoropolyoxetane, modified perfluoropolyoxetane, or their mixture is used to obtain the water-repellant properties necessary for the ink. The above described "Optool DSX" ex. Daikin Industry occasionally called "alkoxysilane end-modified perfluoropolyether."

Figure 22D:
FIG. 22D is an illustration showing the step of standing in the air after the water-repellent layer is deposited.

FIG. 22D is an illustration showing the step of standing in the air after the water-repellant coating is deposited. In this step, the fluorine-based water-repellant 223a and $SiO_2$ film layer 222 chemically bond to each other via moisture in the air to form a fluorine-based water-repellant layer 223.

Figure 22E:
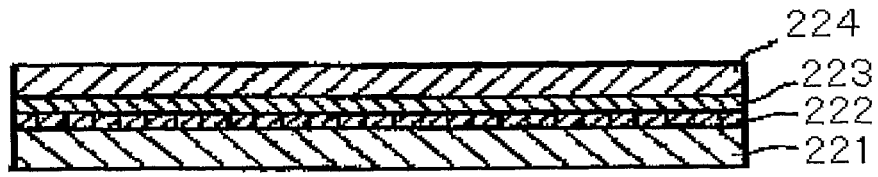
FIG. 22E is an illustration showing the step of attaching an adhesive tape.

FIG. 22E is an illustration showing the step of attaching an adhesive tape 224. The adhesive tape 224 is attached to the surface where the fluorine-based water-repellant layer 223 is applied. When the adhesive tape 224 is attached, bubbles should not be created. If bubbles are present, a nozzle orifice formed at a position where bubbles are present may have a poor quality because of something adhered thereto during the processing.

Figure 22F:
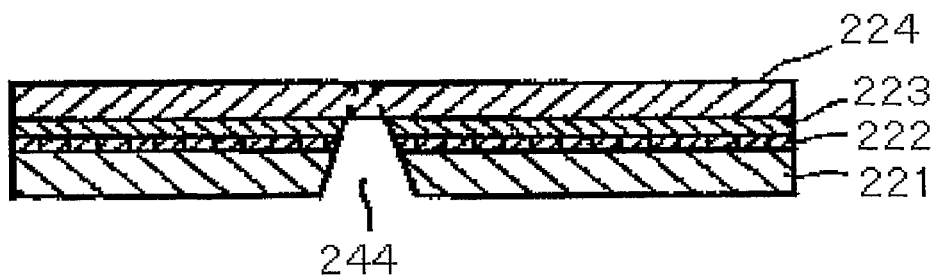
FIG. 22F is an illustration showing the step of processing a nozzle orifice.

FIG. 22F is an illustration showing the step of forming a nozzle orifice 244. In this step, the polyimide film 221 side is irradiated with excimer laser to form a nozzle orifice 244. After the nozzle orifice 244 is formed, the adhesive tape 224 is removed for use. Here, the highly rigid member 225 for increasing the rigidity of the nozzle plate 243 as described with FIG. 20 is not refereed to. If applied to this process, it is provided between the steps in FIGS. 22D and 22E.

Figure 23:
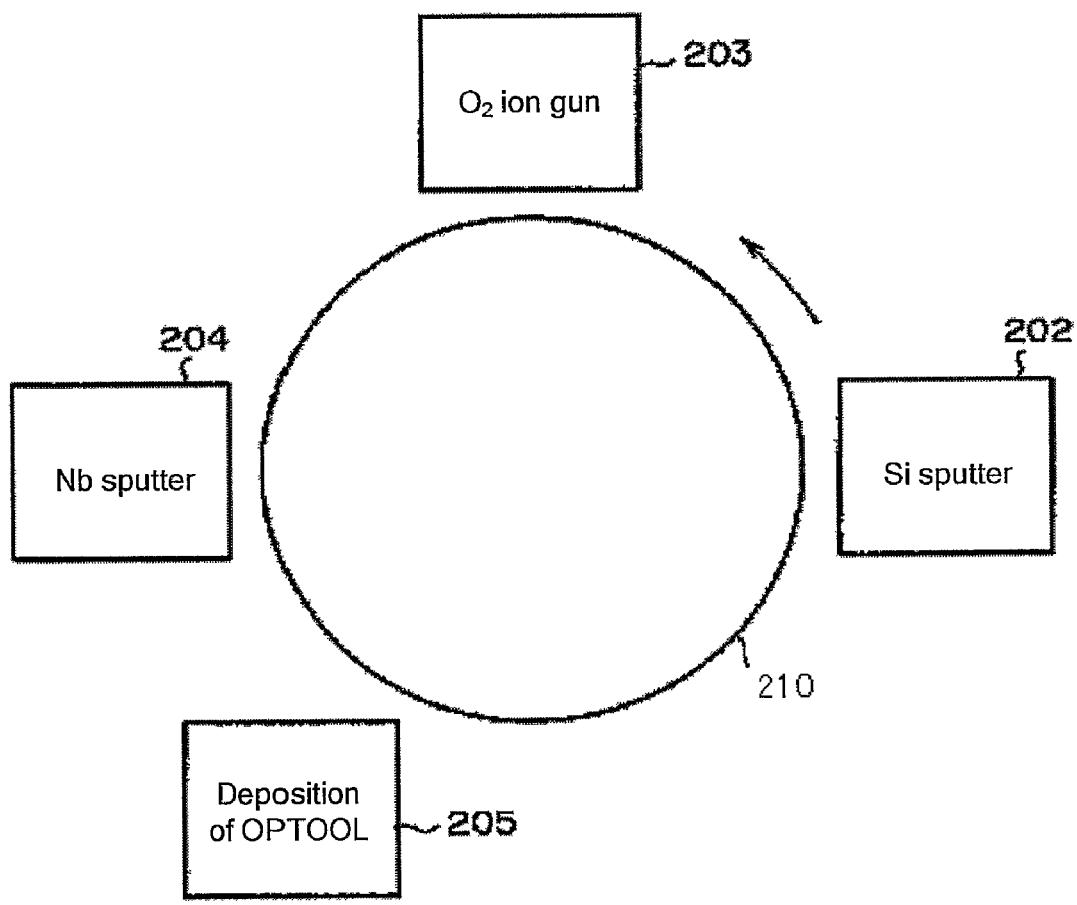
FIG. 23 is an illustration showing the outline of the apparatus for producing an inkjet head by the inkjet head production method.

FIG. 23 is a schematic illustration showing an apparatus for producing the inkjet head by the inkjet head production method of the present invention.

This apparatus is realized based on a technique called "Matamode Process" developed by OCLI (OPTICAL COATING LABORATORY INC.) in USA and used for producing anti-reflecting coating and antifouling coating for displays. As shown in FIG. 23, a Si sputter 202, an $O_2$ ion gun 203, an Nb sputter 204, and Optool deposition 205 are arranged at four positions around a drum 210. All of them are placed in a vacuumable chamber. First, Si is sputtered by the Si sputter 202. Then, $O_2$ ions are bombarded by the $O_2$ ion gun 203 to generate $SiO_2$. Subsequently, Nb and Optool DSX are appropriately deposited by the Nb sputter 204 and Optool deposition 205. For antireflecting coating, the deposition is conducted after a necessary number of Nb and $SiO_2$ layers are superimposed to a specific thickness. In the present invention, there is no need of antireflecting function. Therefore, Nb is unnecessary and each one of $SiO_2$ and Optool DSX layers are formed. Using this apparatus, the Optool DSX can be vacuum-deposited in the same vacuum chamber where the $SiO_2$ film layer 122 is formed.

The water-repellant layer preferably has a critical surface tension of 5 mN/m to 40 mN/m and more preferably 5 mN/m to 30 mN/m. When the critical surface tension exceeds 30 mN/m, the ink excessively wets the nozzle plate in prolonged use. Then, abnormal events such as twisted ink dispensing directions and granulation of ink may be observed during repeated printing. When the critical surface tension exceeds 40 mN/m, the ink excessively wets the nozzle plate from the beginning. Then, abnormal events such as twisted ink dispensing directions and granulation of ink may be observed from the beginning.

The ink-repellant materials shown in FIG. 2 were actually applied on a aluminum base and heat-dried to produce a nozzle plate with the ink-repellant layer. The critical surface tension of the ink-repellant layer was measured. The results are shown in FIG. 2.

The critical surface tension can be obtained by the Zisman method. A liquid of which the surface tension is known is dropped on the ink-repellant layer. The contact angle θ is measured. The surface tension of the liquid is plotted on the axis x and cos θ is plotted on the axis y; a constantly decreasing line is obtained (the Zisman Plot). The surface tension for Y=1 (θ=0) on this line is assumed to be the critical surface tension γc. Other methods to obtain the critical surface tension include the Fowkes, Owens and Wedt, and Van Oss methods.

An inkjet head was produced using a nozzle plate with the ink-repellant layer in the same manner as the head was produced. Then, the inkjet head was used to eject cyan ink. The process of the ink ejection was videotaped and observed. The ink is properly granulated in all nozzle plates and stable dispensing was observed. The results are given in Table 2.

<Cyan Ink>

Copper phthalocyanine pigment-containing polymer particles dispersing element (20.0% by mass), 3-methyl-1,3-butanediol (23.0% by mass), glycerin (8.0% by mass), 2-ethyl-1,3-hexanediol (2.0% by mass), FS-300 (ex. DuPont) as fluorochemical surfactant (2.5% by mass), Proxel LV (ex. Abecia) as antiseptic/mildewproofing agent (0.2% by mass), 2-amino-2-ethyl-1,3-propanediol (0.5% by mass), and ion-exchanged water (q.s.) are mixed to 100% by mass. Then, the mixture is filtered by a membrane filter having an average pore size of 0.8 μm to prepare cyan ink.

TABLE 2

| | product | critical surface tension | stability of dispensing |
| --- | --- | --- | --- |
| Toray/Dow Corning | SR2411 | 21.6 mN/m | good |
| Shin-Etsu Chemical | KBM7803 | 16.9 mN/m | good |
| Shin-Etsu Chemical | KP801M | 6.6 mN/m | good |

Figure 3:
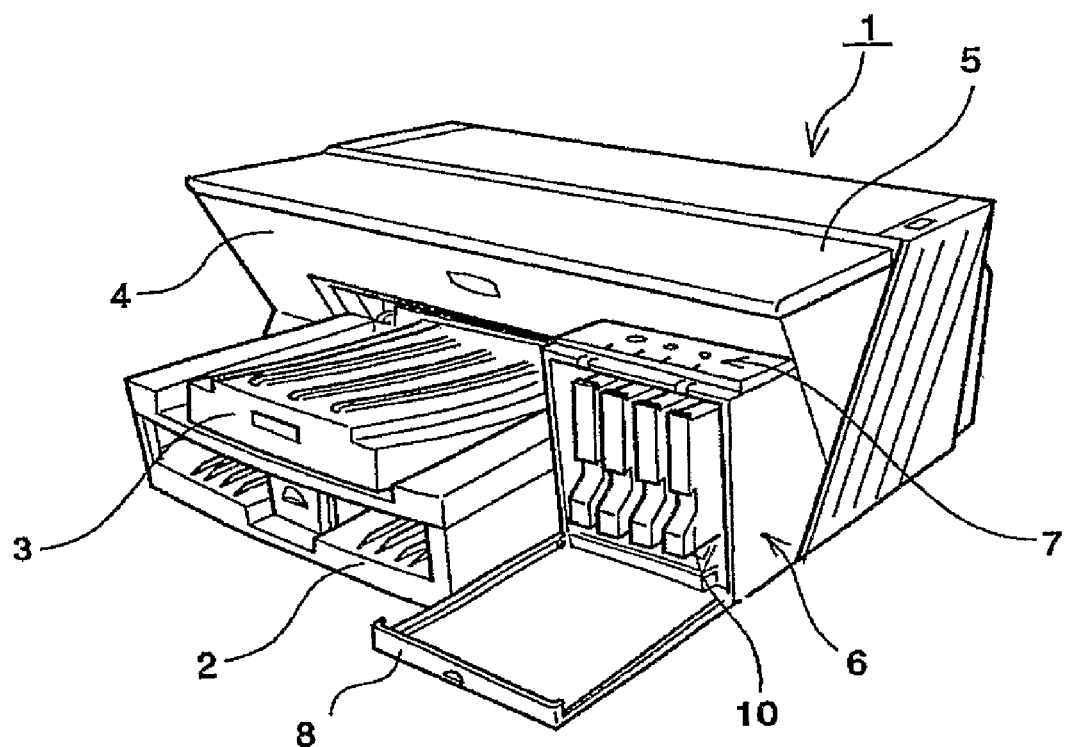
FIG. 3 is a schematic illustration for explaining an embodiment of the inkjet recording apparatus of the present invention.

An embodiment to realize the inkjet recording method of the present invention using the inkjet recording apparatus of the present invention is described hereafter with reference to the drawings. FIG. 3 is a schematic illustration showing an embodiment of the inkjet recording apparatus of the present invention. The inkjet recording apparatus shown in FIG. 3 has an apparatus body 1, a paper feed tray 2 attached to the apparatus body 1 for feeding paper, a paper catch tray 3 attached to the apparatus body 1 for stacking up paper on which images are recorded (formed), and an ink cartridge loading part 6. An operation part 7 including operation keys and displays are provided on the top surface of the ink cartridge loading part 6. The ink cartridge loading part 6 has a front cover 8 that can be opened/closed for detachably loading an ink cartridge. A top cover 5 and a front surface 4 are also shown in FIG. 3.

Figure 4:
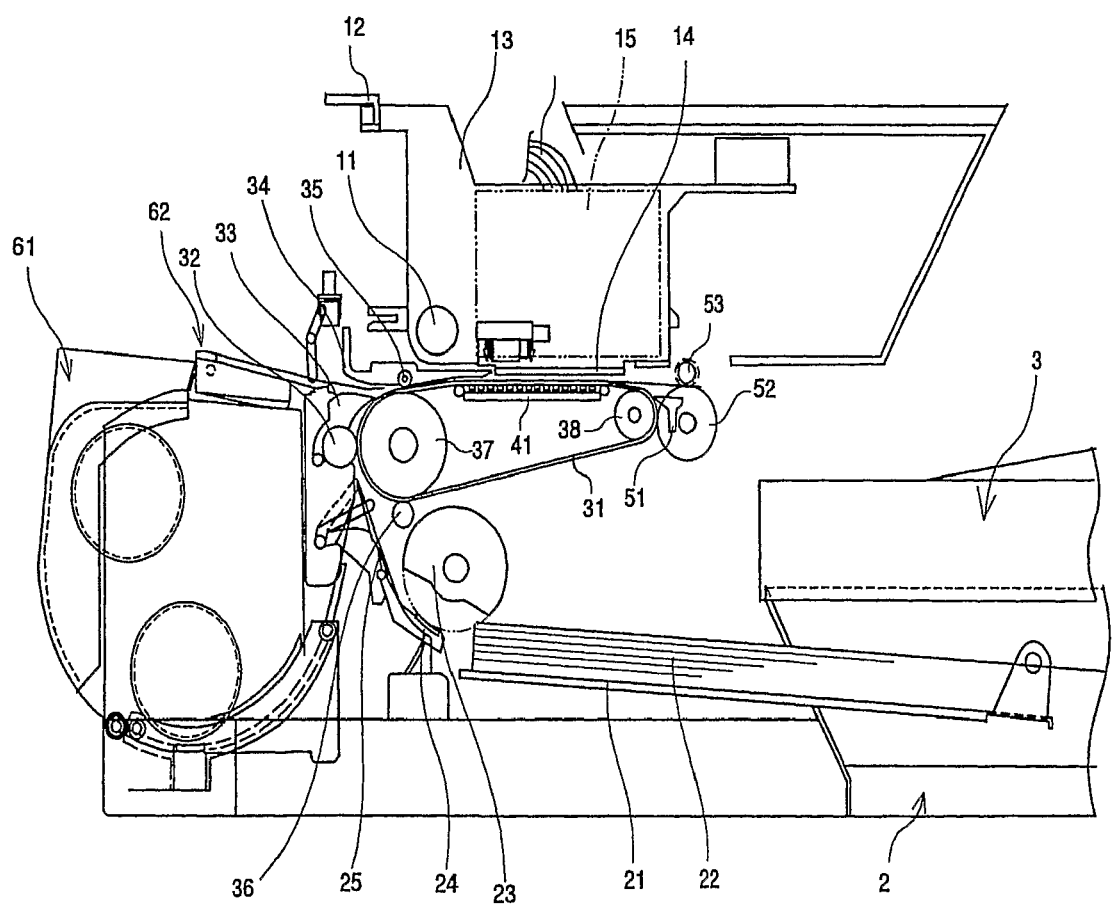
FIG. 4 is a schematic illustration showing an embodiment of the internal structure of the inkjet recording apparatus in FIG. 3
Figure 5:
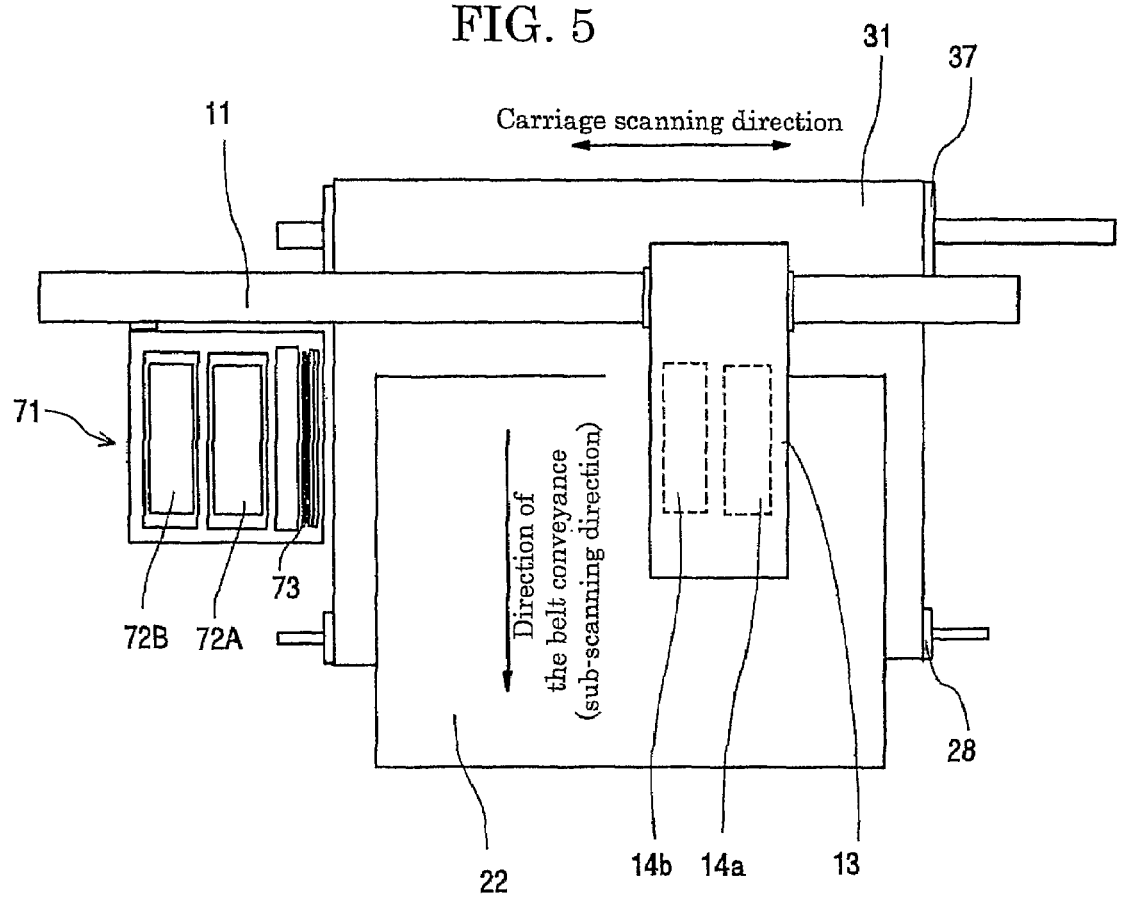
FIG. 5 is an enlarged schematic illustration showing an embodiment of the inkjet head of the inkjet recording apparatus of the present invention.

In the inkjet recording apparatus body, as shown in FIGS. 4 and 5, a guide rod 11 and a stay 12, which are guide members horizontally provided across the not-shown side boards, hold a carriage 13 so that the carriage 13 can slide in the main scanning direction. A main scanning motor (not shown) moves the carriage 13 for scanning in the arrowed direction in FIG. 5.

The carriage 13 carries a recording head 14 consisting of four inkjet recording heads for dispensing yellow (Y), cyan (C), magenta (M), and black (Bk) recording ink droplets, respectively, in the manner that multiple ink dispensing ports are arranged in the direction intersecting with the main scanning direction and the ink droplets are dispended downward.

The inkjet recording heads constituting the recording head 14 can be provided with a piezoelectric actuator such as a piezoelectric element, a thermal actuator using an electrothermal converter such as an exothermicresistor to use phase changes due to liquid film boiling, a shape-memory alloy actuator using changes in metal phase due to temperature changes, or a static actuator using electrostatic as an energy generation means for dispensing the recording ink.

The carriage 13 also carries sub tanks 15 for respective colors for supplying the respective color inks to the recording head 14. The sub tanks 15 are refilled with the recording ink of the present invention from the ink cartridges 10 of the present invention loaded in the ink cartridge loading part 6 shown in FIG. 3 via not-shown recording ink supply tubes.

As the paper feeding part for feeding paper 22 stacked on the paper stacking part (pressure plate) 21 of the paper feed tray 2, a semilunar roller (feed roller) 23 for feeding paper 22 from the paper stacking part 21 one by one and a separation pad 24 made of a highly frictional material and facing the feed roller 23 are provided. The separation pad 24 is biased toward the feed roller 23.

As the transfer part for transferring the paper 22 fed from the paper feeding part below the recording head 14, a conveyer belt 31 for conveying the paper 22 by electrostatic attachment, a counter roller 32 for clamping together with the conveyer belt 31 and transferring the paper 22 sent from the paper feeding part via a guide 25, a conveyer guide 33 for turning the paper 22 sent nearly vertically upward by nearly 90 degrees so that it stays on the conveyer belt 31, and a pressurizing-end roller 35 that is biased toward the conveyer belt 31 by a pressing member 34 are provided. A charging roller 36 that is a charging means for charging the conveyer belt 31 is also provided.

The conveyer belt 31 is an endless belt, running around a conveyer roller 37 and a tension roller 38 in the belt conveyer direction. A guide member 77 is provided on the back of the conveyer belt 31 at a position corresponding to the print zone of the recording head 14. As the paper discharging part for discharging the paper 22 on which recording is made by the recording head 14, a separation claw 51 for separating the paper 22 from the conveyer belt 31, a discharging roller 52, and a discharging roller 53 are provided. The paper catch tray 3 is provided below the discharging roller 52.

A both-side paper feed unit 61 is detachably mounted in the back of the apparatus body. The both-side paper feed unit 61 takes in the paper 22 retuned as a result of the reverse rotation of the conveyer belt 31, inverts it, and feeds it back between the counter roller 32 and the conveyer belt 31. A manual feed part 62 is provided on the top surface of the both-side paper feed unit 61.

In this inkjet recording apparatus, the paper 22 is supplied from the paper feeding part one by one. The paper 22 supplied nearly vertically upward is guided by the guide 25 and clamped and transferred between the conveyer belt 31 and the counter roller 32. The leading end of the paper 22 is further guised by the conveyer guide 33 and pressed against the conveyer belt 31 by the pressurizing-end roller 35 so that the transfer direction is turned by nearly 90 degrees.

The conveyer belt 31 is charged by the charging roller 36. The paper 22 is electrostatically attached to the conveyer belt 31 to be transferred. Then, the recording head 14 is driven according to image signals while the carriage 13 moves. Consequently, ink droplets are ejected on the paused paper 22 for recording one line. The paper 22 is shifted at a predetermined rate and then the next line is recorded. Receiving end-of-recording signals or signals indicating that the tail end of the paper 22 reaches the recording zone, the recording operation is completed and the paper 22 is discharged onto the paper catch tray 3.

If a low level of the recording ink remaining in the sub tank 15 is detected, the sub tank 15 is refilled with a required amount of the recording ink from the ink cartridge 10.

Here, the above explanation is made using the serial type (shuttle type) inkjet recording apparatus in which the carriage scans. However, the present invention is similarly applicable to the line type inkjet recording apparatus having a line type head.

Figure 6:
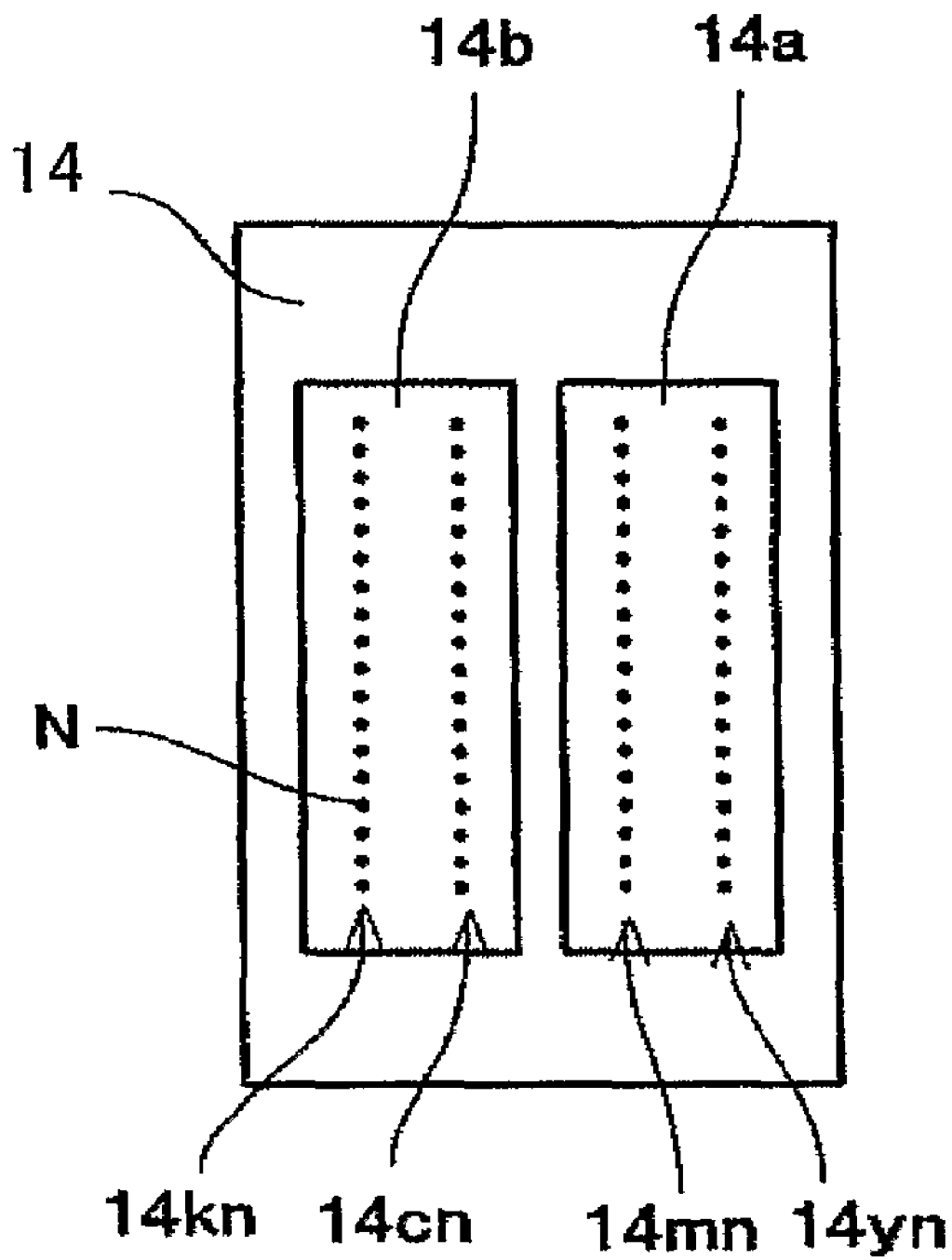
FIG. 6 is an enlarged schematic illustration showing rows of nozzles of the inkjet head of the inkjet recording apparatus of the present invention.

The recording head 14 (collectively designating multiple heads) is constituted by, for example, as shown in FIG. 6, a droplet dispensing head 14a having a row of nozzles 14yn consisting of many nozzles N dispensing yellow (Y) ink droplets and a row of nozzles 14 nm consisting of many nozzles N dispensing magenta (M) ink droplets, and a head 14b having a row of nozzles 14cn consisting of many nozzles N dispensing cyan (C) ink droplets and a row of nozzles 14*kn* consisting of many nozzles N dispensing black (Bk) ink droplets.

In this case, two colors are supplied to one recording head from two separate sub tanks; four-color, YMC and black, printing is achieved with four sub tanks and two heads. However, four heads each having two rows of nozzles are provided and the heads are each provided with one sub tank for each color. In this way, four-color, YMC and black, printing is achieved with four heads having two rows of nozzles and four sub tanks.

The embodiment of FIG. 6 shows an inkjet printer (ex. Ricoh, IPSiO G505) in which nozzles dispensing different color inks are arranged in rows on the same head.

Another inkjet printer (ex. Ricoh, IPSiO G505), which is not shown, has four head having the same structure and each used for yellow, magenta, cyan, or black ink.

The idle scanning in which a voltage that does not dispense the ink is applied to the piezo element can be performed to prevent the nozzle from clogging and the idle dispensing in which ink is dispensed in idle dispensing receiver (ink reservoir), not on the recording medium, can be frequently performed to prevent leaky nozzle. It is preferable that the idle dispensing is performed at least for each page printing.

The inkjet heads constituting the recording head 14 can be provided with a piezoelectric actuator such as a piezoelectric element, a thermal actuator using an electothermal converter such as an exothermicresistor to use phase changes due to liquid film boiling, a shape-memory alloy actuator using changes in metal phase due to temperature changes, or a static actuator using electrostatic as an energy generation means for dispensing the ink. The embodiments described later have heads having a piezoelectric actuator (piezoelectric element) as the energy generation means.

The carriage 13 carries the sub tanks 15 (15*y*, 15*m*, 15*c*, and 15*k* are used corresponding to individual rows of nozzles for distinguishing them by color) that are liquid containers for respective colors and used for supplying the respective color inks to the rows of nozzles 14*yn*, 14*mn*, 14*cn*, and 14*kn* of the recording head 14, respectively. The sub tanks 15 are refilled with ink from the above described respective color main tanks (ink cartridges) 10 (10*y*, 10*m*, 10*c*, and 10*k* are used corresponding to individual rows of nozzles for distinguishing them by color) via the ink supply tubes 16. The main tanks 10 house yellow (Y), cyan (C), magenta (M), and black (Bk) inks for the respective colors. The main tank 10*k* housing black ink is larger in capacity than the other main tanks 10*y*, 10*m*, and 10*c* housing the other color inks.

Figure 7:
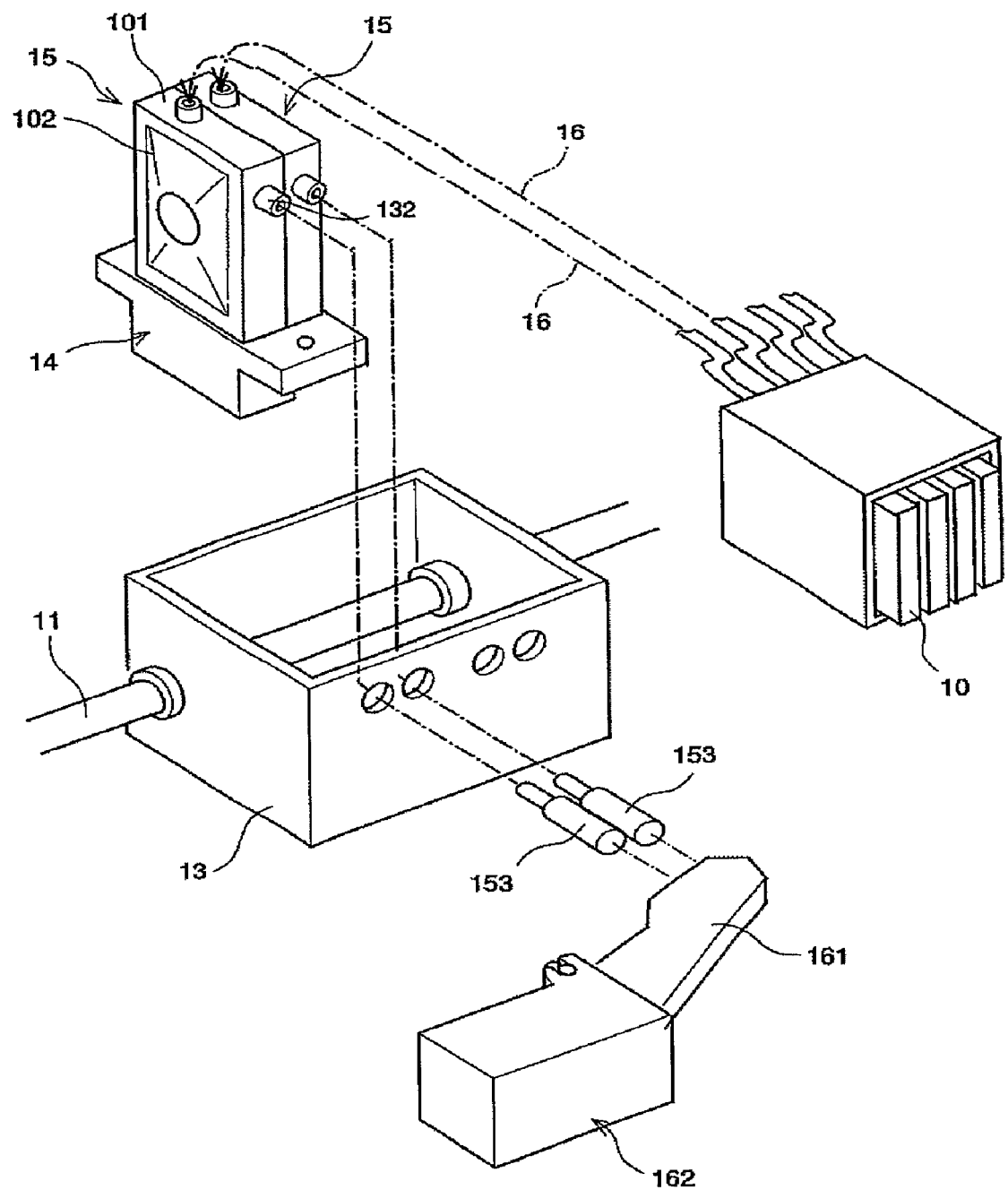
FIG. 7 is an exploded perspective view of the liquid supply unit of the inkjet recording apparatus of the present invention.
Figure 8:
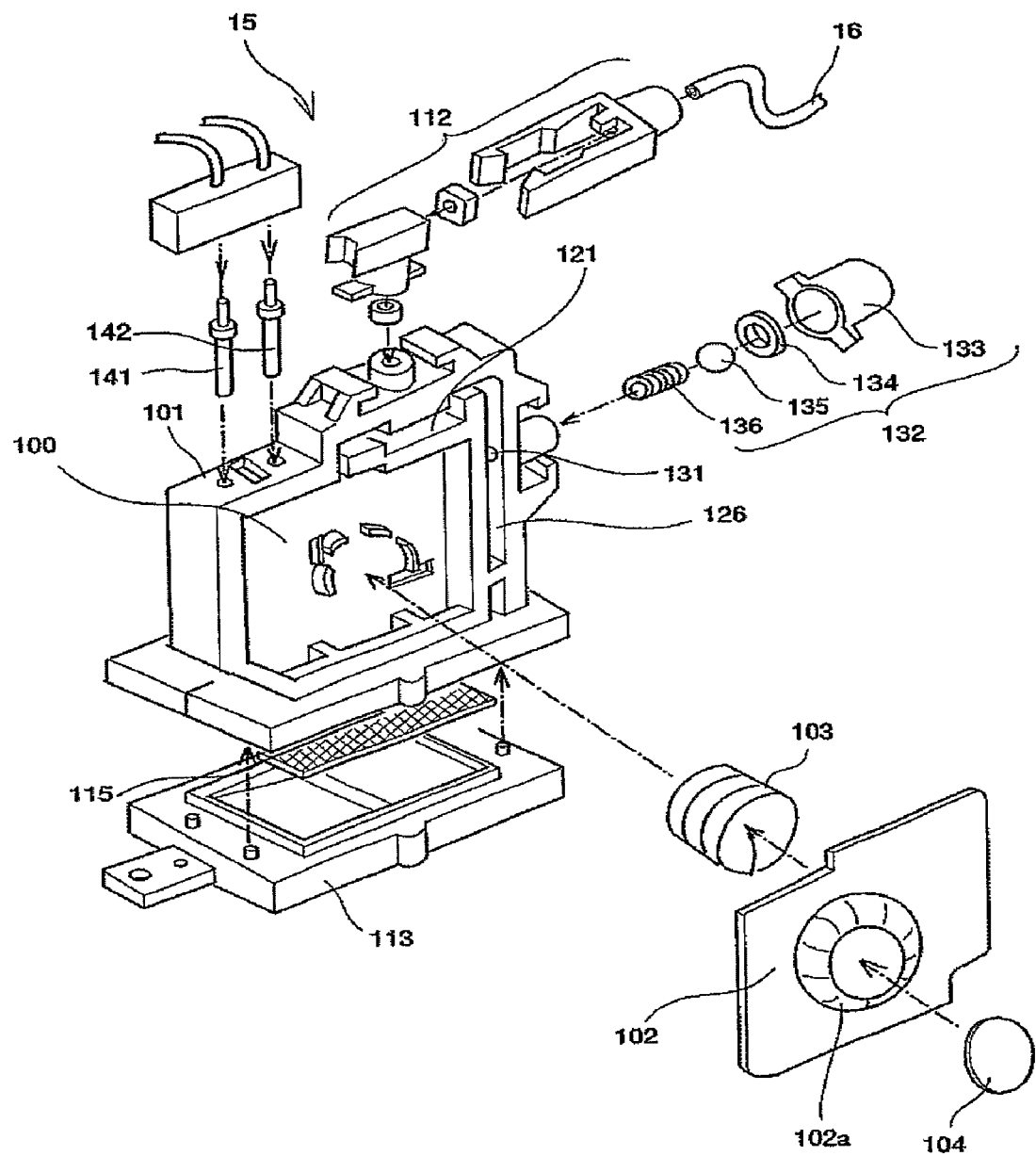
FIG. 8 is an enlarged and exploded perspective view of FIG. 7.
Figure 9:
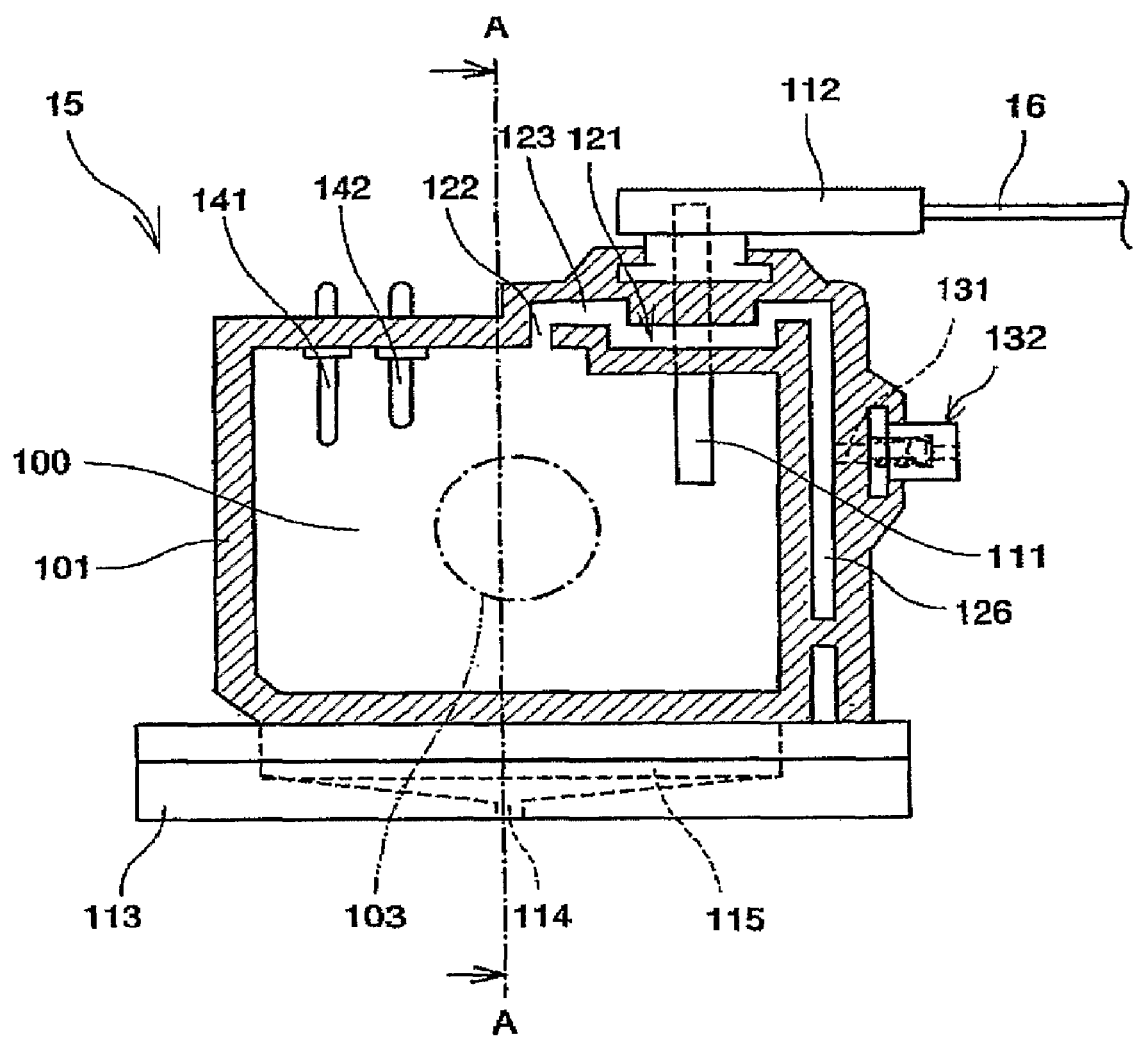
FIG. 9 is a schematic side view for explaining the sub tank.

The ink supply unit that is the liquid supply unit of this recording apparatus is described in detail hereafter with reference to FIGS. 7 to 9. FIG. 7 is an exploded perspective view for explaining the part relating to the ink supply unit. FIG. 8 is a detailed view FIG. 7.

FIG. 9 is a schematic side view for explaining the sub tank.

The ink supply unit is constituted by the sub tanks 15 that are liquid containers installed in the carriage 13 for supplying ink to their respective recording heads 14 (14*a*, 14*b*) as described above, and the main tanks (ink cartridges) 10 for refilling the sub tanks 15 with ink via the supply tubes 16.

One sub tank 15 has a container body (case body) 101 forming an ink holding part 100 for holding ink. A film member having flexibility (flexible film member) 102 for sealing the opening of the ink holding part 100 (one side of the sub tank 15) is attached to the case body 101 by adhesion or fusing. Furthermore, a spring 103 or an elastic member is provided within the ink holding part 100 between the case body 101 and the film member 102 for biasing the film member 102 outward.

Figure 10A:
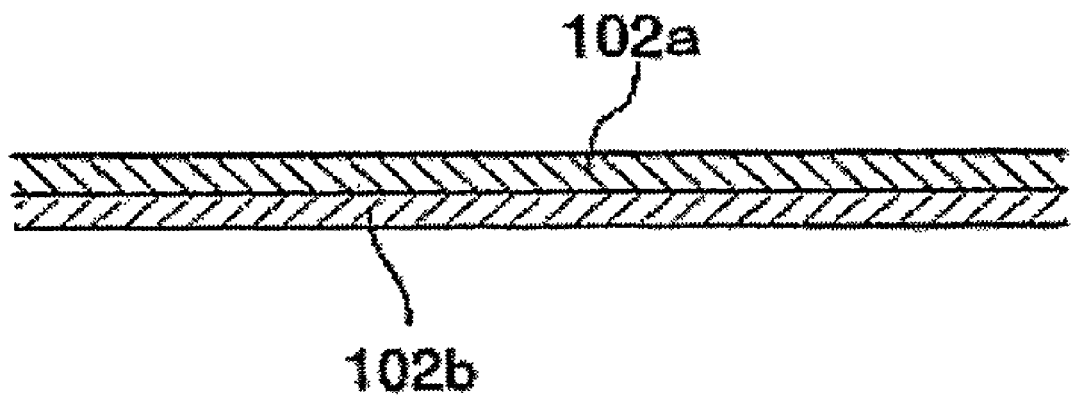
FIG. 10A is a schematic cross-sectional view at the line A-A in FIG. 9.
Figure 10B:
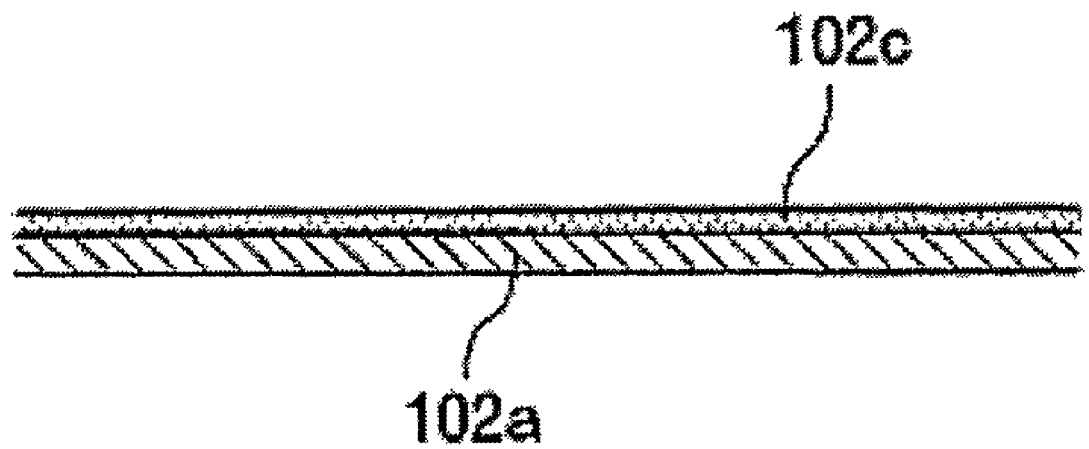
FIG. 10B is a schematic cross-sectional view at the line A-A in FIG. 9.

The film member 102 can be of a single layer structure. However, it can be of a double-layer structure formed by laminating different first and second layers 102*a* and 102*b*, for example, polyethylene and nylon film members as shown in FIG. 10A or of a structure having a first layer 102*a* and a silica deposition layer 102*c* as shown in FIG. 10B. With these structures, the liquid-resistance to ink is ensured. The liquid-resistance to ink can also be improved by including a silica deposition layer in a film member 102.

The film member 102 preferably has a thickness of 10 µm to 100 µm. When the thickness is less than 10 µm, breakage due to deterioration overtime tends to occur. When the thickness exceeds 100 µm, lowered flexibility makes effective creation of negative pressure difficult.

The film member 102 has a raised part 102*a* that forms a protrusion corresponding to the spring 103. A reinforcing member 104 is attached to the outer surface of the raised part 102*a*. The protrusion of the flexible film 102 serves to hold the elastic member (here, a spring) 103 in a stable manner. In this case, a protrusion can easily be provided to the flexible film member 102 by shaping a sheet film member into a protrusion.

The case 101 has an ink introducing channel 111 for refilling the ink holding part 100 with ink. A coupling means 112 for coupling the ink introducing channel 111 to the supply tube 16 connected to the ink cartridge 10 is detachably mounted. A liquid-transfer pump for pressure-feeding ink from the ink cartridge 10 to the sub tank 15 as described later is provided between the ink cartridge 10 and the sub tank 15.

A coupling member 113 for supplying ink from the ink holding part 100 to the recording head 14 is provided at the bottom of the case 101. The coupling member 113 has an ink supply channel 114 to the recording head 14. A filter 115 is interposed between the ink holding part 100 and the coupling member 113.

An air channel 121 for releasing air from the ink holding part 100 is formed in the top part of the case 101. The air channel 121 has an inlet channel 122 that is open to the ink holding part 100 and a channel (termed "the orthogonal channel") 123 continued from the inlet channel 122. The channel is connected to an air releasing hole 131 formed in the case 101 at the downstream end. An accumulation area 126 is continuously formed at a position that is below the air releasing hole 131 while in use.

The air releasing hole 131 has an air releasing valve mechanism 132 that is a means for switching the sub tank 15 between the closed state and the air-releasing state. The air releasing valve 132 is constituted by housing a valve seat 134, a valve body ball 135, and a spring 136 for biasing the ball 135 toward the valve seat 135 in a holder 133.

Effect of the accumulation part 126 is described. When the apparatus body is tilted or shaken, ink highly possibly enters the air channel 121. Then, ink that has entered through the air channel 121 is accumulated in the accumulation part 126. In this way, even if the ink enters there for example upon dropping during transport, malfunction of the air releasing valve mechanism 132 due to entry and adhesion of the ink in the air releasing hole 131 and the air releasing valve mechanism 132 for opening/closing the air releasing hole 131 can be prevented.

Two detection electrodes 141 and 142 for detecting the ink level in the sub tank 15 being lower than a predetermined level (this state is defined as "no ink") are provided at the top of the case 101. The "no ink" state can be detected by changes in conduction between the detection electrodes 141 and 142, the conduction being changed between the state in which neither detection electrode 141 or 142 is immersed in the ink and the state in which one of them is not immersed in the ink.

Figure 12:
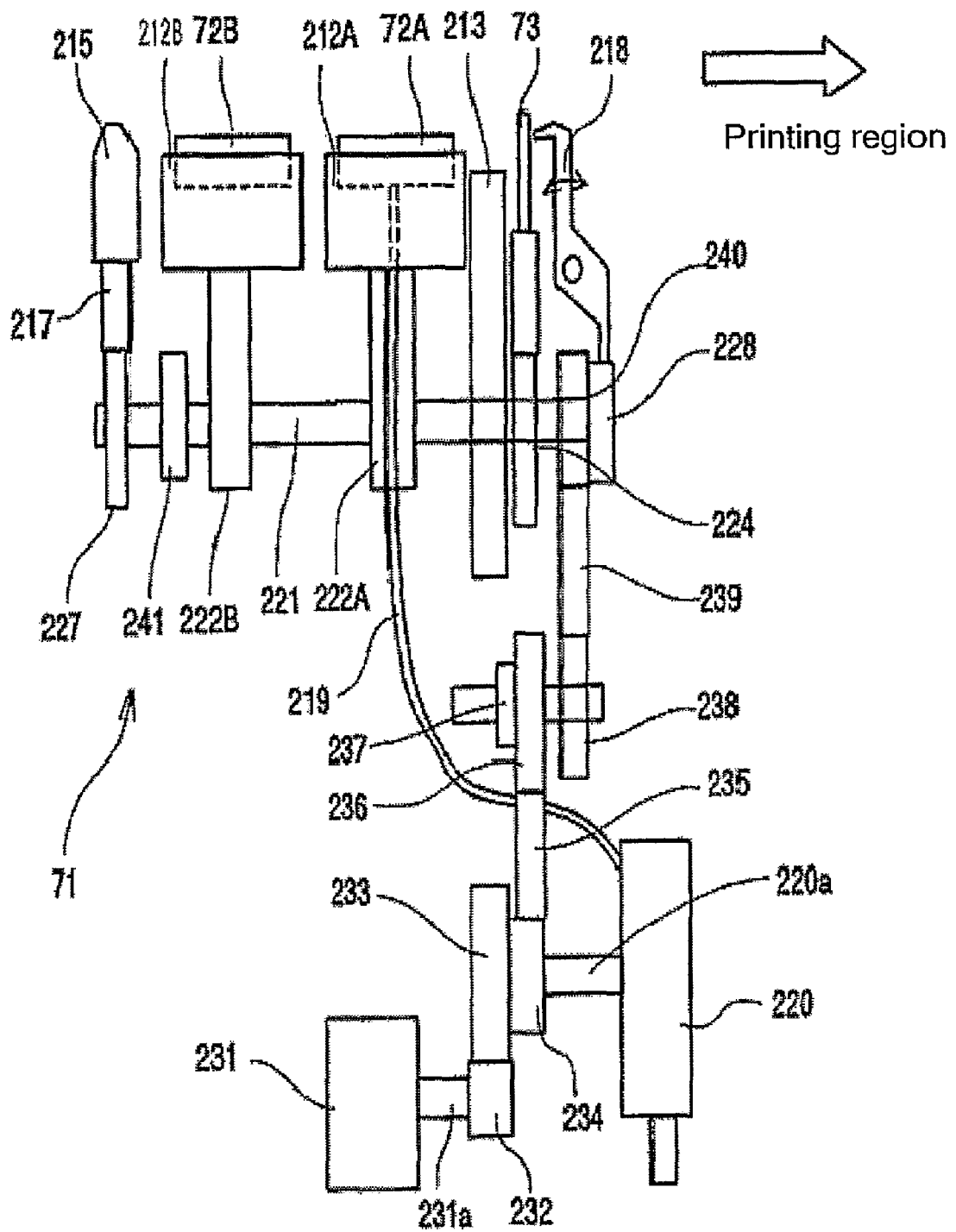
FIG. 12 is a schematic illustration showing an embodiment of the maintenance unit of the inkjet recording apparatus of the present invention.
Figure 13:
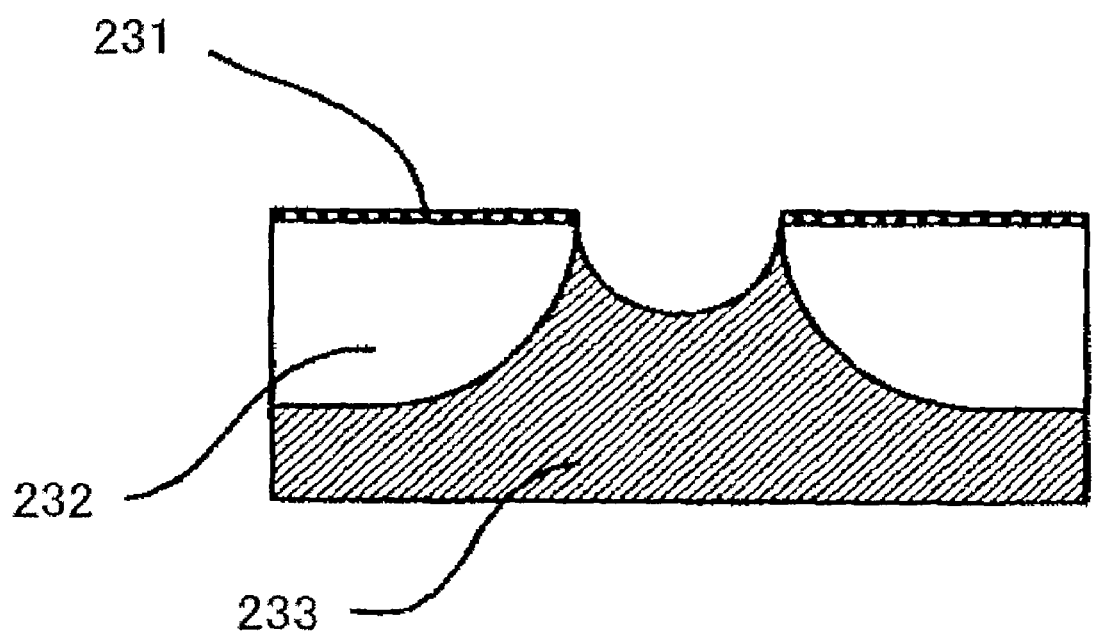
FIG. 13 is a schematic cross-sectional view showing an embodiment of the nozzle plate of the inkjet head of the inkjet recording apparatus of the present invention.

The inkjet recording apparatus of the present invention has a maintenance/recovery mechanism (termed "the subsystem" in some occasions hereafter) 71 for maintaining and recovering the nozzle state of the recording head 14 in the non-print area on one side (or on both sides) of the carriage 13 in the scanning direction. FIG. 11 is a top view of the maintenance/recovery mechanism. FIG. 12 is a schematic illustration for explaining the maintenance unit. The subsystem 71 has cap members 72A and 72B for capping the nozzle surfaces of the recording heads 14a and 14b, respectively, and a wiper blade 73 for wiping the nozzle surfaces. An idle dispense receiver used during the idle dispensing of ink is provided between the cap member 72A and the wiper blade 73. The idle dispense receiver is designed to allow the ink to be dispensed therein and flow to the waste tank below. Ink tends to adhere to this part (the part where ink is dispensed). The wiper is provided to automatically scrape off the adhered ink.

The maintenance/recovery mechanism 71 according to the inkjet recording apparatus of the present invention is described hereafter.

As shown in FIGS. 11 and 12, when a motor 231 rotates forwards, a motor gear 232, a pump gear 234, an intermediate gear 235, an intermediate gear 236, and an intermediate gear 237 are rotated. Then, a tube pump 220 is activated to suck at the right most cap (on the recording area side) connected thereto by a tube 219. The other gears do not operate because a one-way clutch 237 is disconnected.

When the motor 231 is reversed, the one-way clutch 237 is connected and the motor through the cam shaft are rotated. The tube pump 220 is reversed; however, it is designed not to work as a pump.

A carriage lock cam 227 and cap cams 222B and 222A, a wiper cam 224 and a wiper cleaner cam 228, and a home position sensor cam 241 are mounted on a cam shaft 221 so that they rotate in an integrated manner.

A carriage lock 215 is biased upward (the locking direction) by a compression spring (not shown). The carriage lock 215 is moved vertically by a carriage lock arm 217 in contact with the cam surface of the carriage lock cam 227.

The caps 72A and 72B and cap holders 212A are moved vertically by the cap cam 222A and 222B.

The wiper 73 is moved vertically by the wiper cam 228.

The wiper cleaner 218 is biased away from the wiper 73 by a spring and moved to the wiper by the wiper cleaner cam 218. The wiper 73 moves downward between the wiper cleaner 218 and the idle dispense receiver, whereby ink on the wiper 73 is scraped off into the idle dispense receiver.

A sensor (photo interrupter/not shown) is fixed to the maintenance unit body. An HP lever (not shown) is activated when the cap is moved to the lowest end by the home position cam and the sensor becomes in the open state and detects the motor (except for the pump) home position (otherwise the HP lever is not activated and the sensor is normally closed).

Upon the power-on, it moves vertically regardless of the positions of the caps 72A and 72B and cap holders 212A and 212B (the detection of the position does not occur before it starts moving), detect the cap home position (in the middle of ascending), and then shifts by a predetermined distance to move to the lowest end. Then, the carriage horizontally moves to the after-detection capping position, where the carriage is capped.

When the motor is reversed, the following series of operations are repeated: the cap ascending (and nearly simultaneously the carriage lock), cap descending (and nearly simultaneously the carriage lock), home position sensor opened, wiper ascending, wiper cleaner activated (the wiper is pressed against the idle dispense receiver), wiper descending (the wiper is scraped by the wiper cleaner), and wiper cleaner returned.

The inkjet recording apparatus and inkjet recording method of the present invention can be applied to various recordings of the inkjet system and, for example, suitably applicable to inkjet recording printers, facsimiles, copy machines, and printer/fax/copier complex machines.

(Ink Media Set)

The ink media set of the present invention has the recording ink of the present invention and a recording medium and, where necessary, further has other structures.

<Recording Medium>

The recording medium has a support and a coating layer at least on one side of the support and, where necessary, further has other layers.

The recording medium has a transfer rate of purified water to the recording medium in a contact time of 100 ms is 2 ml/m$^2$ to 35 ml/m$^2$ and more preferably 2 ml/m$^2$ to 10 ml/m$^2$ when measured by a dynamic scanning absorptometer.

When the transfer rate of the ink and purified water in a contact time of 100 ms is excessively low, the beading tends to occur. When it is excessively high, the ink dot diameter after recorded may become smaller than a desired diameter.

The transfer rate of purified water to the recording medium in a contact time of 400 ms is 3 ml/m$^2$ to 40 ml/m$^2$ and more preferably 3 ml/m$^2$ to 10 ml/m$^2$ when measured by a dynamic scanning absorptometer.

When the transfer rate in a contact time of 400 ms is excessively low, spur traces may appear due to insufficient drying. When it is excessively high, the dried images may tend to be less glossy.

The dynamic scanning absorptometer (DSA, Journal from Japan Technical Association of the Pulp and Paper Industry, Vol. 48, May 1994, pp 88-92, Kukan Shigenori) is an apparatus that can precisely measure liquid absorption in a short time. The dynamic scanning absorptometer directly reads the absorption speed based on the shift of the meniscus in a capillary and the measurement is automated as follows: a disc-shaped sample is prepared; the absorption head is scanned over the sample in a spiral manner; the scanning speed is automatically changed according to a predetermined pattern; and one sample is used for measurements of a required number of dots. The head for supplying liquid to the paper sample is connected to the capillary via a Teflon (registered trademark) tube. The position of the meniscus in the capillary is automatically read by an optical sensor. More specifically, a dynamic scanning absorptometer (K 350 series Model D, ex. Kyowa Seiko) was used to measure the transfer rate of purified water or ink. The transfer rate in contact times of 100 ms and 400 ms can be obtained based on the measurements of the transfer rate in contact times around these contact times by interpolation.

-Support-

The support is not particularly restricted and can appropriately be selected according to the purpose. For example, wood fiber-based paper or wood fiber and synthetic fiber-based sheet substances such as nonwoven fabric can be used.

The paper is not particularly restricted and can appropriately be selected among known papers. For example, wood pulp and used paper pulp can be used. Examples of the wool pulp include broad-leaved kraft pulp (LBKP), needle-leaved kraft pulp (NBKP), NBSP, LBSP, GP, and TMP.

Raw materials for the used paper pulp include clean white, ruled white, cream white, card, special white, medium white, simili, color white, Kent, white art, medium quality cutoff, and woody cutoff, newspaper, and magazines as defined in the used paper quality standards from the Paper Recycling Promotion Center. More specifically, they are used paper of paper and paper board such as printer paper such as information related non-coated computer paper, heat-sensitive paper, and pressure-sensitive paper; used OA paper such as PPC paper; coated paper such as art paper, coated paper, light-weight coated paper, and mat paper; and non-coated paper such as high quality paper, color high quality, note, letter paper, wrapping paper, fancy paper, medium quality paper, newspaper, woody paper, gift wrapping paper, simili paper, pure white roll paper, and milk carton, which may be chemical pulp paper or high yield pulp-containing paper. They can be used individually or in combination of two or more.

The used paper pulp is generally produced in the combination of the following four steps.
(1) In disaggregation, used paper is broken into filaments by mechanical force and chemicals in a pulper and print ink is detached from filaments;
(2) In dusting, foreign substances (such as plastics) and dirt in the used paper is removed by screens and cleaners;
(3) In de-inking, print ink detached from the filaments using surfactants is removed out by the flotation or cleaning technique; and
(4) In bleaching, the filaments are whitened by oxidization or reduction.

When the used paper pulp is mixed, the mixing rate of the used paper pulp in the total pulp content is preferably 40% or lower.

As internal fillers used in the base, for example, pigments conventionally known as white pigment are used. Examples of the white pigment include inorganic white pigments such as light calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatom earth, calcium silicate, magnesium silicate, synthetic silica, aluminum hydroxide, alumina, lithopone, zeolite, magnesium carbonate, and magnesium hydroxide; and organic pigments such as styrene plastic pigment, acrylic plastic pigment, polyethylene, microcapsules, urea resin, and melamine resin. They can be used individually or in combination of two or more.

Examples of internal sizing agent used to make a base sheet include neutral rosin-based sizing agent used to make neutral sheets, alkenyl succinic anhydride (ASA), alkylketenedimer (AKD), and petroleum resin-based sizing agent. Among these, the neutral rosin-based sizing agent and alkenyl succinic anhydride are particularly preferable. The alkylketenedimer is a highly effective sizing agent and only a small amount is necessary. However, the recording paper (medium) surface tends to have a lower friction factor and become slippery, which may not be advantageous for paper transfer in inkjet recording.

-Coating Layer-

The coating layer contains pigments and binders and, where necessary, further contains surfactants and other constituents.

The above pigments can be inorganic pigments or a combination of inorganic and organic pigments.

Examples of the inorganic pigments include kaolin, talc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide, and chlorite. Among these, kaolin is particularly preferable because it exhibits excellent gloss and yields texture close to offset printing paper.

Examples of the kaolin include delaminated kaolin, calcined kaolin, and engineered kaolin that is modified on the surface. Considering the gloss, it is preferable that 50% by mass or more kaolin in the total kaolin content consists of kaolin having a particle size distribution in which 80% by mass or more particles have a particle size of 2 µm or smaller.

The mixing rate of the kaolin is preferably 50 parts by mass or higher based on 100 parts by mass of the binder. When the mixing rate is less than 50 parts by mass, sufficient gloss may not be obtained. The mixing rate does not have a particular upper limit. However, considering the flowability and thickening of kaolin particularly under high shearing force, 90 parts by mass or lower is preferable and suitable for coating.

Examples of the organic pigment include aqueous dispersion of styrene-acryl copolymer particles, styrene-butadiene copolymer particles, polystyrene particles, and polyethylene particles. These organic pigments can be used in a mixture of two or more.

The mixing rate of the organic pigments is preferably 2 parts by mass to 20 parts by mass based on 100 parts by mass of the total pigments in the coating later. The organic pigments exhibit excellent gloss and have lower specific gravities. Therefore, massive, glossy, and high surface coverage coating layers are obtained. When the mixing rate is less than 2 parts by mass, the above effects are not obtained. When the mixing rate exceeds 20 parts by mass, deteriorated flowability of the coating solution leads to lowered coating operation efficiency. It is also economically disadvantageous in terms of cost.

The organic pigments are classified in shape into solid, hollow, and donut types. In balancing the gloss, surface coverage, and flowability of the coating solution, the particle size is preferably 0.2 µm to 3.0 µm. More preferably, hollow type pigments having a void ratio of 40% or higher are used.

The binder is preferably composed of aqueous resins.

As the aqueous resin, at least either water-soluble resins or water-dispersible resins are preferably used. The water-soluble resins are not particularly restricted and can appropriately be selected according to the purpose. Their examples include modified polyvinylalcohols such as polyvinylalcohol, anion-modified polyvinylalcohol, cation-modified polyvinylalcohol, acetal-modified polyvinylalcohol; polyulethane; modified polyvinylpyrrolidone such as polyvinyl pyrrolidone, and copolymers of polyvinyl pyrrolidone and vinyl acetate, copolymers of vinyl pyrrolidone and dimethylaminoethyl-methacrylic acid, copolymers of quaternaried pyrrolidone and dimethylaminoethyl methacrylic acid, copolymers of vinylpyrrolidone and imethacrylamidopropyl trimethylammonium chloride; celluloses such as carboxymethyl cellulose, hydroxy ethyl cellulose, hydroxy propyl cellulose; modified celluloses such as cationized hydroxy ethyl cellulose; polyester, polyacrylic acid (ester), melamine resin, or their modified products, synthetic resins such as copolymers of polyester and polyurethane; poly(metha)acrylic acid, poly(metha)acrylamide, oxidized starch, phosphoric acid esterificated starch, self-modified starch, cationized starch, or various modified starches, polyethylene oxide, sodapolyacrylate, and soda alginate. They can be used individually or in combination of two or more.

Among these, polyvinylalcohol, cation-modified polyvinylalcohol, acetal-modified polyvinylalcohol, polyester, polyurethane, copolymers of polyester and polyurethane are particularly preferable form a viewpoint of ink absorption.

The water-dispersible resins are not particularly restricted and can appropriately be selected according to the purpose. Their examples include polyvinyl acetate, ethylene-vinyl acetate copolymers, polystyrene, styrene-(meth)acrylic acid ester copolymers, (meth)acrylic acid ester-based copolymers, vinyl acetate-(meth)acrylic acid (ester) copolymers, styrene-butadiene copolymers, ethylene-propylene copolymers, polyvinylether, and silicone-acryl-based copolymers. Other examples include those containing cross-linking agents such as methylol melamine, methylol urea, methylol hydroxypropylene urea, and isocyanate and self-crosslinkable copolymers containing units such as N-methylolacrylamide.

The mixing rate of the aqueous resins is preferably 2 parts by mass to 100 parts by mass and more preferably 3 parts by mass to 50 parts by mass based on 100 parts by mass of the pigments. The mixing rate of the aqueous resins is determined so that the liquid absorbance of the recording medium will be within a desired range.

When the colorants are water-dispersible colorants, cationic organic compounds are not particularly restricted and can appropriately be selected according to the purpose although they are not necessarily mixed. For example, monomers, oligomers, polymers of primary to tertiaryamine and quaternary ammonium salt that react with sulfonic, carboxyl, oramino group in the direct dyes or acidic dyes in the aqueous ink to form insoluble salts can be used. Among these, oligomers and polymers are preferable.

Examples of the cationic organic compounds include dimethylamine/epichlorhydrin polycondensates, dimethylamine/ammonia/epichlorhydrinpolycondensates, poly(trimethylaminoethyl methacrylate/methyl sulfate), diaryl amine hydrochloride/acrylamide polycondensates,
poly(diarylamine hydrochloride/sulfur dioxide), polyarylamine
hydrochloride, poly(arylamine hydrochloride/diaryl amine hydrochloride), acrylamide/diarylamine copolymers, polyvinylamine copolymers, dicyandiamide, dicyandiamide/ammonium chloride/ureaformaldehide condensates, polyalkylelepolyamine/dicyandiamideammonium salt condensates, dimethyldiaryl ammonium chloride, polydiaryl methylamine hydrochloride, poly(diaryldimethylammonium chloride), poly(diaryldimethylammonium chloride/sulfur dioxide), poly(diaryldimethylammonium chloride/diarylamine hydrochloride derivatives), acrylamide/diaryldimethylammonium chloride copolymers, acrylate/acrylamide/diarylamine hydrochloride copolymers, ethyleneimine derivatives such as polyethyleneimine and acrylaminepolymers, and modified polyethyleneimineallkylene oxide. They can be used individually or in combination of two or more.

Among these, combinations of low molecular weight cationic organic compounds such as dimethylamine/epichlorhydrin polycondensates and polyarylamine hydrochloride, and other relatively high molecular weight cationic organic compounds such as poly(diaryldimethylammonium chloride) are preferable. Combined use improves image densities and further reduces feathering compared to individual use.

The cationic organic compounds preferably have a cation equivalent of 3 meq/g to 8 meq/g when measured by the colloid titration method (polyvinyl potassium sulfate, toluidine blue). The cation equivalent in this range yields excellent results in the above dry adhesion rate.

For determining the cation equivalent by the colloid titration method, the cationic organic compound is diluted with water to a solid content of 1% by mass and no pH adjustment is conducted.

The dry adhesion rate of the cationic organic compounds is preferably 0.3 g/m$^2$ to 2.0 g/m$^2$. When the dry adhesion rate of the cationic organic compounds is lower than 0.3 g/m$^2$, some effects such as sufficiently improved image densities and reduced feathering may not be obtained.

The surfactants are not particularly restricted and can appropriately be selected according to the purpose. Any of anionic, cationic, amphoteric, and nonionic surfactants can be used. Among these, nonionic surfactants are particularly preferable. With the addition of surfactants, improved water-resistance of images, higher image densities, and improved bleeding are achieved.

Examples of the nonionic surfactants include higher alcohol ethylele oxide adducts, alykylphenol ethylele oxide adducts, fatty acid ethylele oxide adducts, polyalcohol fatty acid ester ethylene oxide adducts, higher aliphatic amine ethylene oxide adducts, fatty acid amide ethylene oxide adducts, fats and oils ethylene oxide adducts, polypropylene glycol ethylene oxide adducts, glycerol fatty acid ester, pentaerythritol fatty acid ester, sorbitol and sorbitan fatty acid ester, sugar fatty acid ester, polyalcohol alkyl ether, and fatty acid amide such as alkanolamine. They can be used individually or in combination of two or more.

The polyalcohol is not particularly restricted and can appropriately be selected according to the purpose. Its examples include glycerol, trimethylol propane, pentaerythrit, sorbitol, and sugar. As for the ethylene oxide adducts, ethylene oxide partly substituted by alkylene oxide such as propylene oxide or butylene oxide can be effective as long as they remain water-soluble. The substitute rate is preferably 50% or lower. The nonionic surfactants preferably have an HLB (hydrophilic/lipophilic balance) of 4 to 15 and more preferably 7 to 13.

The mixing rate of the surfactants is preferably 0 parts by mass to 10 parts by mass and more preferably 0.1 parts by mass to 1.0 part by mass based on 100 parts by mass of the cationic organic compounds.

The coating layer can contain other constituents where necessary as long as they do not impair the purpose and effect of the present invention. Examples of the other constituents include alumina power, pH adjuster, preservative, and antioxidant.

The formation of the coating layer is not particularly restricted and can appropriately be selected according to the purpose. The coating layer can be formed by impregnating or applying the coating solution on the base. The impregnation or application of the coating solution is not particularly restricted and can appropriately be selected according to the purpose: For example, various coaters such as conventional size press, gate roll size press, film transfer size press, blade coater, rod coater, air knife coater, and curtain coater can be used for coating. From a viewpoint of cost, a conventional size press, gate roll size press, or film transfer press, which is equipped in the papermaking machine, can be used for impregnation or deposition, which is followed by on-machine finishing.

The deposition rate of the coating layer solution is not particularly restricted and can appropriately be selected according to the purpose. The deposition rate expressed in solid content is preferably 0.5 g/m$^2$ to 20 g/m$^2$ and more preferably 1 g/m$^2$ to 15 g/m$^2$.

The impregnation or application is followed by drying where necessary. The drying temperature is not particularly restricted and can appropriately be selected according to the purpose. Preferably, the temperature is approximately 100° C. to 250° C.

The recording medium can also have a back layer on the back of the base and other layers between the base and the coating layer or between the base and the back layer. A protective layer can be provided on the coating layer. These layers can be a single layer or a multilayer.

The recording medium can be electrophotography recording paper, commercially available coated offset printing paper, coated gravure printing paper besides inkjet recording media as long as they have liquid absorption properties in the range of the present invention.

(Ink Recorded Matter)

Ink recorded matter recorded by the inkjet recording apparatus and inkjet recording method of the present invention include the ink recorded matter of the present invention. The ink recorded matter of the present invention has images formed on a recording medium using the recording ink of the present invention.

The recording medium is not particularly restricted and can appropriately be selected according to the purpose. Examples of the recording medium include regular paper, coated printing paper, glossy paper, special paper, fabric, film, and OHP sheet. They can be used individually or in combination of two or more. Among these, at least one of regular paper and coated printing paper is preferable.

Regular paper is advantageous because of low price. The coated printing paper is advantageous in yielding smooth glossy images although it is relatively inexpensive compared to glossy paper. The coated printing paper has poor drying properties and generally had difficulty in inkjet applications. However, the recording ink of the present invention makes the coated printing paper usable.

The coated printing paper is a recording medium having a base and a coating layer at least on one side of the base wherein when measured by a dynamic scanning absorptometer, the transfer rate of purified water to the recording medium in a contact time of 100 ms is 2 ml/m$^2$ to 35 ml/m$^2$ and the transfer rate of purified water to the recording medium in a contact time of 400 ms is 3 ml/m$^2$ to 40 ml/m$^2$. These transfer rates or liquid absorption ability is lower compared to commercially available inkjet paper.

The recording ink of the present invention is particularly useful for recording media having particularly low transfer rates or liquid absorption ability. More specifically, when measured by a dynamic scanning absorptometer, the transfer rate of purified water to the recording medium in a contact time of 100 ms is 2 ml/m$^2$ to 10 ml/m$^2$ and the transfer rate of purified water to the recording medium in a contact time of 400 ms is 3 ml/m$^2$ to 10 ml/m$^2$.

When the liquid transfer rate in a contact time of 100 ms is lower than the above range, the beading tends to occur. When it is higher, the recorded ink dot diameter may be smaller than a desired diameter. When the liquid transfer rate in a contact time of 400 ms is lower than the above range, the spur traces tends to occur because of insufficient drying and the dried images are less glossy. However, such phenomenon depends on the drying time. The recording ink of the present invention in which the mixing rate of high boiling point liquid constituents is set for a proper range exhibits the effects to a certain extent even on paper under the above range.

The above low absorbent paper is commercially available as coated offset printing paper.

The ink recorded matter has high quality, no running ink, and stability with time and preferably used in various applications as recorded materials of various printing or images.

The present invention resolves problems in the prior art and provides a recording ink reducing the occurrence of beading and causing no problems with the drying time so that clear images close to commercial/published print are obtained even in printing on low absorbent coated printing paper, and an ink-medium set, ink cartridge, ink recorded matter, inkjet recording apparatus that is free from clogged nozzles after a prolonged unused period, and inkjet recording method.

EXAMPLES

Examples of the present invention are described hereafter. However, the present invention shall not be limited to these examples.

Manufacturing Example 1

Preparation of Polymer Solution A

After the inside of a 1-L flask equipped with a mechanical stirrer, a thermometer, a nitrogen gas introduction pipe, a reflux pipe and a dripping funnel was sufficiently filled with nitrogen, 11.2 g of styrene, 2.8 g of acrylic acid, 12.0 g of lauryl methacrylate, 4.0 g of polyethylene glycol methacrylate, 4.0 g of styrene macromer (manufactured by Toagosei Co., Ltd., trade name: AS-6) and 0.4 g of mercaptoethanol were mixed, and the temperature was increased to 65° C.

Next, it took 2.5 hours to drip a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (manufactured by Toagosei Co., Ltd., trade name: AS-6), 3.6 g of mercaptoethanol, 2.4 g of azobismethylvaleronitrile and 18 g of methyl ethyl ketone into the flask. After the dripping was completed, it took 0.5 hours to drip a mixed solution of 0.8 g of azobismethylvaleronitrile and 18 g of methyl ethyl ketone into the flask. After the mixture was matured at 65° C. for 1 hour, 0.8 g of azobismethylvaleronitrile were added and the mixture was matured for another hour. After the reaction was completed, 364 g of methyl ethyl ketone were added into the flask, and 800 g the polymer solution A whose concentration was 50% by mass were prepared.

Manufacturing Example 1-1

Preparation of Dispersion Element of Polymer Particulates Containing Copper Phthalocyanine Pigments Next, after 46 g of the obtained polymer solution A, 33 g of copper phthalocyanine pigments, 13.6 g of 1 mol/L potassium hydroxide solution, 20 g of methyl ethyl ketone and 13.6 g of ion exchanged water were sufficiently stirred, the mixture was kneaded using a roll mill. After the obtained paste was placed into 200 g of purified water and the mixture was sufficiently stirred, methyl ethyl ketone and water were distilled away by using an evaporator. Then, glycerin was added, and a dispersion element of polymer particulates containing copper phthalocyanine pigments for Preparation Example 1-1 containing 10.9% by mass of pigments, 7.5% by mass of resins (18.4% by mass of solid content) and 9.1% by mass of glycerin was prepared.

Manufacturing Example 1-2

Preparation of Water Dispersion of Polymer Particulates Containing Magenta Pigments Water dispersion of polymer particulates containing magenta pigments for Manufacturing Example 1-2 was prepared similarly to Manufacturing Example 1-1 except for using C.I. pigment red 122 instead of copper phthalocyanine pigments in Manufacturing Example 1-1. The water dispersion of polymer particulates containing magenta pigments for this Manufacturing Example 1-2 contained 13.6% by mass of pigments, 4.5% by mass of resins (18.1% by mass of solid content) and 9.1% by mass of glycerin.

Manufacturing Example 1-3

Preparation of Water Dispersion of Polymer Particulates Containing Yellow Pigments Water dispersion of polymer particulates containing yellow pigments for Manufacturing Example 1-3 was prepared similarly to Manufacturing Example 1-1 except for using C.I. pigment yellow 74 instead of copper phthalocyanine pigments in Manufacturing Example 1-1. The water dispersion of polymer particulates containing yellow pigments for this Manufacturing Example 1-3 contained 10.9% by mass of pigments, 7.5% by mass of resins (18.4% by mass of solid content) and 9.1% by mass of glycerin.

Manufacturing Example 2

Preparation of Dispersion Liquid of Surface-Treated Black Pigments

Addition of 90 g of carbon black whose CTAB specific surface area is 150 m$^2$/g and DBP oil absorption is 100 ml/100 g into 3,000 ml of 2.5N sodium sulphate solution was conducted, and the mixture was stirred at 60° C. of temperature with 300 rpm of speed, and the mixture was reacted for oxidation treatment for 10 hours. This reaction liquid was filtrated; the separated carbon black by the filtration was neutralized with a sodium hydroxide solution; and ultrafiltration was conducted. The obtained carbon black was rinsed with water and dried; it was dispersed into purified water so as to be 20% by mass of pigments (20% by mass of solid content), and the dispersion liquid of surface-treated carbon black pigments for Manufacturing Example 2 was prepared.

Manufacturing Example 3

Preparation of Dispersion Element of Acrylic Silicone Particulates B

After the inside of a 1-L flask equipped with a mechanical stirrer, a thermometer, a nitrogen gas introduction pipe, a reflux pipe and a dripping funnel was sufficiently filled with nitrogen, 8.0 g of Ramtel S-180 (a reactive emulsifying agent, manufactured by Kao Corporation, 100% by mass of component) and 350 g of ion exchanged water were added and mixed, and the temperature was increased to 65° C. After the temperature was increased, 3.0 g of t-butyl peroxobenzoate, which is an initiating reagent, and 1.0 g of sodium isoascorbic acid were added, and 45 g of methyl methacrylate, 160 g of 2-ethylhexyl methacrylate, 5 g of acrylic acid, 45 g of butyl methacrylate, 30 g of cyclohexyl methacrylate, 15 g of vinyl triethoxy silane, 8.0 g of Ramtel S-180 (a reactive emulsifying agent, manufactured by Kao Corporation, 100% by mass of component) and 340 g of ion exchanged water were mixed after 5 minutes, and it took 3 hours to drip this mixture. Then, after heating and maturing at 80° C. for 2 hours, the mixture was cooled down to room temperature, and pH was adjusted to 7 to 8 with sodium hydroxide. Ethanol was distilled away using an evaporator; the moisture was adjusted; and 730 g of a solution of dispersion element of acrylic silicone particulates B with 40% by mass of solid content was obtained for Manufacturing Example 3.

Example 1

-Preparation of Recording Ink-

An ink composition with the formulation mentioned below was prepared, and after pH was adjusted, this ink composition was filtrated with a membrane filter with 5 μm of average pore diameter, and the recording ink was prepared.

<Ink Composition>

| | |
|---|---|
| Dispersion element of polymer particulates containing copper phthalocyanine pigments of Manufacturing Example 1-1 [10.9% by mass of pigments, 7.5% by mass of resins (18.4% by mass of solid content), 9.1% by mass of glycerin, balance: water] | 45.83% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 10% by mass |
| Glycerin as a humectant | 3.96% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildewproofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin as a humectant, which is a liquid at room temperature (25° C.), 2-ethyl-1,3-hexanediol as a penetrant, which is a liquid at room temperature (25° C.), and the surfactant was 11.13% by mass. These are equivalent to the liquid constituents within the ink, which is a liquid at 25° C., and whose boiling point is higher than that of water.

The content of the colorant, which is a solid at room temperature (25° C.), was 5.0% by mass.

For the resin constituents, a total amount was 7.43% by mass with a resin from the dispersion element of polymer particulates containing copper phthalocyanine pigments and a resin from the acrylic silicone emulsion. A total amount of the colorant and the resin constituents was 12.43% by mass. These are equivalent to solid constituents, which are solids within the ink at 25° C. Therefore, a ratio A/B of the total amount of the liquid constituents within the recording ink A to the total amount of the solid constituents within the recording ink B was 0.90 resulting from 11.13/12.43.

Further, a ratio of the total amount of the high boiling point humectant whose boiling point within the liquid constituents is 230° C. or higher (glycerin in this example) to the total amount of the liquid constituents was 73% by mass resulting from (3.96+4.17)/11.13×100.

Further, the total amount of the resin constituents to the total amount of the colorant and the resin constituents was 60% by mass resulting from [7.43/(5.0+7.43)]×100.

Furthermore, the resin constituents herein contain a resin from the dispersion element of polymer particulates containing copper phthalocyanine pigments, as well. This is also similarly applied to examples and comparative examples hereafter.

Example 2

-Preparation of Recording Ink-

After an ink composition with the formulation mentioned below was prepared and its pH was adjusted, this ink composition was filtrated with a membrane filter with 5 µm of average pore diameter, and the recording ink was prepared.
<Ink Composition>

| | |
|---|---|
| Dispersion element of polymer particulates containing copper phthalocyanine pigments of Manufacturing Example 1-1 [10.9% by mass of pigments, 7.5% by mass of resins (18.4% by mass of solid content), 9.1% by mass of glycerin, balance: water] | 45.83% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 10% by mass |
| Glycerin as a humectant | 8.26% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin as a humectant, which is a liquid at room temperature (25° C.), 2-ethyl-1,3-hexanediol as a penetrant, which is a liquid at room temperature (25° C.), and the surfactant was 15.43% by mass. These are equivalent to the liquid constituents within the ink, which is a liquid at 25° C., and whose boiling point is higher than that of water.

The content of the colorant, which is a solid at room temperature (25° C.), was 5.0% by mass.

For the resin constituents, a total content was 7.43% by mass with a resin from the dispersion element of the polymer particulates containing copper phthalocyanine pigments and a resin from the acrylic silicone emulsion. A total amount of the colorant and the resin constituents was 12.43% by mass. These are equivalent to solid constituents, which are solids within the ink at 25° C. Therefore, a ratio A/B of the total amount of the liquid constituents within the recording ink A to the total amount of the solid constituents within the recording ink B was 1.24 resulting from 15.43/12.43.

Further, a ratio of the total amount of the high boiling point humectant whose boiling point within the liquid constituents is 230° C. or higher (glycerin in this example) to the total amount of the liquid constituents was 81% by mass resulting from (8.26+4.17)/15.43×100.

Further, the total amount of the resin constituents with respect to the total amount of the colorant and the resin constituents was 60% by mass resulting from [7.43/(5.0+7.43)]×100.

Example 3

-Preparation of Recording Ink-

After an ink composition with the formulation mentioned below was prepared and its pH was adjusted, this ink composition was filtrated with a membrane filter with 5 µm of average pore diameter, and the recording ink was prepared.
<Ink Composition>

| | |
|---|---|
| Dispersion element of polymer particulates containing copper phthalocyanine pigments of Manufacturing Example 1-1 [10.9% by mass of pigment, 7.5% by mass of resins (18.4% by mass of solid content), 9.1% by mass of glycerin, balance: water] | 45.83% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 10% by mass |
| Glycerin as a humectant | 14.48% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin as a humectant, which is a liquid at room temperature (25° C.), 2-ethyl-1,3-hexanediol as a penetrant, which is a liquid at room temperature (25° C.), and the surfactant was 21.65% by mass. These are equivalent to the liquid constituents within the ink, which is liquid at 25° C., and whose boiling point is higher than that of water.

The content of the colorant, which is a solid at room temperature (25° C.), was 5.0% by mass.

For the resin constituents, a total content was 7.43% by mass with a resin from the dispersion element of polymer particulates containing copper phthalocyanine pigments and a resin from the acrylic silicone emulsion. A total amount of the colorant and the resin constituents was 12.43% by mass. These are equivalent to solid constituents, which are solids within the ink at 25° C. Therefore, a ratio A/B of the total amount of the liquid constituents within the recording ink A to the total amount of the solid constituents within the recording ink B was 1.74 resulting from 21.65/12.43.

Further, a ratio of the total amount of the high boiling point humectant whose boiling point within the liquid constituents is 230° C. or higher (glycerin in this example) to the total amount of the liquid constituents was 86% by mass resulting from (14.48+4.17)/21.65×100.

Further, the total amount of the resin constituents to the total amount of the colorant and the resin constituents was 60% by mass resulting from [7.43/(5.0+7.43)]×100.

Example 4

Preparation of Recording Ink

After an ink composition with the formulation mentioned below was prepared and its pH was adjusted, this ink composition was filtrated with a membrane filter with 5 μm of average pore diameter, and the recording ink was prepared.
<Ink Composition>

| | |
|---|---|
| Dispersion element of polymer particulates containing copper phthalocyanine pigments of Manufacturing Example 1-1 [10.9% by mass of pigments, 7.5% by mass of resins (18.4% by mass of solid content), 9.1% by mass of glycerin, balance: water] | 45.83% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 10% by mass |
| Glycerin as a humectant | 2.05% by mass |
| 1,3-butanediol as a humectant | 6.22% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin and 1,3-butanediol as a humectants, which are a liquid at room temperature (25° C.), respectively, 2-ethyl-1,3-hexanediol as a penetrant, which is a liquid at room temperature (25° C.), and the surfactant was 15.43% by mass. These are equivalent to the liquid constituents within the ink, which is a liquid at 25° C., and whose boiling point is higher than that of water.

The content of the colorant, which is a solid at room temperature (25° C.), was 5.0% by mass.

For the resin constituents, a total content was 7.43% by mass with a resin from the dispersion element of polymer particulates containing copper phthalocyanine pigments and a resin from the acrylic silicone emulsion. A total amount of the colorant and the resin constituents was 12.43% by mass. These are equivalent to solid constituents, which are solids within the ink at 25° C. Therefore, a ratio A/B of the total amount of the liquid constituents within the recording ink A to the total amount of the solid constituents within the recording ink B was 1.24 resulting from 15.43/12.43.

Further, a ratio of the total amount of the high boiling point humectant whose boiling point within the liquid constituents is 230° C. or higher (glycerin in this example) to the total amount of the liquid constituents was 40% by mass resulting from (2.05+4.17)/15.43×100.

Further, the total amount of the resin constituents to the total amount of the colorant and the resin constituents was 60% by mass resulting from [7.43/(5.0+7.43)]×100.

Example 5

-Preparation of Recording Ink-
After an ink composition with the formulation mentioned below was prepared and its pH was adjusted, this ink composition was filtrated with a membrane filter with 5 μm of average pore diameter, and the recording ink was prepared.
<Ink Composition>

| | |
|---|---|
| Dispersion element of polymer particulates containing copper phthalocyanine pigments of Manufacturing Example 1-1 [10.9% by mass of pigment, 7.5% by mass of resins (18.4% by mass of solid content), 9.1% by mass of glycerin, balance: water] | 25.80% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 36% by mass |
| Glycerin as a humectant | 10.10% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin as a humectant, which is a liquid at room temperature (25° C.), 2-ethyl-1,3-hexanediol as a penetrant, which is a liquid at room temperature (25° C.), and the surfactant was 15.45% by mass. These are equivalent to the liquid constituents within the ink, which is a liquid at 25° C., and whose boiling point is higher than that of water.

The content of the colorant, which is a solid at room temperature (25° C.), was 2.81% by mass.

For the resin constituents, a total content was 16.34% by mass with a resin from the dispersion element of polymer particulates containing copper phthalocyanine pigments and a resin from the acrylic silicone emulsion. A total amount of the colorant and the resin constituents was 19.15% by mass. These are equivalent to solid constituents, which are solids within the ink at 25° C. Therefore, a ratio A/B of the total amount of the liquid constituents within the recording ink A to the total amount of the solid constituents within the recording ink B was 0.81 resulting from 15.45/19.15.

Further, a ratio of the total amount of the high boiling point humectant whose boiling point within the liquid constituents is 230° C. or higher (glycerin in this example) to the total amount of the liquid constituents was 81% by mass resulting from (10.10+2.35)/15.45×100.

Further, the total amount of the resin constituents to the total amount of the colorant and the resin constituents was 85% by mass resulting from [16.34/(2.81+16.34)]×100.

Comparative Example 1

-Preparation of Recording Ink-
After an ink composition with the formulation mentioned below was prepared and its pH was adjusted, this ink composition was filtrated with a membrane filter with 5 μm of average pore diameter, and the recording ink was prepared.
<Ink Composition>

| | |
|---|---|
| Dispersion element of polymer particulates containing copper phthalocyanine pigments of Manufacturing Example 1-1 | 45.83% by mass |

-continued

| | |
|---|---|
| [10.9% by mass of pigment, 7.5% by mass of resins (18.4% by mass of solid content), 9.1% by mass of glycerin, balance: water] | |
| Acrylic silicone emulsion of Manufacturing Example 3 | 10% by mass |
| [40% by mass of solid content, balance: water, volume average particle size: 150 nm, glass transfer temperature of resin constituents: −15° C. (differential heat rising) to −6° C. (inflexion point)] | |
| Glycerin as a humectant | 3.96% by mass |
| 1,3-butanediol as a humectant | 24.39% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin and 1,3-butanediol as a humectant, which are a liquid at room temperature (25° C.), respectively, 2-ethyl-1,3-hexanediol as a penetrant, which is a liquid at room temperature (25° C.), and the surfactant was 35.52% by mass. These are equivalent to the liquid constituents within the ink, which is a liquid at 25° C., and whose boiling point is higher than that of water.

The content of the colorant, which is a solid at room temperature (25° C.), was 5.0% by mass.

For the resin constituents, a total content was 7.43% by mass with a resin from the dispersion element of polymer particulates containing copper phthalocyanine pigments and a resin from the acrylic silicone emulsion. A total amount of the colorant and the resin constituents was 12.43% by mass. These are equivalent to solid constituents, which are solids within the ink at 25° C. Therefore, a ratio A/B of the total amount of the liquid constituents within the recording ink A to the total amount of the solid constituents within the recording ink B was 2.86 resulting from 35.52/12.43.

Further, a ratio of the total amount of the high boiling point humectant whose boiling point within the liquid constituents is 230° C. or higher (glycerin in this example) to the total amount of the liquid constituents was 23% by mass resulting from (3.96+4.17)/35.52×100.

Further, the total amount of the resin constituents with respect to the total amount of the colorant and the resin constituents was 60% by mass resulting from [7.43/(5.0+7.43)]×100.

Comparative Example 2

-Preparation of Recording Ink-

After an ink composition with the formulation mentioned below was prepared and its pH was adjusted, this ink composition was filtrated with a membrane filter with 5 μm of average pore diameter, and the recording ink was prepared.
<Ink Composition>

| | |
|---|---|
| Dispersion element of polymer particulates containing copper phthalocyanine pigments of Manufacturing Example 1-1 | 45.83% by mass |

-continued

| | |
|---|---|
| [10.9% by mass of pigment, 7.5% by mass of resins (18.4% by mass of solid content), 9.1% by mass of glycerin, balance: water] | |
| Acrylic silicone emulsion of Manufacturing Example 3 | 10% by mass |
| [40% by mass of solid content, balance: water, volume average particle size: 150 nm, glass transfer temperature of resin constituents: −15° C. (differential heat rising) to −6° C. (inflexion point)] | |
| Glycerin as a humectant | 0.91% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin as a humectant, which is a liquid at room temperature (25° C.), 2-ethyl-1,3-hexanediol as a penetrant, which is a liquid at room temperature (25° C.), and the surfactant was 8.08% by mass. These are equivalent to the liquid constituents within the ink, which is a liquid at 25° C., and whose boiling point is higher than that of water.

The content of the colorant, which is a solid at room temperature (25° C.), was 5.0% by mass.

For the resin constituents, a total content was 7.43% by mass with a resin from the dispersion element of polymer particulates containing copper phthalocyanine pigment and a resin from the acrylic silicone emulsion. A total amount of the colorant and the resin constituents was 12.43% by mass. These are equivalent to solid constituents, which are solids within the ink at 25° C. Therefore, a ratio A/B of the total amount of the liquid constituents within the recording ink A to the total amount of the solid constituents within the recording ink B was 0.65 resulting from 8.08/12.43.

Further, a ratio of the total amount of the high boiling point humectant whose boiling point within the liquid constituents is 230° C. or higher (glycerin in this example) to the total amount of the liquid constituents was 63% by mass resulting from (0.91+4.17)/8.08×100.

Further, the total amount of the resin constituents to the total amount of the colorant and the resin constituents was 60% by mass resulting from [7.43/(5.0+7.43)]×100.

Comparative Example 3

-Preparation of Recording Ink-

After an ink composition with the formulation mentioned below was prepared and its pH was adjusted, this ink composition was filtrated with a membrane filter with 5 μm of average pore diameter, and the recording ink was prepared.
<Ink Composition>

| | |
|---|---|
| Dispersion element of polymer particulates containing copper phthalocyanine pigments of Manufacturing Example 1-1 [10.9% by mass of pigment, 7.5% by mass of resins (18.4% by mass of solid content), 9.1% by mass of glycerin, balance: water] | 45.83% by mass |

| | |
|---|---|
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 10% by mass |
| Glycerin as a humectant | 15.21% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin as a humectant, which is a liquid at room temperature (25° C.), 2-ethyl-1,3-hexanediol as a penetrant, which is a liquid at room temperature (25° C.), and the surfactant was 22.38% by mass. These are equivalent to the liquid constituents within the ink, which is a liquid at 25° C., and whose boiling point is higher than that of water.

The content of the colorant, which is a solid at room temperature (25° C.), was 5.0% by mass.

For the resin constituents, a total content was 7.43% by mass with a resin from the dispersion element of polymer particulates containing copper phthalocyanine pigments and a resin from the acrylic silicone emulsion. A total amount of the colorant and the resin constituents was 12.43% by mass. These are equivalent to solid constituents, which are solids within the ink at 25° C. Therefore, a ratio A/B of the total amount of the liquid constituents within the recording ink A to the total amount of the solid constituents within the recording ink B was 1.80 resulting from 22.38/12.43.

Further, a ratio of the total amount of the high boiling point humectant whose boiling point within the liquid constituents is 230° C. or higher (glycerin in this example) to the total amount of the liquid constituents was 87% by mass resulting from (15.21+4.17)/22.38×100.

Further, the total amount of the resin constituents to the total amount of the colorant and the resin constituents was 60% by mass resulting from [7.43/(5.0+7.43)]×100.

Comparative Example 4

-Preparation of Recording Ink-

After an ink composition with the formulation mentioned below was prepared and its pH was adjusted, this ink composition was filtrated with a membrane filter with 5 μm of average pore diameter, and the recording ink was prepared.
<Ink Composition>

| | |
|---|---|
| Dispersion element of polymer particulates containing copper phthalocyanine pigments of Manufacturing Example 1-1 [10.9% by mass of pigment, 7.5% by mass of resins (18.4% by mass of solid content), 9.1% by mass of glycerin, balance: water] | 32.00% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 36% by mass |
| Glycerin as a humectant | 25.09% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin as a humectant, which is a liquid at room temperature (25° C.), 2-ethyl-1,3-hexanediol as a penetrant, which is a liquid at room temperature (25° C.), and the surfactant was 31.00% by mass. These are equivalent to the liquid constituents within the ink, which is a liquid at 25° C., and whose boiling point is higher than that of water.

The content of the colorant, which is a solid at room temperature (25° C.), was 3.5% by mass.

For the resin constituents, a total content was 16.8% by mass with a resin from the dispersion element of polymer particulates containing copper phthalocyanine pigments and a resin from the acrylic silicone emulsion. A total amount of the colorant and the resin constituents was 20.29% by mass. These are equivalent to solid constituents, which are solids within the ink at 25° C. Therefore, a ratio A/B of the total amount of the liquid constituents within the recording ink A to the total amount of the solid constituents within the recording ink B was 1.53 resulting from 31.00/20.29.

Further, a ratio of the total amount of the high boiling point humectant whose boiling point within the liquid constituents is 230° C. or higher (glycerin in this example) to the total amount of the liquid constituents was 90% by mass resulting from (25.09+2.91)/31.00×100.

Further, the total amount of the resin constituents to the total amount of the colorant and the resin constituents was 83% by mass resulting from [16.8/(3.49+16.8)]×100.

Comparative Example 5

-Preparation of Recording Ink-

After an ink composition with the formulation mentioned below was prepared and its pH was adjusted, this ink composition was filtrated with a membrane filter with 5 μm of average pore diameter, and the recording ink was prepared.
<Ink Composition>

| | |
|---|---|
| Dispersion element of polymer particulates containing copper phthalocyanine pigments of Manufacturing Example 1-1 [10.9% by mass of pigment, 7.5% by mass of resins (18.4% by mass of solid content), 9.1% by mass of glycerin, balance: water] | 26.00% by mass |
| Acrylic silicone emulsion of Manufacturing Example 3 [40% by mass of solid content, balance: water, volume average particle size: 150 nm, | 36.7% by mass |

-continued

| | |
|---|---|
| glass transfer temperature of resin constituents: −15° C. (differential heat rising) to −6° C. (inflexion point)] | |
| Glycerin as a humectant | 13.65% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin as a humectant, which is a liquid at room temperature (25° C.), 2-ethyl-1,3-hexanediol as a penetrant, which is a liquid at room temperature (25° C.), and the surfactant was 34.02% by mass. These are equivalent to the liquid constituents within the ink, which is liquid at 25° C., and whose boiling point is higher than that of water.

The content of the colorant, which is a solid at room temperature (25° C.), was 2.83% by mass.

For the resin constituents, a total content was 16.63% by mass with a resin from the dispersion element of polymer particulates containing copper phthalocyanine pigments and a resin from the acrylic silicone emulsion. A total amount of the colorant and the resin constituents was 19.46% by mass. These are equivalent to solid constituents, which are solids within the ink at 25° C. Therefore, a ratio A/B of the total amount of the liquid constituents within the recording ink A to the total amount of the solid constituents within the recording ink B was 1.75 resulting from 34.02/19.46.

Further, a ratio of the total amount of the high boiling point humectant whose boiling point within the liquid constituents is 230° C. or higher (glycerin in this example) to the total amount of the liquid constituents was 47% by mass resulting from (13.65+2.37)/34.02×100.

Further, the total amount of the resin constituents to the total amount of the colorant and the resin constituents was 85% by mass resulting from [16.63/(2.83+16.63)]×100.

Next, the surface tension, pH and viscosity of the recording ink obtained in Examples 1 to 5 and Comparative Example 1 to 5 were measured, respectively. The results are shown in Table 3.

<pH Measurement>

The pH was measured at 23° C. using a pH meter (Model HM3A, manufactured by DKK-TOA Corporation).

<Viscosity Measurement>

The viscosity was measured at 25° C. under conditions of a 34'×R24 cone [rotor], 180 rpm and after 3 minutes, using RE500 type viscometer (manufactured by Toki Sangyo Co., Ltd.).

<Surface Tension Measurement>

The surface tension is static surface tension measured at 25° C. using a platinum plate measured by a surface tension meter (manufactured by Kyowa Interface Science Co., Ltd., CBVP-Z).

TABLE 3

| | Viscosity (mP × s) | Surface tension (mN/m) | pH |
|---|---|---|---|
| Compara. Ex. 1 | 8.23 | 25.9 | 9.63 |
| Compara. Ex. 2 | 2.51 | 25.2 | 9.62 |
| Ex. 1 | 2.63 | 25.0 | 9.60 |
| Ex. 2 | 3.03 | 24.8 | 9.59 |
| Ex. 3 | 3.80 | 24.5 | 9.58 |
| Compara. Ex. 3 | 3.92 | 24.9 | 9.56 |
| Ex. 4 | 3.20 | 25.1 | 9.59 |
| Ex. 5 | 4.02 | 24.7 | 9.56 |
| Compara. Ex. 4 | 8.08 | 24.2 | 9.28 |
| Compara. Ex. 5 | 13.8 | 24.6 | 9.30 |

Next, a printing test was conducted with the recording ink obtained in Examples 1 to 5 and Comparative Examples 1 to 5, respectively.

<Printing Test>

Printing with the obtained recording ink was conducted using an inkjet printer (manufactured by Ricoh Company Ltd., GX5000), respectively. A silicone resin coating (room-temperature cure type silicone resin SR2411, manufactured by Dow Corning Corporation) had been formed on a nozzle plate surface of the inkjet printer, and its thickness was 1.2 μm, surface roughness (Ra) was 0.18 μm and critical surface tension was 21.6 mN/m. The printing was conducted with high-grade plain paper & super fine mode under environmental conditions at 23° C. and 50% RH. Further, the head drive waveform was adjusted so as to maintain a constant ink discharge rate.

Further, as a recording medium, coated paper for electrophotograph recording that is difficult to absorb a liquid (manufactured by Oji Paper Co., Ltd., POD gross coat 100 g/m² paper) was used. Regarding this coated paper for electrophotograph recording, the transfer rate of purified water into the recording medium for 100 ms of contact time measured by a dynamic scanning absorptometer was 3.1 ml/m², and that for 400 ms of contact time was 3.5 ml/m². Furthermore, the transfer rate of the purified water was measured under the environmental conditions at 23° C. and 50% RH.

Next, for the obtained image prints, beading, an image drying properties and the printing test after a prolonged unused period were evaluated as mentioned below. Results are shown in Table 4.

<Evaluation for Beading>

The degree of beading in cyan or green solid color image was visually observed, and they were evaluated according to the following criteria:

[Evaluation Criteria]

A: Printing was uniform without generation of any beading.
B: Generation of slight beading was confirmed.
C: Generation of clear beading was confirmed.
D: Generation of obvious beading was confirmed.
E: Generation of very obvious beading was confirmed.

<Evaluation for Image Drying Properties>

The size of 12 cm square of cyan solid color was printed, and 10 seconds later, filter paper was attached to the solid printed portion. The rank of the drying properties was evaluated according the transfer to the filter paper in accordance with the following criteria:

[Drying Properties Rank]

Rank 1 . . . A large amount ink was transferred to the filter paper.

Rank 2 . . . A comparatively generous amount of ink was transferred.

Rank 3 . . . A transferred quantity was rather small (thin).Rank 4 . . . . Slight transfer was confirmed with careful observation.

Rank 5 . . . No transfer was confirmed.

<Printing Test after a Prolonged Unused Period (Evaluation for Nozzle Clogging)>

After the recording ink produced in Examples 1 to 5 and Comparative Examples 1 to 4 was set to the inkjet printer (manufactured by Ricoh Corporation Co., Ltd., GX5000) under the environmental conditions at 25° C. and 20% RH, a nozzle check pattern was printed, respectively. After no clogging in the nozzle was confirmed, a state where no cap was placed on a recording head (a state where the nozzle was easily dried; acceleration test) was realized by lowering a cap unit, and after this was left to stand for 24 hours, the nozzle check pattern was printed and the degree of nozzle clogging was evaluated in accordance with the following criteria:

[Evaluation Criteria]

A: No clogged (non-discharged) nozzle was confirmed.

B: The number of clogged nozzles was 1 or more and less than 10.

C: The number of clogged nozzles was 10 or more and less than 30.

D: The number of clogged nozzles was 30 or more and less than 100.

E: The number of clogged nozzles was 100 or more.

TABLE 4

|        | Total amount of solid constituents (% by mass) | A/B  | Ratio of humectant having boiling point of 230° C. or higher (% by mass) | Beading of cyan solid portion | Image drying property | Nozzle clogging |
|--------|-----|------|----|---|-----|---|
| Ex. 1  | 12.43 | 0.90 | 73 | A | 4.0 | C |
| Ex. 2  | 12.43 | 1.24 | 81 | B | 3.5 | B |
| Ex. 3  | 12.43 | 1.74 | 86 | C | 3.0 | A |
| Ex. 4  | 12.43 | 1.24 | 40 | B | 3.5 | C |
| Ex. 5  | 19.15 | 0.81 | 81 | B | 4.0 | C |
| Com. 1 | 12.43 | 2.86 | 23 | D | 2.0 | C |
| Com. 2 | 12.43 | 0.65 | 63 | A | 4.0 | E |
| Com. 3 | 12.43 | 1.80 | 87 | C | 2.0 | A |
| Com. 4 | 20.29 | 1.53 | 90 | D | 2.0 | B |
| Com. 5 | 19.46 | 1.75 | 47 | D | 2.5 | C |

In Table 4, a ratio A/B denotes a ratio A/B of the total amount of the liquid constituents within the recording ink A to the total amount of the solid constituents within the recording ink B.

According to the results shown in Table 4, with the recording inks of Examples 1 to 5, an image on the coated paper for electrophotograph recording (manufactured by Oji Paper Co., Ltd., POD gross coat 100 g/m² paper) where color smear was hardly confirmed even if scrubbing within 1 minute after printing, and that had almost no problem relating to the drying time was obtained. In addition, the image on the coated paper for electrophotograph recording (manufactured by Oji Paper Co., Ltd., POD gross coat 100 g/m² paper) was clear and an image close to a printed matter was obtained.

Further, with the recording inks of Comparative Examples 1 to 5, compared to Examples 1 to 5, the image drying properties on the coated paper for electrophotograph recording (manufactured by Oji Paper Co., Ltd., POD gross coat 100 g/m² paper) was inferior.

Preparation Example 1

-Preparation of Ink Set-

Each ink mentioned below was combined, and an ink set A was prepared.

-Preparation of Cyan Ink A-

An ink composition with the following formulation was prepared, and after pH was adjusted, the ink composition was filtrated with a membrane filter with 5 μm of average pore diameter, and the recording ink was prepared.

<Ink Composition>

| | |
|---|---|
| Dispersion element of polymer particulates containing copper phthalocyanine pigments of Manufacturing Example 1-1 [10.9% by mass of pigment, 7.5% by mass of resins (18.4% by mass of solid content), 9.1% by mass of glycerin, balance: water] | 30.55% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 20% by mass |
| Glycerin as a humectant | 10.84% by mass |
| 1,3-butanediol as a humectant | 4.54% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin and 1,3-butandiol as a humectant, which are a liquid at room temperature (25° C.), respectively, 2-ethyl-1,3-hexanediol as a penetrant, which is a liquid at room temperature (25° C.), and the surfactant was 21.16% by mass. These are equivalent to the liquid constituents within the ink, which is a liquid at 25° C., and whose boiling point is higher than that of water.

The content of the colorant, which is a solid at room temperature (25° C.), was 3.33% by mass.

For the resin constituents, a total content was 10.29% by mass with a resin from the dispersion element of polymer particulates containing cyan pigments and a resin from the acrylic silicone emulsion. A total amount of the colorant and the resin constituents was 13.62% by mass. These are equivalent to solid constituents, which are solids within the ink at 25° C. Therefore, a ratio A/B of the total amount of the liquid constituents within the recording ink A to the total amount of the solid constituents within the recording ink B was 1.55 resulting from 21.16/13.62.

Further, a ratio of the total amount of the high boiling point humectant whose boiling point within the liquid constituents is 230° C. or higher (glycerin in this example) to the total amount of the liquid constituents was 64% by mass resulting from (10.84+2.78)/21.16×100.

Further, the total amount of the resin constituents to the total amount of the colorant and the resin constituents was 76% by mass resulting from [10.29/(3.33+10.29)]×100.

-Preparation of Magenta Ink A-

An ink composition with the following formulation was prepared, and after pH was adjusted, the ink composition was filtrated with a membrane filter with 5 µm of average pore diameter, and the recording ink was prepared.

<Ink Composition>

| | |
|---|---|
| Dispersion element of polymer particulates containing magenta pigments of Manufacturing Example 1-2 [13.6% by mass of pigment, 4.5% by mass of resins (18.1% by mass of solid content), 9.1% by mass of glycerin, balance: water] | 39.11% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 16% by mass |
| Glycerin as a humectant | 9.92% by mass |
| 1,3-butanediol as a humectant | 4.49% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin and 1,3-butanesiol as a humectant, which are a liquid at room temperature (25° C.), respectively, 2-ethyl-1,3-hexanediol as a penetrant, which is a liquid at room temperature (25° C.), and the surfactant was 20.97% by mass. These are equivalent to the liquid constituents within the ink, which is liquid at 25° C., and whose boiling point is higher than that of water.

The content of the colorant, which is a solid at room temperature (25° C.), was 5.32% by mass.

For the resin constituents, a total content was 8.16% by mass with a resin from the dispersion element of polymer particulates containing magenta pigments and a resin from the acrylic silicone emulsion. A total amount of the colorant and the resin constituents was 13.48% by mass. These are equivalent to solid constituents, which are solids within the ink at 25° C. Therefore, a ratio A/B of the total amount of the liquid constituents within the recording ink A to the total amount of the solid constituents within the recording ink B was 1.56 resulting from 20.97/13.48.

Further, a ratio of the total amount of the high boiling point humectant whose boiling point within the liquid constituents is 230° C. or higher (glycerin in this example) to the total amount of the liquid constituents was 64% by mass resulting from (9.92+3.56)/20.97×100.

Further, the total amount of the resin constituents to the total amount of the colorant and the resin constituents was 61% by mass [8.16/(5.32+8.16)]×100.

-Preparation of Yellow Ink A-

An ink composition with the following formulation was prepared, and after pH was adjusted, the ink composition was filtrated with a membrane filter with 5 µm of average pore diameter, and the recording ink was prepared.

<Ink Composition>

| | |
|---|---|
| Dispersion element of polymer particulates containing a yellow pigment of Manufacturing Example 1-3 [10.9% by mass of pigments, 7.5% by mass of resins (18.4% by mass of solid content), 9.1% by mass of glycerin, balance: water] | 30.55% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 20% by mass |
| Glycerin as a humectant | 10.84% by mass |
| 1,3-butanediol as a humectant | 4.54% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin and 1,3-butanediol as a humectant, which are a liquid at room temperature (25° C.), respectively, 2-ethyl-1,3-hexanediol as a penetrant, which is a liquid at room temperature (25° C.), and the surfactant was 21.16% by mass. These are equivalent to the liquid constituents within the ink, which is a liquid at 25° C., and whose boiling point is higher than that of water.

The content of the colorant, which is a solid at room temperature (25° C.), was 3.33% by mass.

For the resin constituents, a total content was 10.29% by mass with a resin from the dispersion element of polymer particulates containing yellow pigments and a resin from the acrylic silicone emulsion. A total amount of the colorant and the resin constituents was 13.62% by mass. These are equivalent to solid constituents, which are solids within the ink at 25° C. Therefore, a ratio A/B of the total amount of the liquid constituents within the recording ink A to the total amount of the solid constituents within the recording ink B was 1.55 resulting from 21.16/13.62.

Further, a ratio of the total amount of the high boiling point humectant whose boiling point within the liquid constituents is 230° C. or higher (glycerin in this example) to the total amount of the liquid constituents was 64% by mass resulting from (10.84+2.78)/21.16×100.

Further, the total amount of the resin constituents to the total amount of the colorant and the resin constituents was 76% by mass resulting from [10.29/(3.33+10.29)]×100.

-Preparation of Black Ink A-

An ink composition with the following formulation was prepared, and after pH was adjusted, the ink composition was filtrated with a membrane filter with 5 µm of average pore diameter, and the recording ink was prepared.

<Ink Composition>

| | |
|---|---|
| Carbon black dispersion liquid having a hydrophilic group, of Manufacturing Example 2 [20% by mass of pigment and the balance is water, colorant/resin (mass ratio) = 10/0] | 40.00% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 13.75% by mass |
| Glycerin as a humectant | 13.50% by mass |
| 3-methyl-1,3-butanediol as a humectant | 4.50% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | Balance |

Among the ink composition, a total amount of glycerin and 3-methyl-1,3-butanediol as a humectant, which are a liquid at room temperature (25° C.), respectively, 2-ethyl-1,3-hexanediol as a penetrant, which is a liquid at room temperature (25° C.), and the surfactant was 21.00% by mass. These are equivalent to the liquid constituents within the ink, which is a liquid at 25° C., and whose boiling point is higher than that of water.

The content of the colorant, which is a solid at room temperature (25° C.), was 8.00% by mass.

For the resin constituents, a total content was 5.50% by mass with a resin the from acrylic silicone emulsion. A total amount of the colorant and the resin constituents was 13.50% by mass. These are equivalent to solid constituents, which are solids within the ink at 25° C. Therefore, a ratio A/B of the total amount of the liquid constituents within the recording ink A to the total amount of the solid constituents within the recording ink B was 1.56 resulting from 21.00/13.50.

Further, a ratio of the total amount of the high boiling point humectant whose boiling point within the liquid constituents is 230° C. or higher (glycerin in this example) to the total amount of the liquid constituents was 64% by mass resulting from 13.50/21.00×100.

Further, the total amount of the resin constituents with respect to the total amount of the colorant and the resin constituents was 41% by mass resulting from [5.5/(8.00+5.5)]×100.

Preparation Example 2

-Preparation of Ink Set H-
Each ink mentioned below was combined, and an ink set H was prepared.
-Preparation of cyan ink H-
The cyan ink produced in Comparative Example 1 was used as cyan ink H.
-Preparation of magenta ink H-
An ink composition with the following formulation was prepared, and after pH was adjusted, the ink composition was filtrated with a membrane filter with 5 μm of average pore diameter, and the recording ink was prepared.

<Ink Composition>

| | |
|---|---|
| Dispersion element of polymer particulates containing a magenta pigment, of Manufacturing Example 1-2 [13.6% by mass of pigment, 4.5% by mass of resins (18.1% by mass of solid content), 9.1% by mass of glycerin, balance: water] | 58.67% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 8% by mass |
| Glycerin as a humectant | 2.42% by mass |
| 1,3-butanediol as a humectant | 23.25% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin and 1,3-butanediol as a humectant, which are a liquid at room temperature (25° C.), respectively, 2-ethyl-1,3-hexanediol as a penetrant, which is a liquid at room temperature (25° C.), and the surfactant was 34.01% by mass. These are equivalent to the liquid constituents within the ink, which is a liquid at 25° C., and whose boiling point is higher than that of water.

The content of the colorant, which is a solid at room temperature (25° C.), was 7.98% by mass.

For the resin constituents, a total content was 5.84% by mass with a resin from the dispersion element of polymer particulates containing magenta pigments and a resin from the acrylic silicone emulsion. A total amount of the colorant and the resin constituents was 13.82% by mass. This is equivalent to solid constituents, which are solids within the ink at 25° C. Therefore, a ratio A/B of the total amount of the liquid constituents within the recording ink A to the total amount of the solid constituents within the recording ink B was 2.46 resulting from 34.01/13.82.

Further, a ratio of the total amount of the high boiling point humectant whose boiling point within the liquid constituents is 230° C. or higher (glycerin in this example) to the total amount of the liquid constituents was 23% by mass resulting from (2.42+5.34)/34.01×100.

Further, the total amount of the resin constituents to the total amount of the colorant and the resin constituents was 42% by mass resulting from [5.84/(7.98+5.84)]×100.

-Preparation of Yellow Ink H-
An ink composition with the following formulation was prepared, and after pH was adjusted, the ink composition was filtrated with a membrane filter with 5 μm of average pore diameter, and the recording ink was prepared.

<Ink Composition>

| | |
|---|---|
| Dispersion element of polymer particulates containing a yellow pigment, of Manufacturing Example 1-3 [10.9% by mass of pigment, 7.5% by mass of resins (18.4% by mass of solid content), 9.1% by mass of glycerin, balance: water] | 45.83% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 10% by mass |
| Glycerin as a humectant | 3.58% by mass |
| 1,3-butanediol as a humectant | 23.25% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin and 1,3-butanediol as a humectant, which are a liquid at room temperature (25° C.), respectively, 2-ethyl-1,3-hexanediol as a penetrant, which is a liquid at room temperature (25° C.), and the surfactant was 34.00% by mass. These are equivalent to the liquid constituents within the ink, which is a liquid at 25° C., and whose boiling point is higher than that of water.

The content of the colorant, which is a solid at room temperature (25° C.), was 5.00% by mass.

For the resin constituents, a total content was 7.44% by mass with a resin from the dispersion element of polymer particulates containing yellow pigments and a resin from the acrylic silicone emulsion. A total amount of the colorant and the resin constituents was 12.44% by mass. These are equivalent to solid constituents, which are solids in the ink at 25° C. Therefore, a ratio A/B of the total amount of the liquid constituents within the recording ink A to the total amount of the solid constituents within the recording ink B was 2.73 resulting from 34.00/12.44.

Further, a ratio of the total amount of the high boiling point humectant whose boiling point within the liquid constituents is 230° C. or higher (glycerin in this example) to the total amount of the liquid constituents was 23% by mass resulting from (3.58+4.17)/34.00×100.

Further, the total amount of the resin constituents to the total amount of the colorant and the resin constituents was 60% by mass resulting from [7.44/(5.00+7.44)]×100.

-Preparation of Black Ink H-

An ink composition with the following formulation was prepared, and after pH was adjusted, the ink composition was filtrated with a membrane filter with 5 μm of average pore diameter, and the recording ink was prepared.

<Ink Composition>

| | |
|---|---|
| Carbon black dispersion liquid having a hydrophilic group, of Manufacturing Example 2 [20% by mass of pigment and the balance is water, colorant/resin (mass ratio) = 10/0] | 40.00% by mass |
| Acrylic silicone emulsion of Manufacturing Example 3 [40% by mass of solid content, balance: water, volume average particle size: 150 nm, glass transfer temperature of resin constituents: −15° C. (differential heat rising) to −6° C. (inflexion point)] | 13.75% by mass |
| Glycerin as a humectant | 8.5% by mass |
| 3-methyl-1,3-butanediol as a humectant | 17.00% by mass |
| 2-ethyl-1,3-hexanediol as a penetrant | 2% by mass |
| Fluorochemical surfactant (FS-300, the center value of the number of carbon atoms substituted by fluorine = 12, manufactured by DuPont, 40% by mass of active component) | 2.5% by mass |
| Mildew proofing agent (Proxel LV, Avecia Biologics Limited) | 0.05% by mass |
| pH adjuster (triethanol amine) | 0.3% by mass |
| Silicone emulsion-based antifoaming agent (KM-72F, manufactured by Shin-Etsu Chemical Co., Ltd.) | 0.1% by mass |
| Water | balance |

Among the ink composition, a total amount of glycerin and 3-methyl-1,3-butanediol as a humectant, which are a liquid at room temperature (25° C.), respectively, 2-ethyl-1,3-hexanediol as a penetrant, which is a liquid at room temperature (25° C.), and the surfactant was 28.50% by mass. These are equivalent to the liquid constituents within the ink, which is a liquid at 25° C., and whose boiling point is higher than that of water.

The content of the colorant, which is a solid at room temperature (25° C.), was 8.00% by mass.

For the resin constituents, a total content was 5.50% by mass with a resin from the acrylic silicone emulsion. A total amount of the colorant and the resin constituents was 13.50% by mass. These are equivalent to solid constituents, which are solids in the ink at 25° C. Therefore, a ratio A/B of the total amount of the liquid constituents within the recording ink A to the total amount of the solid constituents within the recording ink B was 2.11 resulting from 28.50/13.50.

Further, a ratio of the total amount of the high boiling point humectant whose boiling point within the liquid constituents is 230° C. or higher (glycerin in this example) to the total amount of the liquid constituents was 30% by mass resulting from 8.50/28.50×100.

Further, the total amount of the resin constituents to the total amount of the colorant and the resin constituents was 41% by mass resulting from [5.5/(8.00+5.5)]×100.

Regarding each ink in the obtained ink set A and ink set H, measurement results of the surface tension, pH and viscosity are shown in Table 5.

TABLE 5

| | Ink | Total amount of solid constituents (% by mass) | A/B | Ratio of humectant having boiling point of 230° C. or higher (% by mass) | Viscosity (mPa · s) | Surface tension (mN/m) | pH |
|---|---|---|---|---|---|---|---|
| Ink set A | Cyan ink A | 13.62 | 1.55 | 64 | 4.00 | 23.9 | 9.91 |
| | Magena ink A | 13.48 | 1.56 | 64 | 3.92 | 23.7 | 10.04 |
| | Yellow ink A | 13.62 | 1.55 | 64 | 4.04 | 24.3 | 9.93 |
| | Black ink A | 13.5 | 1.56 | 64 | 4.83 | 24.3 | 9.55 |
| Ink set H | Cyan ink H | 12.43 | 2.86 | 23 | 8.23 | 25.9 | 9.63 |
| | Magena ink H | 13.82 | 2.46 | 23 | 8.03 | 25.3 | 9.29 |
| | Yellow ink H | 12.44 | 2.73 | 23 | 7.89 | 25.4 | 9.74 |
| | Black ink H | 13.50 | 2.11 | 30 | 8.12 | 25.7 | 9.37 |

In Table 5, a ratio A/B denotes a ratio A/B of the total amount of the liquid constituents within the recording ink A to the total amount of the solid constituents within the recording ink B.

Next, the transfer rate of purified water that was measured into recording sheets (1) to (3) was measured as described below, respectively. The results are shown in Table 6.

<Recording Sheet (1)>

Commercially-available sheet (trade name: Aurora Coat, basis weight=104.7 g/m², manufactured by Nippon Paper)

<Recording Sheet (2)>

Commercially-available coated paper for electrophotography recording (trade name: POD Gross Coat 100 g/m² paper, manufactured by Oji Paper Co., Ltd.)

<Recording Sheet (3)>

Commercially-available coated paper for electrophotography recording (trade name: Paper only for Super Fine, manufactured by Seiko Epson Corporation)

<Measurement of Transfer Rate of Purified Water by Dynamic Scanning Absorptometer>

For the recording sheets (1) to (3), an absorption curve of purified water was measured using a dynamic scanning absorptometer (model: KS350D, manufactured by Kyowa Seiko Co., Ltd.). For the absorption curve, a square root of the transfer rate (mL/m²) and the contact time (ms) was plotted and a straight line having a constant slope was obtained, and values for transfer rate of purified water after a certain time were measured by interpolation. Furthermore, the measurement was conducted under the environmental conditions at 23° C. and 50% RH.

TABLE 6

| | Transfer rate of purified water (ml/m²) | |
|---|---|---|
| | Contact time: 100 ms | Contact time: 400 ms |
| Recording sheet (1) | 2.8 | 3.4 |
| Recording sheet (2) | 3.1 | 3.5 |
| Recording sheet (3) | 41.0 | 44.8 |

Examples 6 to 7 and Comparative Examples 6 to 9

Next, the ink set A and the ink set H were filled in the inkjet printer (manufactured by Ricoh Company, Inc., IPSiO GX5000) and printing was conducted onto the recording sheets (1) to (3) as a recording medium with high-grade plain paper & the super fine mode, respectively, and the image was evaluated using the method as similar to that in Examples 1 to 5 and Comparative Examples 1 to 5. A silicone resin coating (room-temperature cure type silicone resin SR2411, manufactured by Dow Corning Corporation) was formed on the nozzle plate surface of the inkjet printer, and its thickness was 1.2 μm, surface roughness (Ra) was 0.18 μm and critical surface tension was 21.6 mN/m. Results are shown in Table 7.

TABLE 7

| | Ink set | Recording medium | Beading at green solid color | Image drying property at cyan solid color | Gloss of image portion |
|---|---|---|---|---|---|
| Ex. 6 | Ink set A | Recording sheet (1) | C | 3 | confirmed |
| Ex. 7 | | Recording sheet (2) | B | 3.5 | confirmed |
| Com. 6 | | Recording sheet (3) | A | 5 | none |
| Com. 7 | Ink set H | Recording sheet (1) | E | 1 | confirmed |
| Com. 8 | | Recording sheet (2) | D | 2 | confirmed |
| Com. 9 | | Recording sheet (3) | A | 5 | none |

According to the results shown in Table 7, comparison of Examples 6 and 7 to Comparative Examples 6 to 9, the ink set A was effective for image improvement in the case of using paper where the transfer rate of purified water was small compared to the ink set H, and the improvement of beading and the image drying properties was confirmed with the ink of the ink set A on the recording sheets (1) and (2) compared to the ink of the ink set H. Further, the beading and the image drying properties were superior in the image on the recording paper (3); however, image without any gloss in the image portion could be obtained.

Industrial Applicability

With the recording ink of the present invention, since an image that has no problem relating to a drying speed on coated paper for printing having low liquid absorbing capacity, and that is clear and close to printed materials for commercial publication can be obtained, the recording ink can be preferably used for an ink medium set, an ink cartridge, an ink printed material, an inkjet recording apparatus and an inkjet recording method.

The inkjet recording apparatus and the inkjet recording method of the present invention are applicable for various records using the inkjet recording method, and for example, they are especially preferably applicable for an inkjet recording printer, a facsimile device, a copier, a printer/facsimile/copier complex device.

The invention claimed is:

1. A recording ink comprising:
   solid constituents, which contain a colorant and a resin, and stay solid in the ink having a temperature of 25° C;
   liquid constituents, which have a higher boiling point than a boiling point of water, and stay liquid in the ink having a temperature of 25° C; and
   water,
   wherein a total amount of the solid constituents in the recording ink is in the range of from 2.0% by mass or more to less than 20% by mass,
   wherein a ratio A/B of a total amount of the liquid constituents in the recording ink A to the total amount of the solid constituents in the recording ink B is from 0.70 to 1.75, and
   wherein the viscosity of the recording ink at 25° C. is 10 mPa·s or less.

2. The recording ink according to claim 1, wherein the liquid constituents comprise a humectant having a boiling point of 230° C. or higher, and a total amount of the humectant is 50% by mass or more with respect to the total amount of the liquid constituents.

3. The recording ink according to claim 2, wherein the humectant is at least one selected from the group consisting of glycerin, 1,3-butandiol, 3-methyl-1,3-butanediol, 2-pyrolidone and N-methyl-2-pyrolidone.

4. The recording ink according to claim 1, wherein the liquid constituents contain a penetrant which is C8 to C11 polyol.

5. The recording ink according to claim 1, wherein the liquid constituents comprise a surfactant which comprises a fluorochemical surfactant.

6. The recording ink according to claim 5, wherein the fluorochemical surfactant has 2 to 16 fluorine-substituted carbon atoms.

7. The recording ink according to claim 1, wherein the resin comprises fine resin particles.

8. The recording ink according to claim 7, wherein the fine resin particles comprise an acrylic silicone resin which has a glass transition temperature of 25° C. or less.

9. The recording ink according to claim 7, wherein the fine resin particles have a volume average particle diameter of 10 nm to 1,000 nm in a resin emulsion.

10. The recording ink according to claim 1, wherein the colorant is a polymer emulsion pigment in which a colorant having water insolubility or poor water solubility is contained in fine polymer particles.

11. The recording ink according to claim 1, wherein the colorant is a pigment having an anionic hydrophilic group on a surface thereof.

12. The recording ink according to claim 1, wherein the recording ink has a surface tension 35 mN/m or less at 25° C.

13. An inkjet recording method comprising:
    applying a stimulus to a recording ink, and
    ejecting the recording ink so as to record an image on a recording medium,
    wherein the recording ink comprises solid constituents, which contain a colorant and a resin, and stay solid in the ink having a temperature of 25° C; liquid constituents, which have a higher boiling point than a boiling point of water; and stay liquid in the ink having a temperature of 25° C; and
    wherein a total amount of the solid constituents in the recording ink is in the range of from 2.0% by mass or more to less than 20% by mass; a ratio A/B of a total amount of the liquid constituents in the recording ink A to the total amount of the solid constituents in the recording ink B is from 0.70 to 1.75; the viscosity of the recording ink at 25° C. is 10 mPa s or less.

14. The inkjet recording method according to claim 13, wherein the recording medium comprises a support, and a coated layer disposed at least on one surface of the support, and
    wherein a transfer rate of purified water to the recording medium for 100 ms of contact time measured by a dynamic scanning absorptometer is 2 ml/m² to 35 ml/m², and the transfer rate of purified water to the recording medium for 400 ms of contact time is 3 ml/m² to 40 ml/m².

15. The inkjet recording method according to claim 13, wherein the stimulus is at least one selected from heat, pressure, vibration and light.

16. The inkjet recording method according to claim 13, wherein the recording ink is ejected from a inkjet head which has an opening for ejecting ink formed on a plate surface thereof, and wherein the plate surface has an ink-repellent layer.

17. The inkjet recording method according to claim 16, wherein the ink-repellent layer comprises either a fluorine-based material or a silicone-based material.

18. The inkjet recording method according to claim 16, wherein the ink-repellent layer has a surface roughness (Ra) of 0.2 μm or less.

19. An inkjet recording apparatus comprising:
    an ink ejection unit which is configured to apply a stimulus to a recording ink, and to eject the recording ink so as to record an image on a recording medium,
    wherein the recording ink comprises solid constituents, which contain a colorant and a resin, and stay solid in the ink having a temperature of 25° C; liquid constituents, which have a higher boiling point than a boiling point of water; and stay liquid in the ink having a temperature of 25° C; and
    wherein a total amount of the solid constituents in the recording ink is in the range of from 2.0% by mass or more to less than 20% by mass; a ratio A/B of a total amount of the liquid constituents in the recording ink A to the total amount of the solid constituents in the recording ink B is from 0.70 to 1.75; the viscosity of the recording ink at 25 ° C. is 10 mPa s or less.

20. The inkjet recording apparatus according to claim 19, wherein the stimulus is at least one selected from heat, pressure, vibration and light.

* * * * *